United States Patent [19]

Springer et al.

[11] Patent Number: 4,878,242

[45] Date of Patent: Oct. 31, 1989

[54] TELECONFERENCING SYSTEM

[75] Inventors: Robert M. Springer, Wyckoff, N.J.; Richard L. Schmal, Los Gatos; Eugene H. Gavenman, Los Altos, both of Calif.

[73] Assignee: Ricoh Corporation, San Jose, Calif.

[21] Appl. No.: 76,380

[22] Filed: Jul. 22, 1987

Related U.S. Application Data

[63] Continuation-in-part of Ser. No. 890,692, Jul. 25, 1986, abandoned.

[51] Int. Cl.$^4$ ............... H04M 3/56; H04M 11/00; H04N 1/00
[52] U.S. Cl. ................................. 379/204; 379/93; 379/96; 379/100; 358/85; 358/434
[58] Field of Search ................ 379/53, 54, 93, 96, 379/97, 98, 100, 204; 358/8.5, 256, 257

[56] References Cited

U.S. PATENT DOCUMENTS

| | | | |
|---|---|---|---|
| 4,246,442 | 1/1981 | Hashimoto | 379/98 |
| 4,258,387 | 3/1981 | Lemelson | 379/53 |
| 4,503,468 | 3/1985 | Serinken | 379/100 |
| 4,550,224 | 10/1985 | Winchell | 379/202 |
| 4,609,779 | 9/1986 | Rogers | 379/100 |
| 4,656,654 | 4/1984 | Dumas et al. | 379/97 |

FOREIGN PATENT DOCUMENTS 130018  1/1985  European Pat. Off.

Primary Examiner—Jin F. Ng
Assistant Examiner—Wing F. Chan
Attorney, Agent, or Firm—Flehr, Hohbach, Test, Albritton & Herbert

[57] ABSTRACT

The teleconferencing system includes three or more audiographic teleconferencing terminals where any one of the terminals can act as a sending terminal and/or a receiving terminal during a teleconferencing session. Each terminal includes means for establishing a broadcast and listen protocol that permits a sending terminal to transmit a facsimile image to multiple receiver terminals simultaneously.

11 Claims, 69 Drawing Sheets

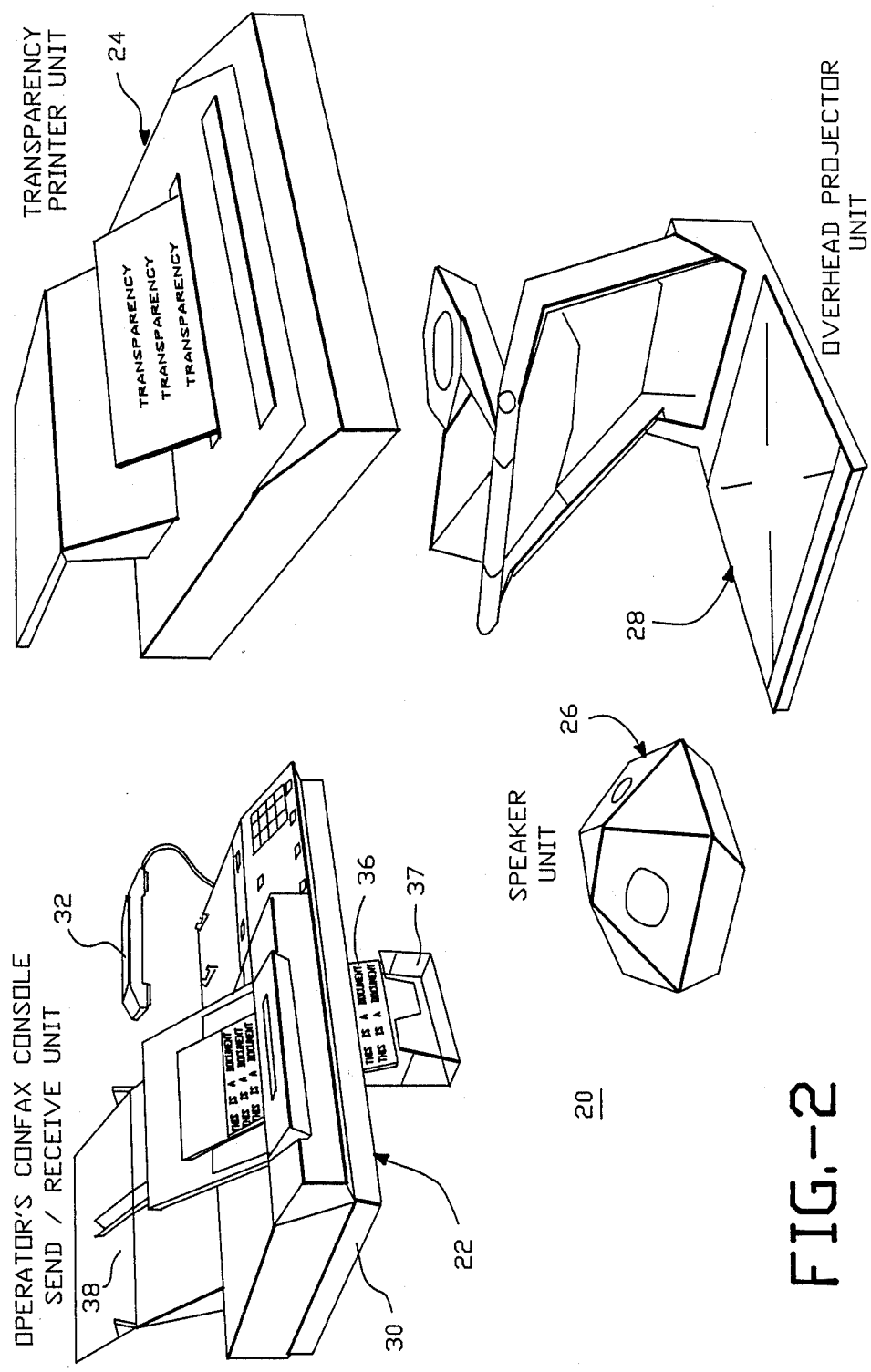

TABLE 1
CALL SET UP
REMOTE UNIT

| | FAX MODE TERMINAL | TC MODE TERMINAL | BRIDGE (MEET ME) | TELEPHONE |
|---|---|---|---|---|
| CALLING UNIT — FAX MODE TERMINAL | o HEAR FAX RESPONSE.<br>o XMIT IMAGE.<br>o AUTO DISCONNECT.<br>o LOCAL UNIT HANGS UP. | ANSWER:<br>TALK (ERROR WARNING AFTER 120 SECONDS).<br>o ERROR 1 IF XMIT.<br>o HANG UP TO END.<br><br>NO NNSWER:<br>REMOTE CHANGE TO FAX AFTER 2-6 RINGS.<br>o CAN SEND IMAGE.<br>o AUTO DISCONNECT. | ANSWER:<br>TONE SOUNDED-TALK<br>o ERROR 1 IF XMIT.<br>o HANG UP TO END (TONE SOUNDED).<br><br>BUSY:<br>BRIDGE FULL OR LOCKED. | ANSWER:<br>TALK<br>o ERROR 1 IF XMIT.<br>o HANG UP TO END.<br><br>NO ANSWER:<br>HANG UP. |

FIG.-6-1

TABLE 1
CALL SET UP
REMOTE UNIT

| | FAX MODE TERMINAL | TC MODE TERMINAL | BRIDGE (MEET ME) | TELEPHONE |
|---|---|---|---|---|
| CALLING UNIT — TERMINAL — TC MODE | o HEAR FAX RESPONSE.<br>o AUTO SWITCH TO FAX XMIT ATTEMPTED WITHIN 10 SECONDS OF END OF CED TONE.<br>o HANG UP, HOLD FOR VOICE ANSWER OR CHANGE TO FAX MODE (IF NOT AUTOMATICALLY CHANGED)<br>1) REMOTE UNIT SOUNDS ALARM 16 SECONDS AFTER BEING CALLED.<br>2) CAN SWITCH TO FAX MODE (IF NOT AUTO-MATICALLY CHANGED) & SEND MESSAGE/IMAGE TO REMOTE UNIT IF DONE BEFORE 33 SEC. THEN REMOTE DISCONN.<br>o RETURN TO TC MODE. | ANSWER:<br>TALK OR XMIT IMAGE.<br><br>o HANG UP TO END.<br><br>NO NNSWER:<br>REMOTE CHANGE TO FAX AFTER 2-6 RINGS.<br>o SAME OPTIONS AS FOR REACHING FAX MODE TERMINAL. | ANSWER:<br>TONE SOUNDED-TALK OR XMIT IMAGE.<br><br>o HANG UP TO DROP LEG (TONE SOUNDED).<br><br>BUSY:<br>BRIDGE FULL. | ANSWER:<br>TALK<br><br>o HANG UP TO END.<br><br>NO ANSWER. |

FIG.-6-2

TABLE 1
CALL SET UP
REMOTE UNIT

| | | FAX MODE TERMINAL | TC MODE TERMINAL | BRIDGE (MEET ME) | TELEPHONE |
|---|---|---|---|---|---|
| CALLING UNIT | TELEPHONE TERMINAL | o HEAR FAX RESPONSE.<br>o HANG UP OR HOLD FOR POSSIBLE FAX PARTY. | ANSWER:<br>o HANG UP TO END.<br>o ERROR 3 IF XMIT FROM TC UNIT.<br><br>NO ANSWER:<br>REMOTE CHANGE TO FAX AFTER 2-6 RINGS.<br>o HANG UP. | ANSWER:<br>TONE SOUNDED-TALK.<br>o ERROR 3 IF XMIT FROM TC UNIT.<br>o HANG UP TO END (TONE SOUNDED).<br><br>BUSY:<br>BRIDGE FULL OR LOCKED.<br>o HANG UP. | ANSWER:<br>TALK<br>o HANG UP TO END.<br><br>NO ANSWER:<br>o HANG UP. |

FIG.-6-3

ADD-ON BRIDGE OPERATION

0 CALLING UNITS CANNOT ACCESS ADD-ON
0 HOST LEAVES BRIDGE AND CALLS EACH
   REMOTE UNIT TO ADD TO BRIDGE.
0 TONE SOUNDED WHEN LEG ENDED OR DROPPED.

ANSWER - TC TERMINAL:

0 TALK/HOST ADDS UNIT TO BRIDGE
   HOST RETURNS TO BRIDGE.
0 UNIT HANGES UP TO DROP FROM BRIDGE.

ANSWER - FAX TERMINAL:

0 HOST HEARS FAX RESPONSE.
   OPTIONS ARE SAME AS WHEN TC TERMINAL
   REACHES FAX TERMINAL (HOST HOWEVER,
   LIKELY TO HANG UP AS BRIDGE GROUP
   IS WAITING).

ANSWER - TELEPHONE:

0 HOST ADDS USER ON AS FOR TC TERMINAL.
0 CONFEREE HANGS UP TO DROP FROM BRIDGE.

NO ANSWER - TC TERMINAL:

0 REMOTE CHANGED TO FAX MODE AFTER 2-6
   RINGS. SAME OPTIONS AS WHEN FAX TERMINAL
   ANSWERS.

NO ANSWER - OTHER:

0 HOST HANGS UP AND RETURNS TO BRIDGE.

FIG.-6-4

ERROR CONDITIONS

ERROR 1 (R-120 FAX XMITS TO TC/TELEPHONE)

DOCUMENT IN SCANNER-START CUTS OFF CONVERSATION; SAYS TRANSMIT.

1. (<30 SECONDS)
   a. FAX OFF HOOK
      (1) TC/TELEPHONE OFF HOOK-TC PARTY HEARS BEEP EVERY THREE SECONDS.
      (2) TC/TELEPHONE ON HOOK-FAX PARTY HEARS FAINT BEEP EVERY THREE SECONDS.
   b. FAX ON HOOK
      (1) TC/TELEPHONE OFF HOOK-TC PARTY HEARS BEEP EVERY THREE SECONDS.
      (2) TC/TELEPHONE ON HOOK-BRIEF BUZ AT FSX; MESSAGE INDICATES LINE FAIL; FAX DISCONNECTS.

2. ( 30 SECONDS)
   a. FAX OFF HOOK
      (1) TC/TELEPHONE OFF HOOK
         o ALARM/MESSAGE: "ANSWER/PUSH STOP" AT FAX; SAYS LINE FAIL.
         o PARTIES CAN CONVERSE; ALARM/MESSAGE CONTINUE.
         o ALARM STOPS AT 50 SECONDS OR IF STOP PRESSED; PARTIES CAN CONVERSE.
         o IF EITHER HANGS UP, OTHER PARTY HEARS PHONE DISCONNECT RESPONSE; IF BOTH PARTIES HANG UP SYSTEM IS IDLE.
      (2) TC/TELEPHONE ON HOOK-FAX PARTY HEARS FAINT PHONE LINE DISCONNECT RESPONSE; FAX DISCONNECTS AT 55 SECONDS.
   b. FAX ON HOOK
      (1) TC/TELEPHONE OFF HOOK-QUICK BUZZ AT MACHINE; FAX DISCONNECTS RESPONSE.
      (2) TC/TELEPHONE ON HOOK-FAX DISCONNECTS AFTER QUICK BUZZ; TELEPHONE IDLE.

NO DOCUMENT IF SCANNER - START CUTS OFF CONVERSATION; SAYS RECEIVE 1. (< 16 SECONDS)
   a. FAX OFF HOOK
      (1) TC/TELEPHONE OFF HOOK-TC/TELEPHONE PARTY HEARS CED/DIS RESPONSE FROM FAX.
      (2) TC/TELEPHONE ON HOOK-FAX PARTY HEARS FAINT CED/DIS RESPONSE.

FIG.-8A b. FAX ON HOOK (1) TC/TELEPHONE PARTY OFF HOOK-TC/TELEPHONE PARTY HEARS PHONE LINE DISCONNECT RESPONSE.

(2) TC/TELEPHONE PARTY ON HOOK-ALARM/MESSAGE: 'ANSWER/PUSH STOP AT FAX MACHINE; FAX DISCONNECTS AT 40 SECONDS.

2. (AT 16 SECONDS)
   AT CONDITIONS-ALARM/MESSAGE: 'ANSWER/PUSH STOP' AT FAX.

3. (< 40 SECONDS)

a. FAX ON HOOK (1) TC/TELEPHONE OFF HOOK

0  CONVERSATION POSSIBLE WITHIN 10 SECONDS IF STOP PRESSED AT FAX, OR BY 40 SECONDS IF STOP NOT PRESSED.

0  ALARM/MESSAGE CONTINUE; ALARM STOPS IF STOP BUTTON IS PRESSED OR 60 SECONDS REACHED. IF EITHER PARTY HANG UP, OTHER PARTY HEARS PHONE LINE DISCONNECTS RESPONSE. IF BOTH PARTIES HANG UP, SYSTEM IS IDLE.

(2) TC/TELEPHONE ON HOOK-ALARM/MESSAGE STOP; FAX DISCONNECTS.

b. FAX ON HOOK (1) TC/TELEPHONE OFF HOOK-TC/TELEPHONE PARTY HEARS PHONE DISCONNECT RESPONSE.

(2) TC/TELEPHONE ON HOOK-TC/TELEPHONE IDLE.

ERROR 2 (TC XMITS TO FAX)

1. NOT COMPLETELY UNDERSTOOD-TWO DIFFERENT PROTOCOLS.
2. IF FAX PARTY SAYS OFF-HOOK IN PASSIVE STATE, ERROR 2 WILL LIKELY BE IDENTICAL TO ERROR 3.
3. IF THE TC PARTY XMITS DURING AUTO-RECEPTION BY THE FAX TERMINAL AND PRESSES START WITHIN 10 SECONDS OF THE END OF THE CED TONE:
   a. THE TC TERMINAL WILL BE SWITCHED TO THE FAX MODE.
   b. THE FAX LAMP WILL BE SET TO A BLINKING STATE TO ALERT THE TC PARTY THAT THE TERMINAL MODE HAS BEEN CHANGED FROM ITS ORIGIONAL STATE.
   c. IMAGERY WILL BE TRANSMITTED VIA THE STANDARD G3 PROCEDURE.
4. IF THE TC PARTY DOES NOT PRESS START WITHIN 10 SECONDS OF THE END OF THE CED RESPONSE BY THE FAX TERMINAL, TWO OUTCOMES ARE PROBABLE:

FIG.-8B 4. (CONT.)
   A. AT APPROXIMATELY 16 SECONDS, AN ALARM WILL SOUND AT THE FAX TERMINAL AND THE MASSAGE "ANSWER/PUSH STOP" WILL BE DISPLAYED. IF THE FAX PARTY PRESSES STOP PROIR TO THE TIMEOUT OF THE FAX TREMINAL (ABOUT 33 SECONDS), THE FAX PARTY WILL PROBABLY HEAR THE TC PROTOCOL-TRANSMISSION SEQUENCE, LIKELY, THE FAX PARTY WILL HANG UP. IF THE FAX PARTY CHOOSES TO STAY ON TUE LINE DURING TUE TC PROTOCOL-TRANSMISSION SEQUENCE (ABOUT 40-50 SECONDS), VOICE COMMUNICATION WILL BE POSSIBLE AFTER THE TC PARTY TERMINAL RETURNS TO AN AUDIO STATE. IF, HOWEVER, THE FAX PARTY EITHER FAILS TO RESPOND TO THE ALARM/MESSAGE OR HANGS UP UPON HEARING THE TC SEQUENCE, THE FAX TERMINAL WILL TIMEOUT AT ABOUT 33 SECONDS AND DISCONNECT, AND THE TC PARTY WILL HEAR TELEPHONE DISCONNECT OUTPUT AFTER THE TC SEQUENCE IS COMPLETED. THE TC PARTY WILL THEN LIKELY HANG UP.

B. IF ERROR 2 OCCURS DURING MANUAL FAX TRANSMISSION (WHERE THE TC PARTY PRESSES START FIRST), OR WHEN THE TERMINALS ARE IN A MIXED MODE SPEECH STATE, IT IS POSSIBLE THAT THE CDE TONE WILL NOT BE SOUNDED AT THE FAX TERMINAL AND THE ERROR 2 PREVENTION SAFEGUARD WILL NOT BE INVOKED. THIS CONDITION WILL LEAD TO THE SAME OUTCOME AND OPTIONS AS IF THE TC PARTY FAILS TO PRESS START WITHIN 10 SECONDS OF THE END OF THE FAX CED TONE. THE FAX TERMINAL (AS NOTED ABOVE) WILL PRODUCE AN ALARM AND MESSAGE AFTER 16 SECONDS AND DEPENDEMT UPON WHETHER THE FAX PARTY RESPONDS TO THE ALARM AND HOLDS OR DISCONNECTS, EITHER SPEECH OR A FAX TERMINAL DISCONNECT WILL OCCUR.

ERROR 3 (TC XMITS TO TELEPHONE)
1. RECEIVING UNITS WILL HEAR THE "BROADCAST AND LISTEN" PROTOCOL SEQUENCE FOLLOWED BY THE TRANSMISSION SIGNAL.

2. AUDIO IS RESUMED AT THE CONCLUSION OF IMAGE TRANSMISSION

3. IF THE RECEIVING UNITS ARE ON HOOK AT, OR BEFORE THE END OF TRANSMISSION, THE LINE WILL BE DROPPED BEFORE OR SHORTLY AFTER TRANSMISSION IS COMPLETED.

FIG.-8C

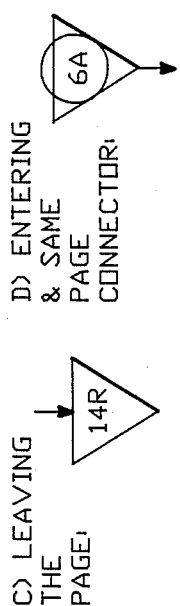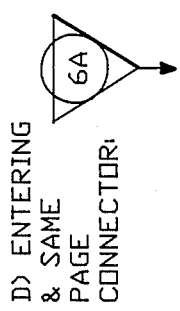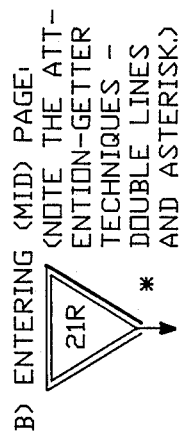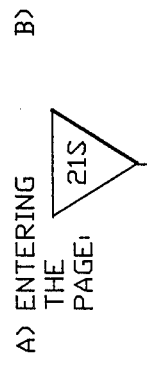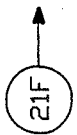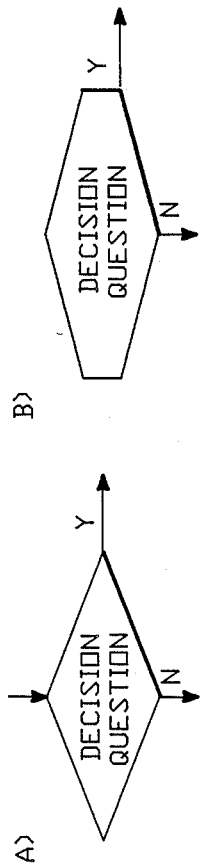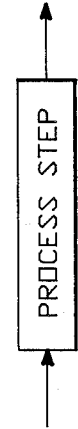
FIG.-9-0

FIG.-9-2A

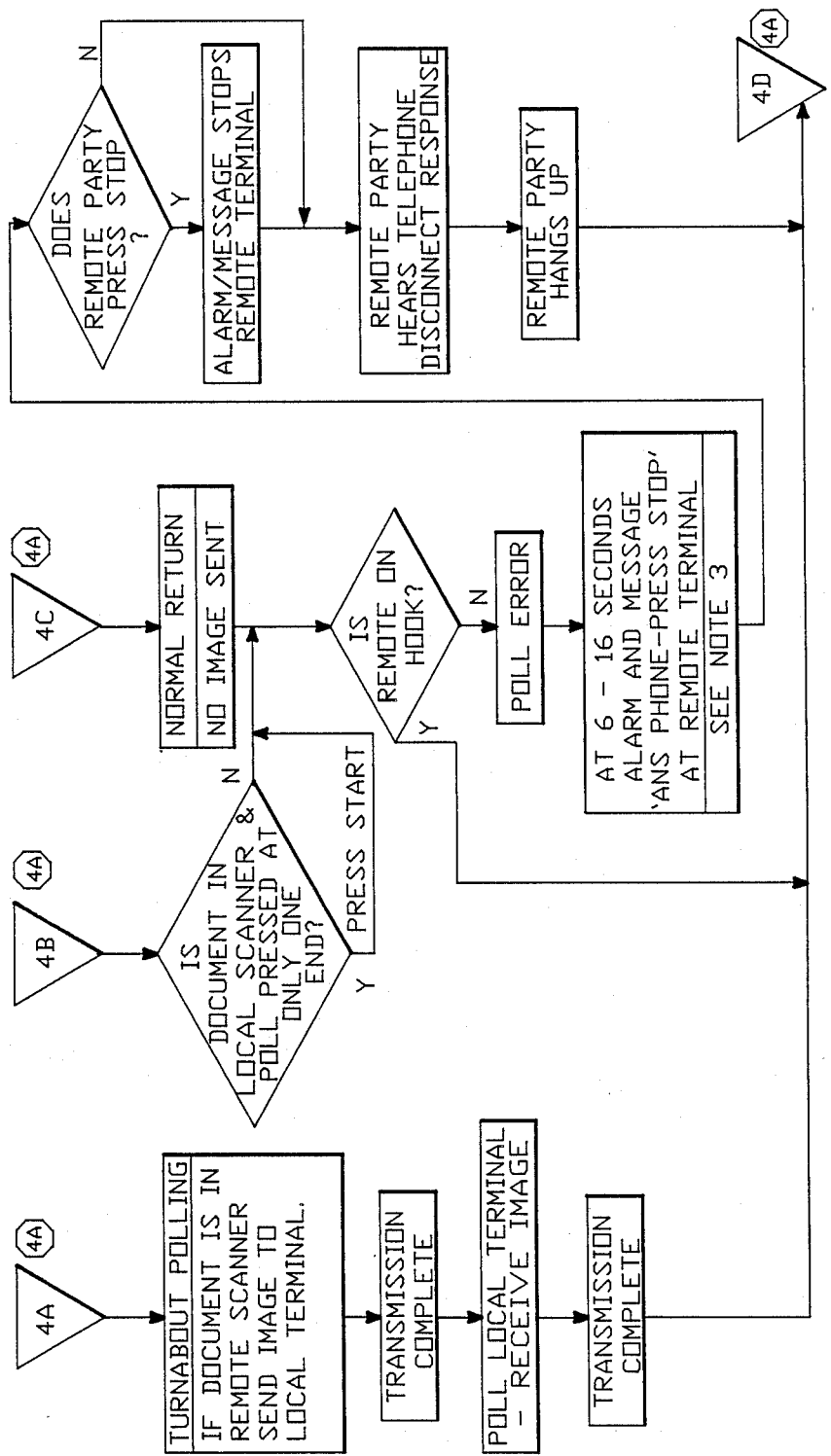

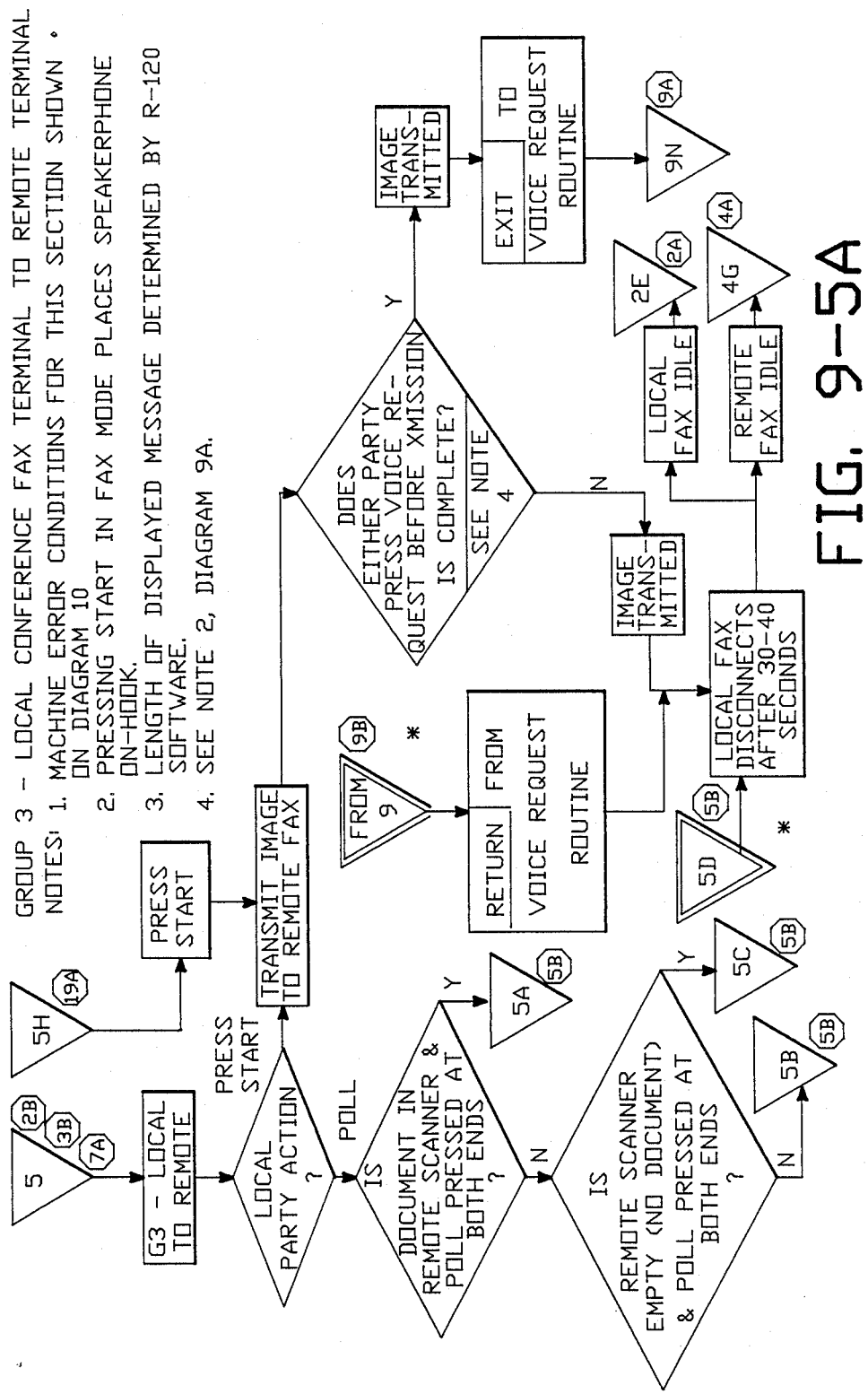

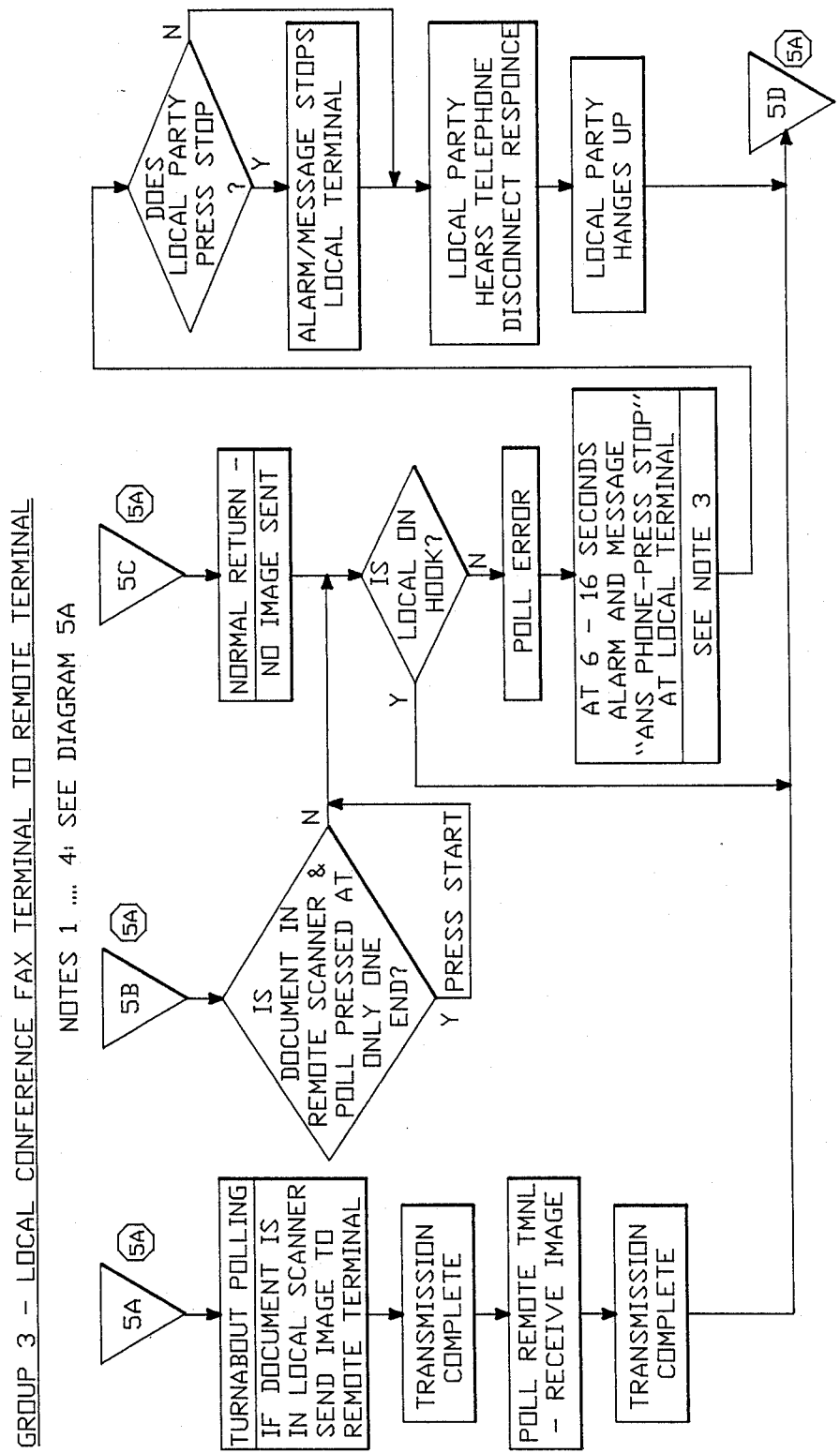

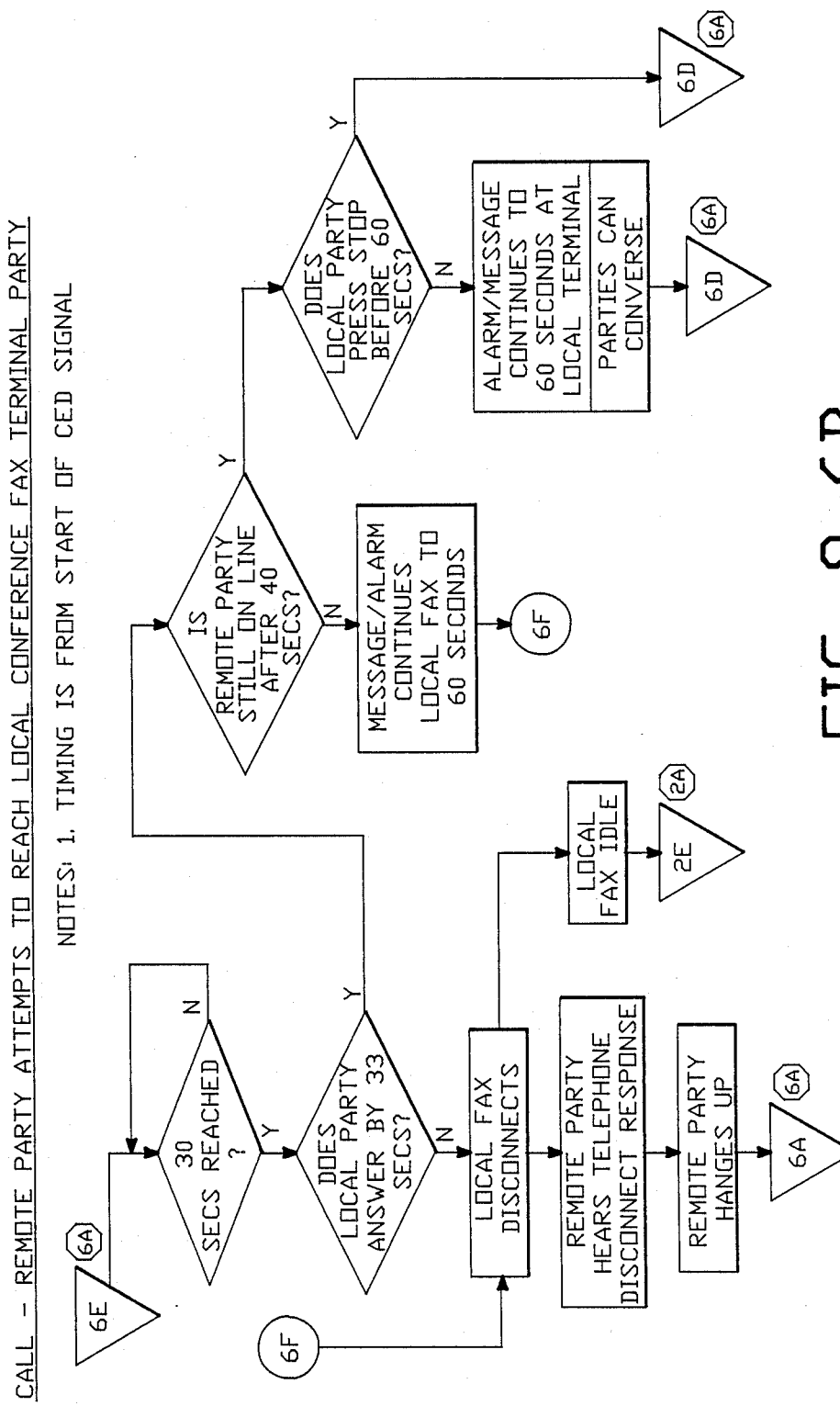

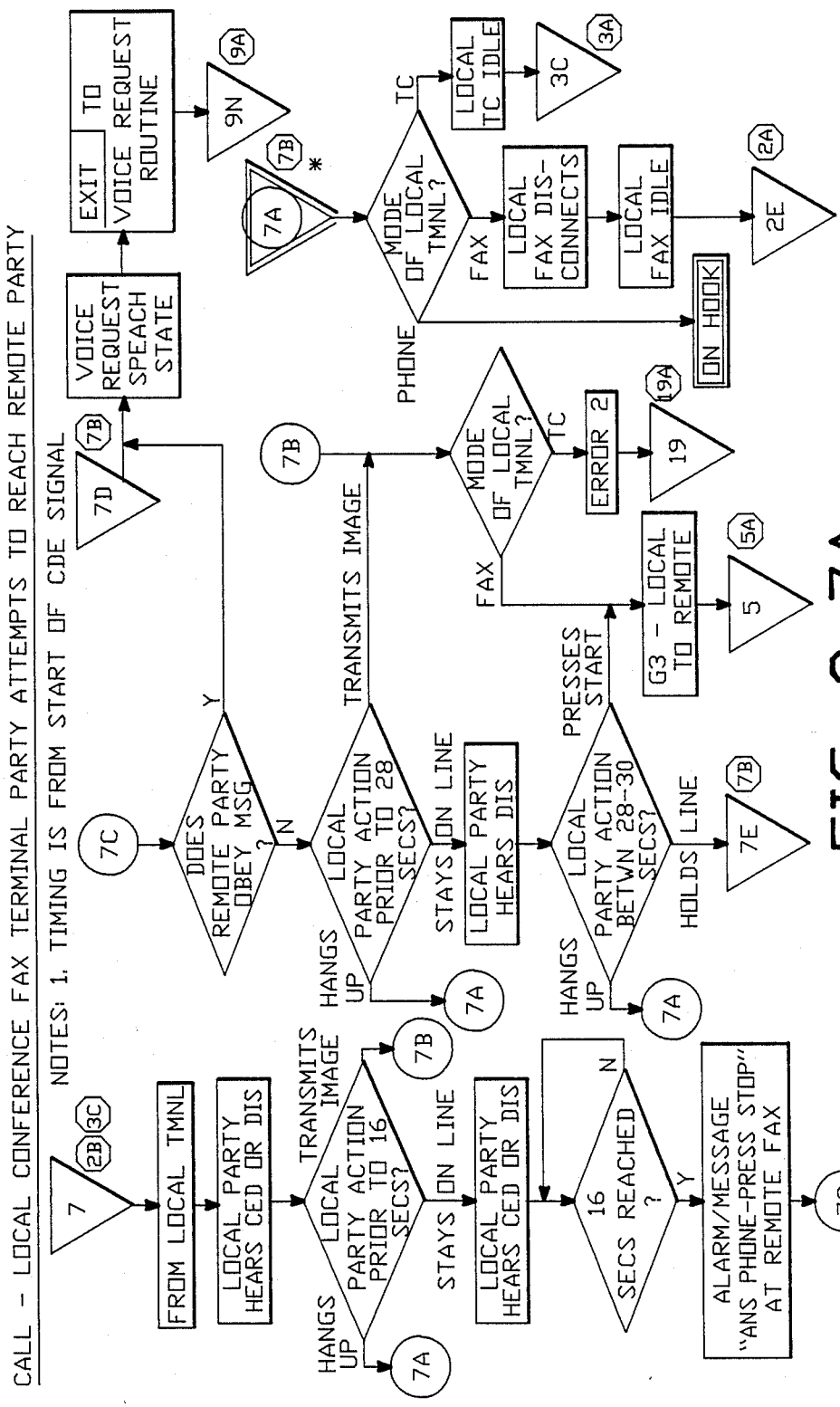

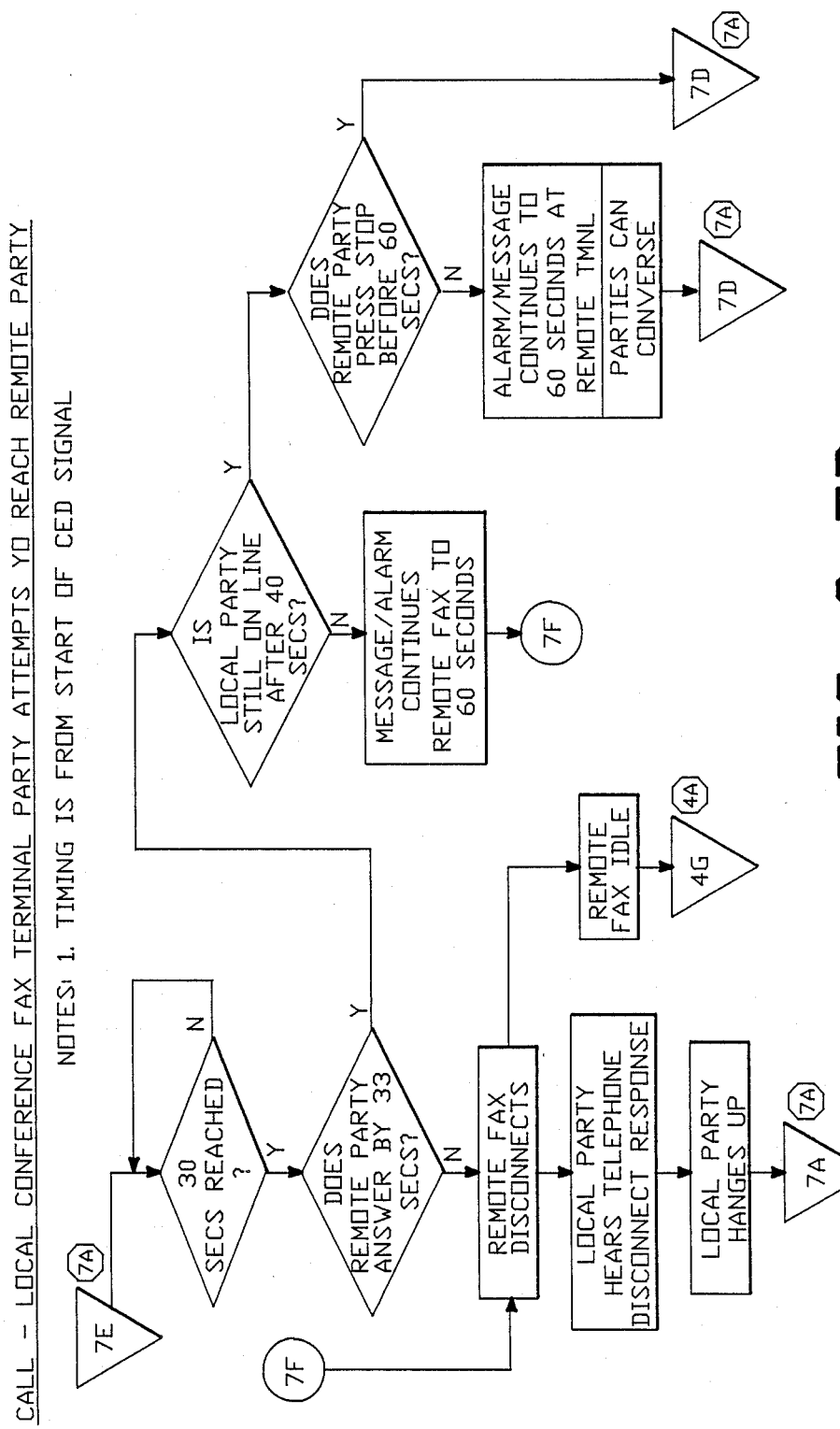

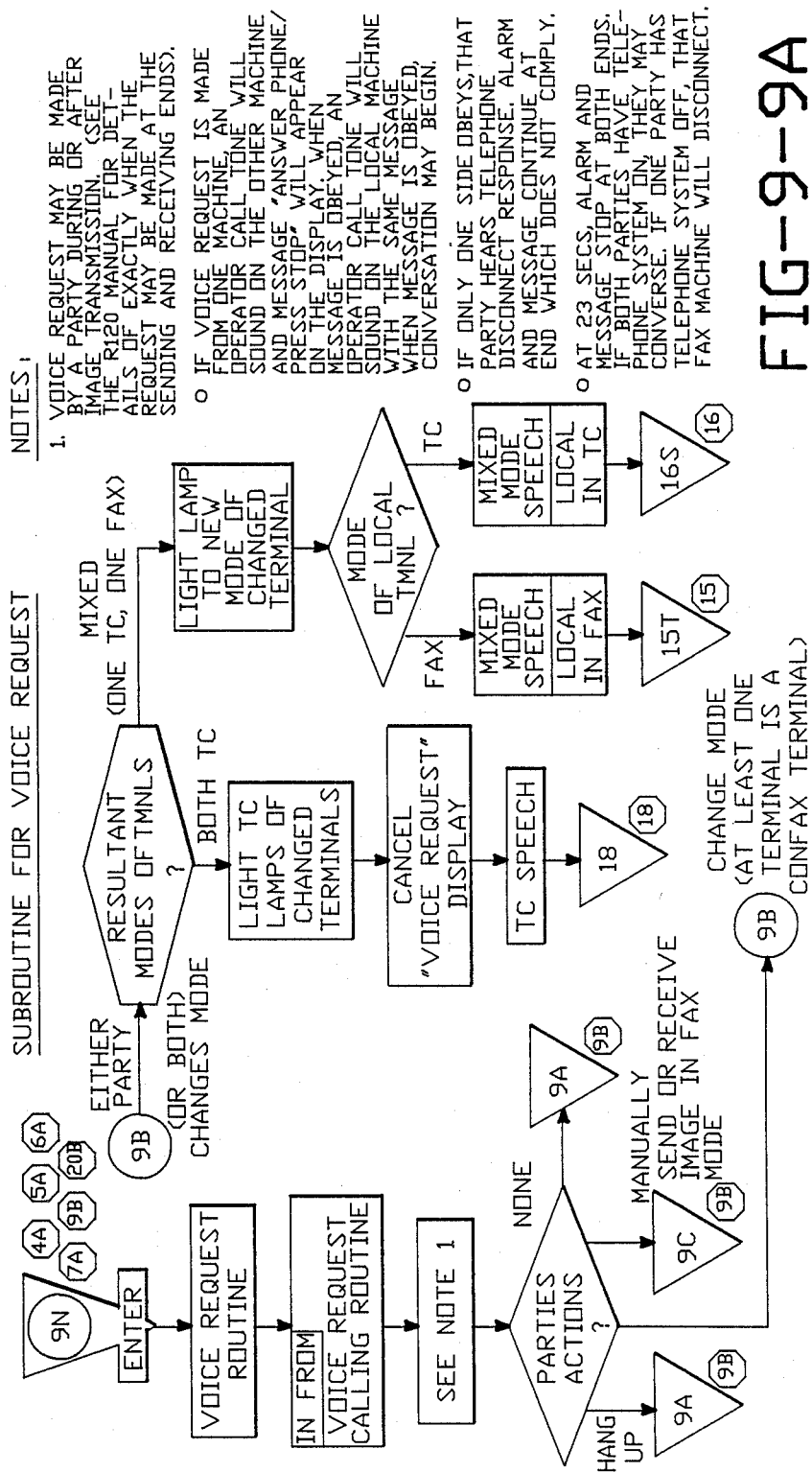

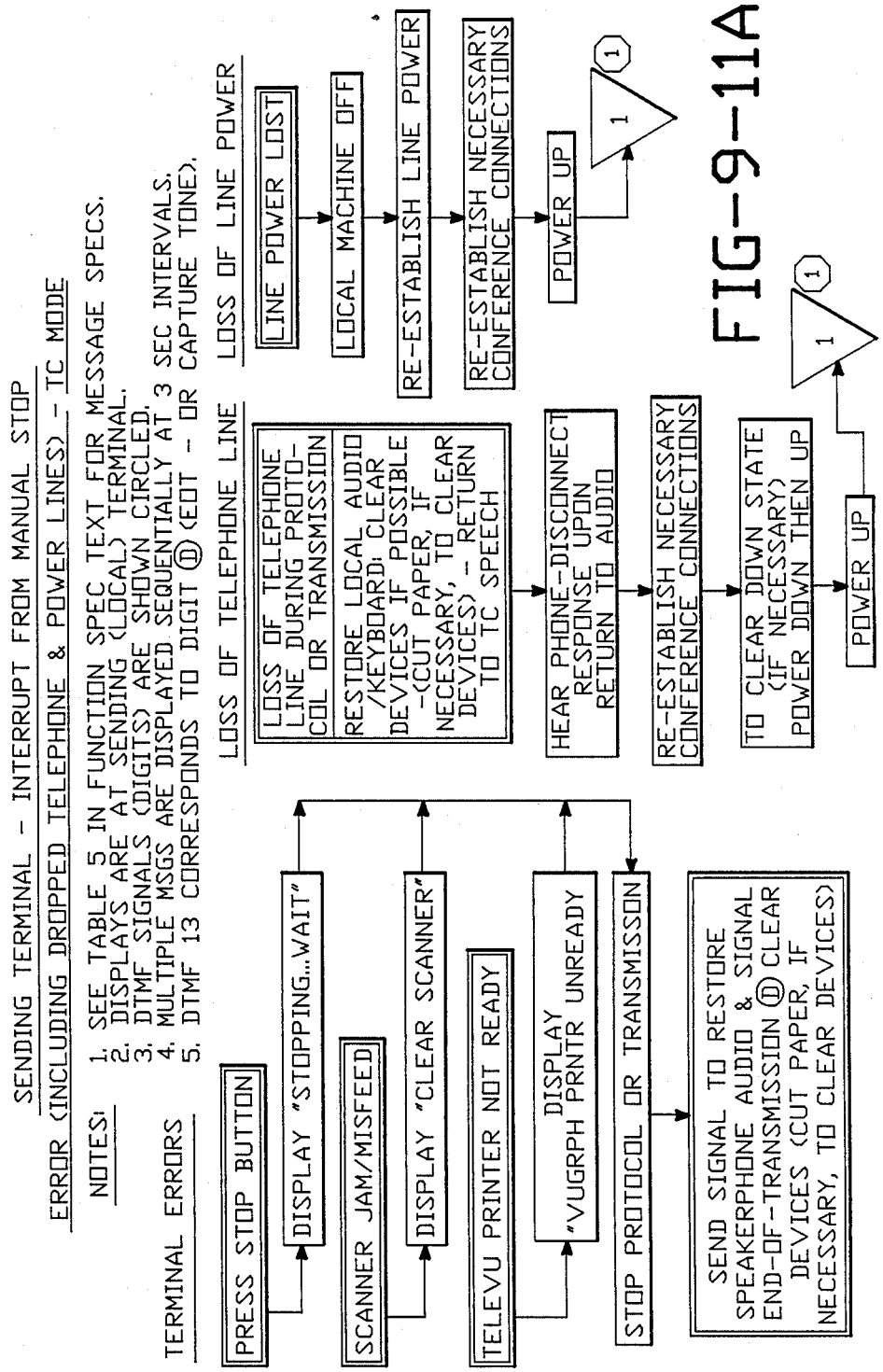

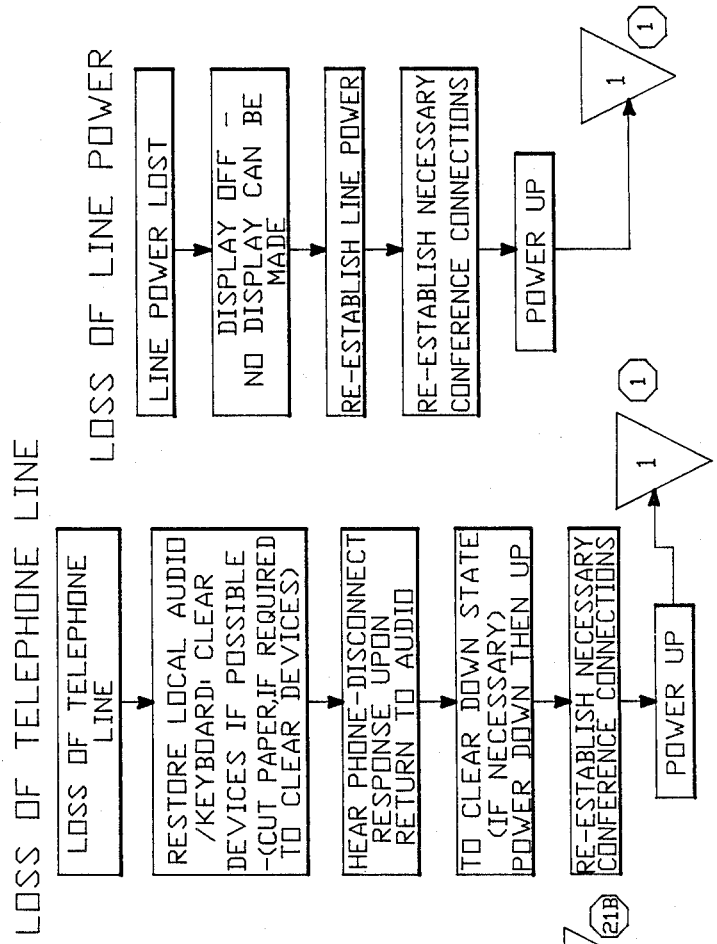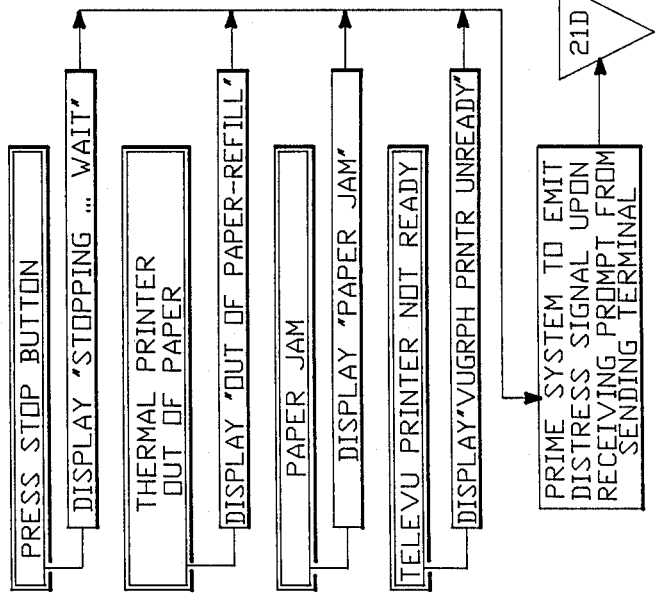
FIG.-9-12

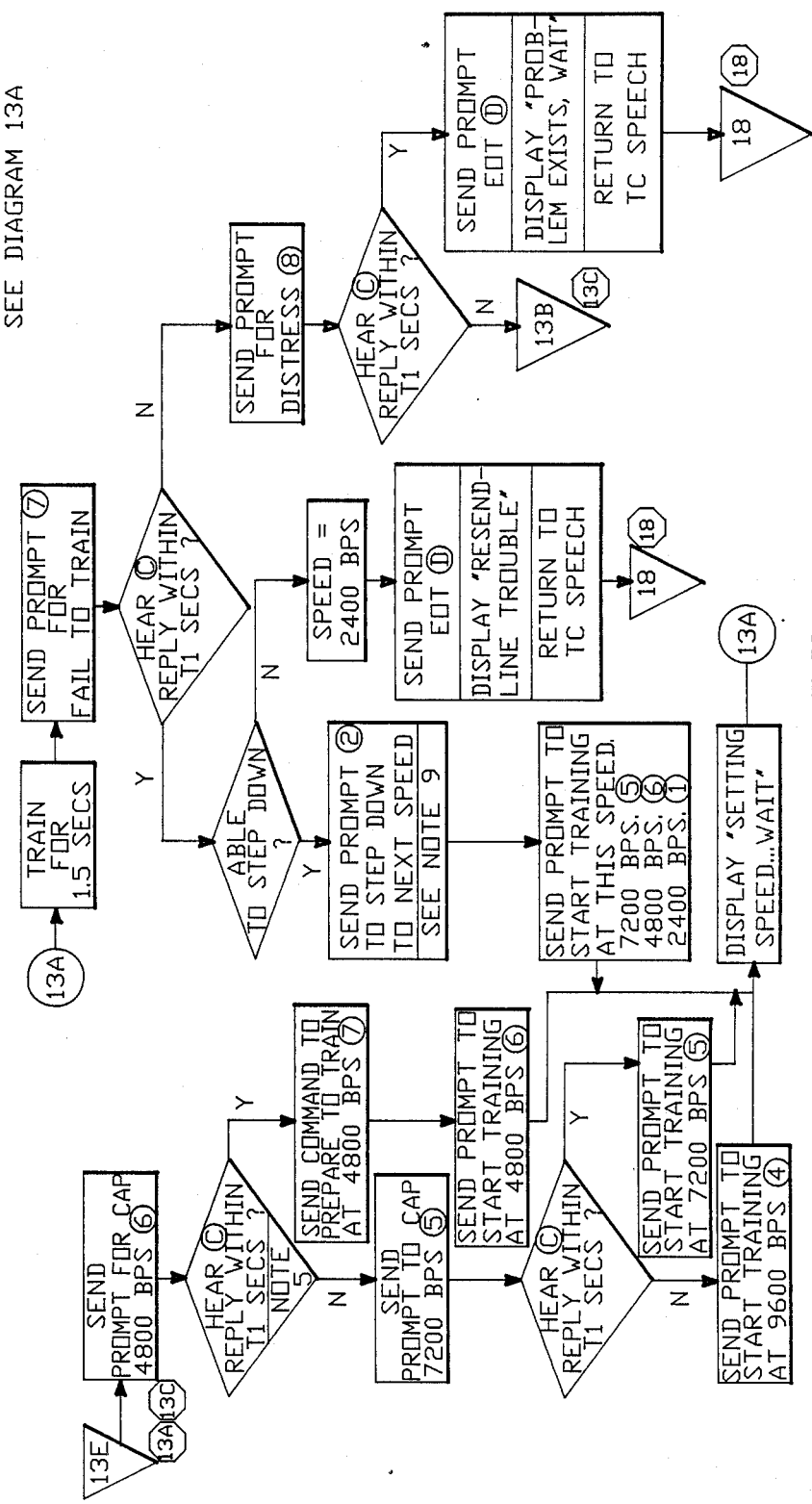

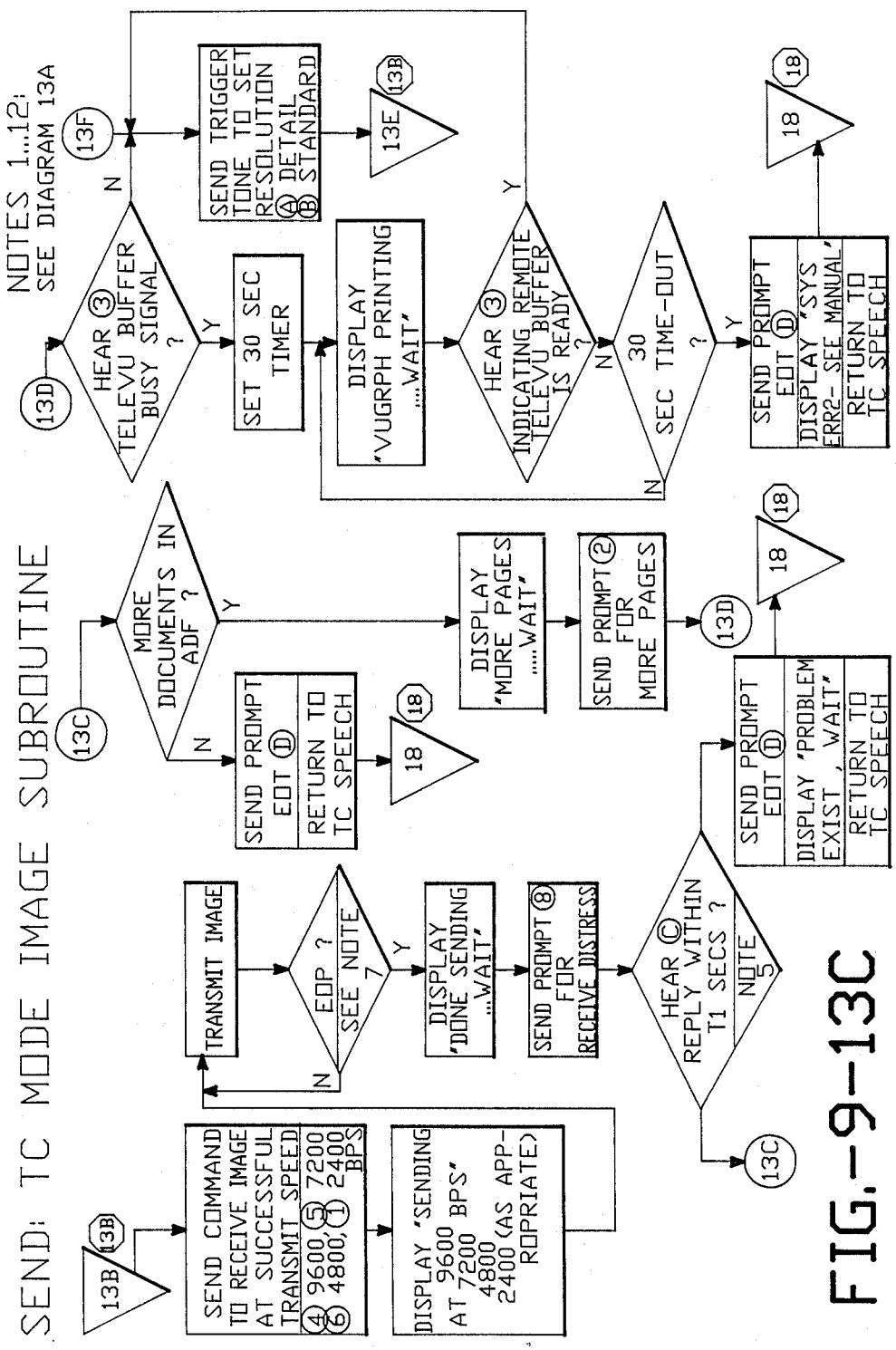

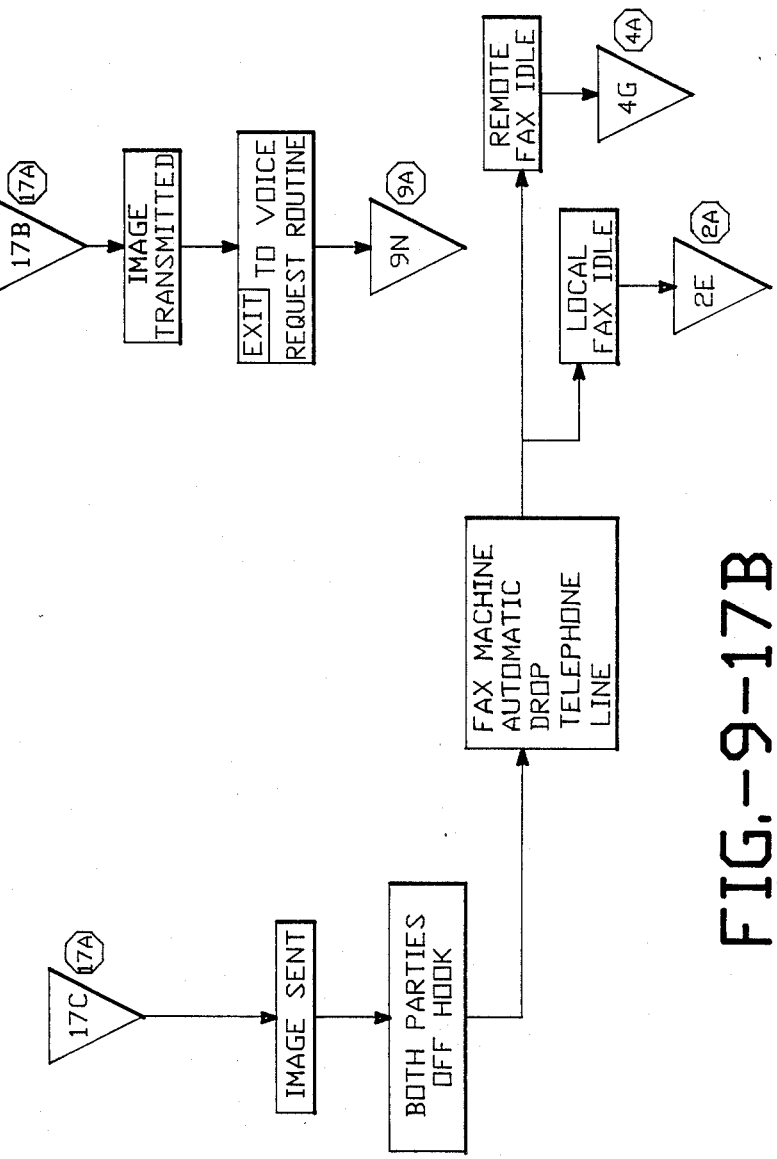

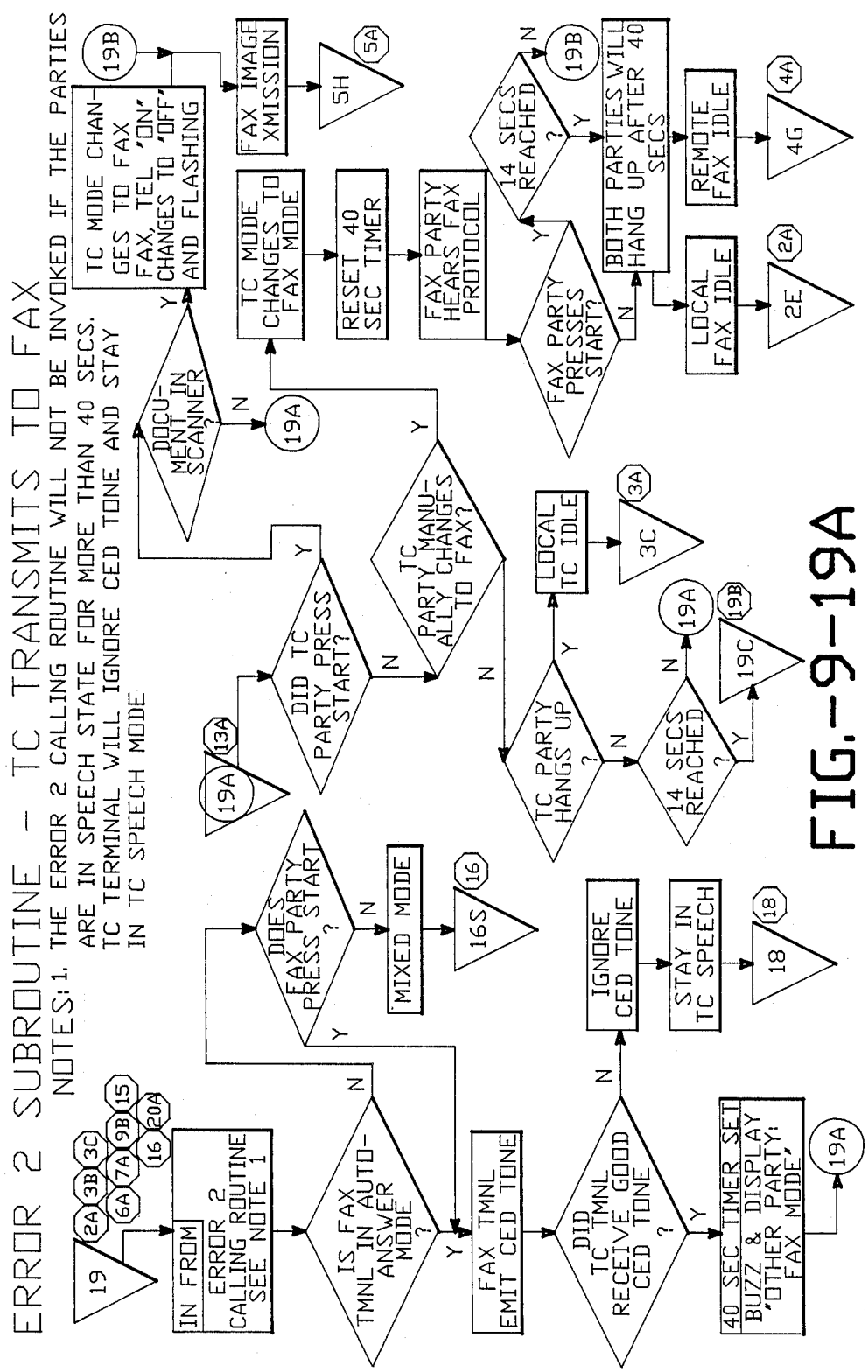

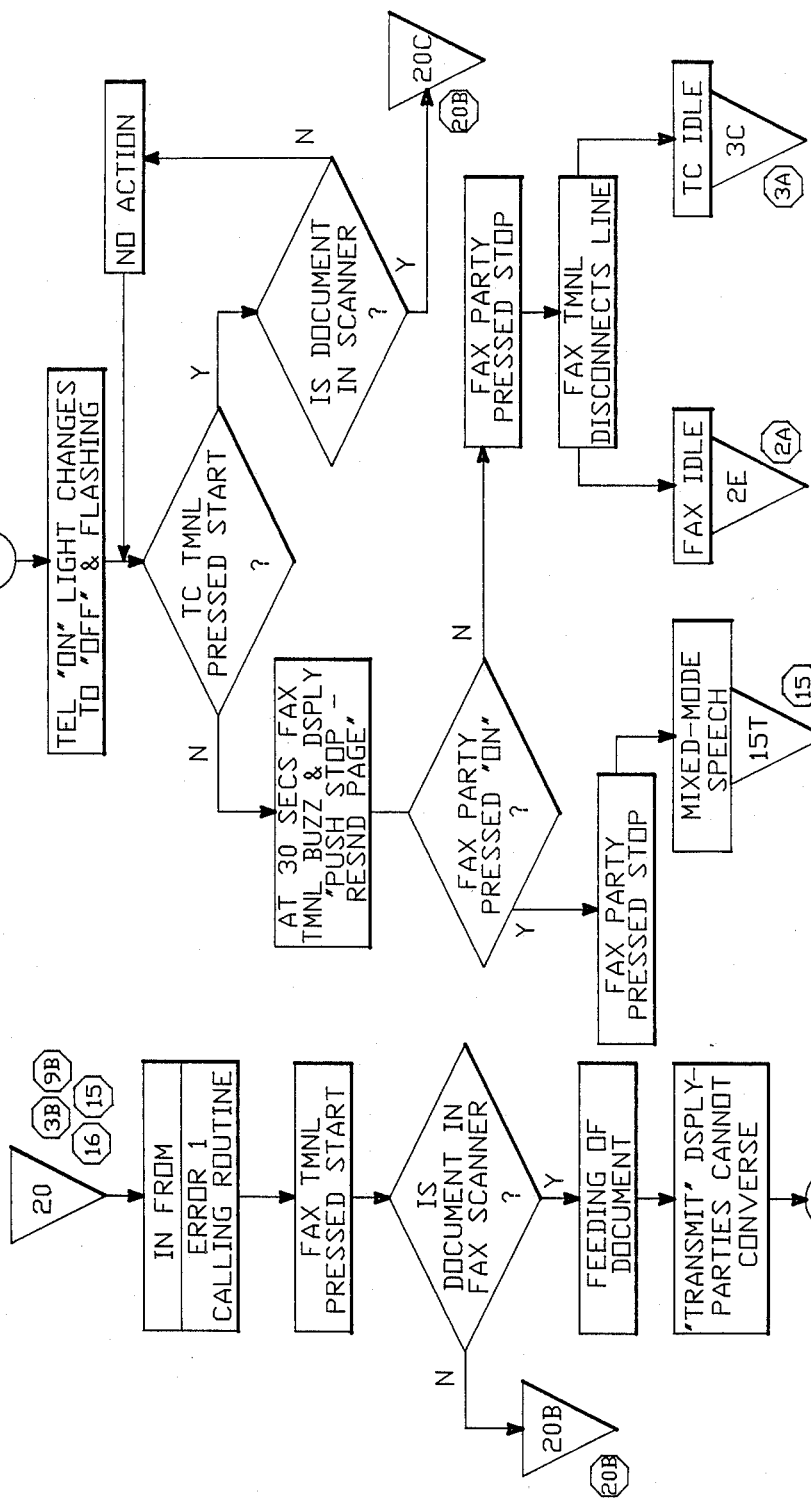

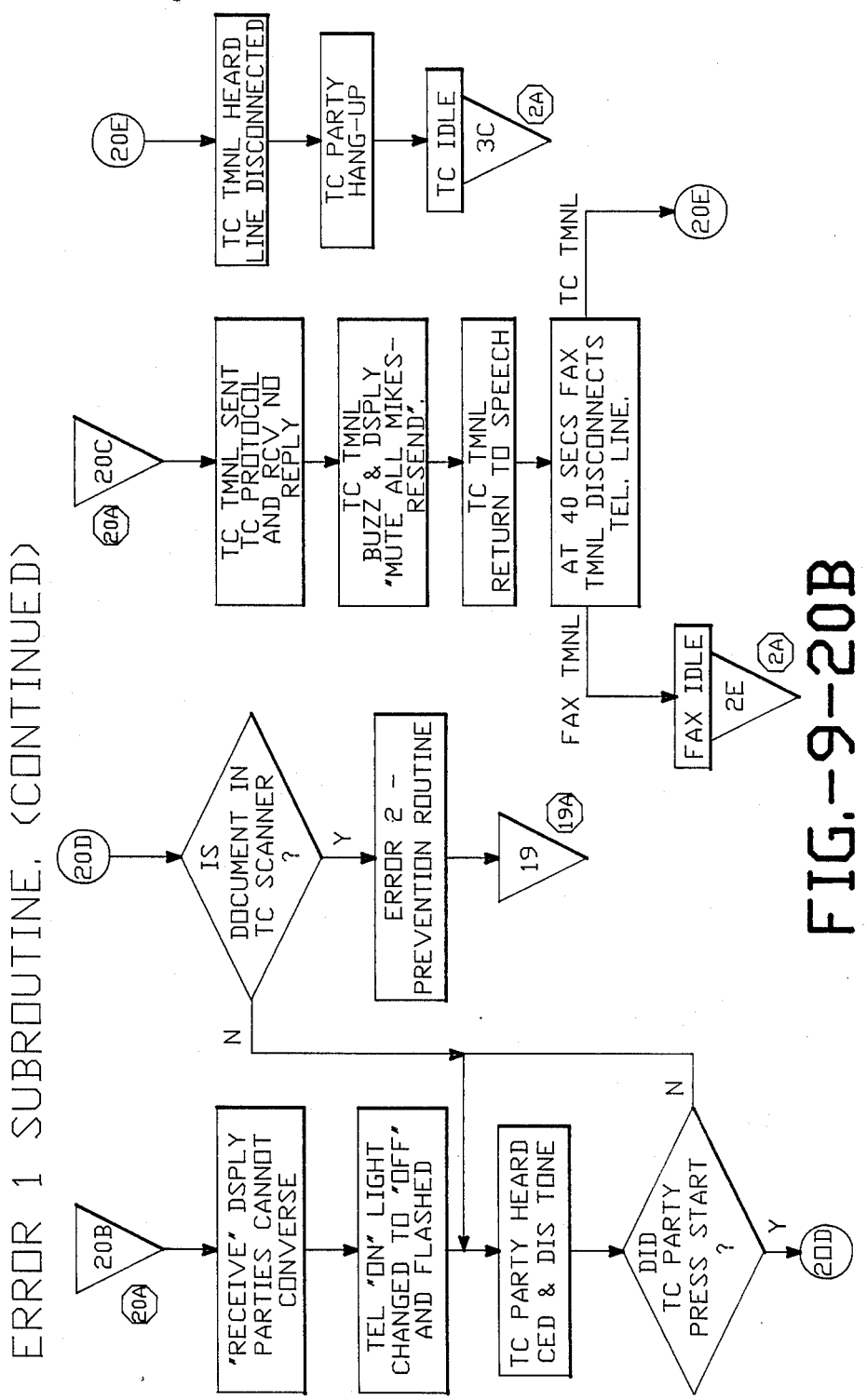

TELECONFERENCING MESSAGES

| MESSAGES: | DIAGRAMS: |
|---|---|
| ANS PHONE-PRESS STOP | 4B 5B 6A 7A 20A 20B 20C |
| CHOOSE TC/FAX MODE | 1 |
|   CLEAR ORIGINAL | 10 |
|   CLEAR SCANNER | 11A |
| DONE RECEIVING..WAIT | 14C |
| DONE SENDING....WAIT | 13C |
| FAX MODE READY hh:mm | 1 2A 17A |
|   LINE FAIL | 20A 20B |
| MAX SPEED = 2400 BPS | 18 |
| MAX SPEED = 4800 BPS | 18 |
| MAX SPEED = 7200 BPS | 18 |
| MAX SPEED = 9600 BPS | 18 |
|   MORE PAGES....WAIT | 13C 14D |
| MUTE ALL UNITS RESND | 13A 14A |
| OTHER PARTY:FAX MODE | 19A |
| OUT OF PAPER- REFILL | 10 12 |
|   PAPER JAM | 10 12 |
| PROBLEM EXISTS..WAIT | 21A 21B 13B |
|   RECEIVE | 20A |

| MESSAGES: | DIAGRAMS: |
|---|---|
| RECEIVE AT 2400 BPS | 14C |
| RECEIVE AT 4800 BPS | 14C |
| RECEIVE AT 7200 BPS | 14C |
| RECEIVE AT 9600 BPS | 14C |
| RESEND- LINE TROUBLE | 13B 21A |
| SENDING AT 2400 BPS | 13C |
| SENDING AT 4800 BPS | 13C |
| SENDING AT 7200 BPS | 13C |
| SENDING AT 9600 BPS | 13C |
| SENDING IMAGE..WAIT | 13A |
| SETTING SPEED..WAIT | 13B 14B |
|   STOPPING .... WAIT | 11A 12 19B |
| SYS ERR1-SEE MANUAL | 14A |
| SYS ERR2-SEE MANUAL | 11B 13C 14 21A 21B |
| TELECONF. MODE READY | 1 |
| TOO LATE - REDIAL NO | 19B |
|   TRANSMIT | 20A |
|   VERIFY MODE | 8 |
| VUGRPH PRNTR UNREADY | 11A 12 |
| VUGRPH PRINTING..WAIT | 13C 14D |
| WHEN IN SPEECH - TUNE | 18 |

FIG.-9-22

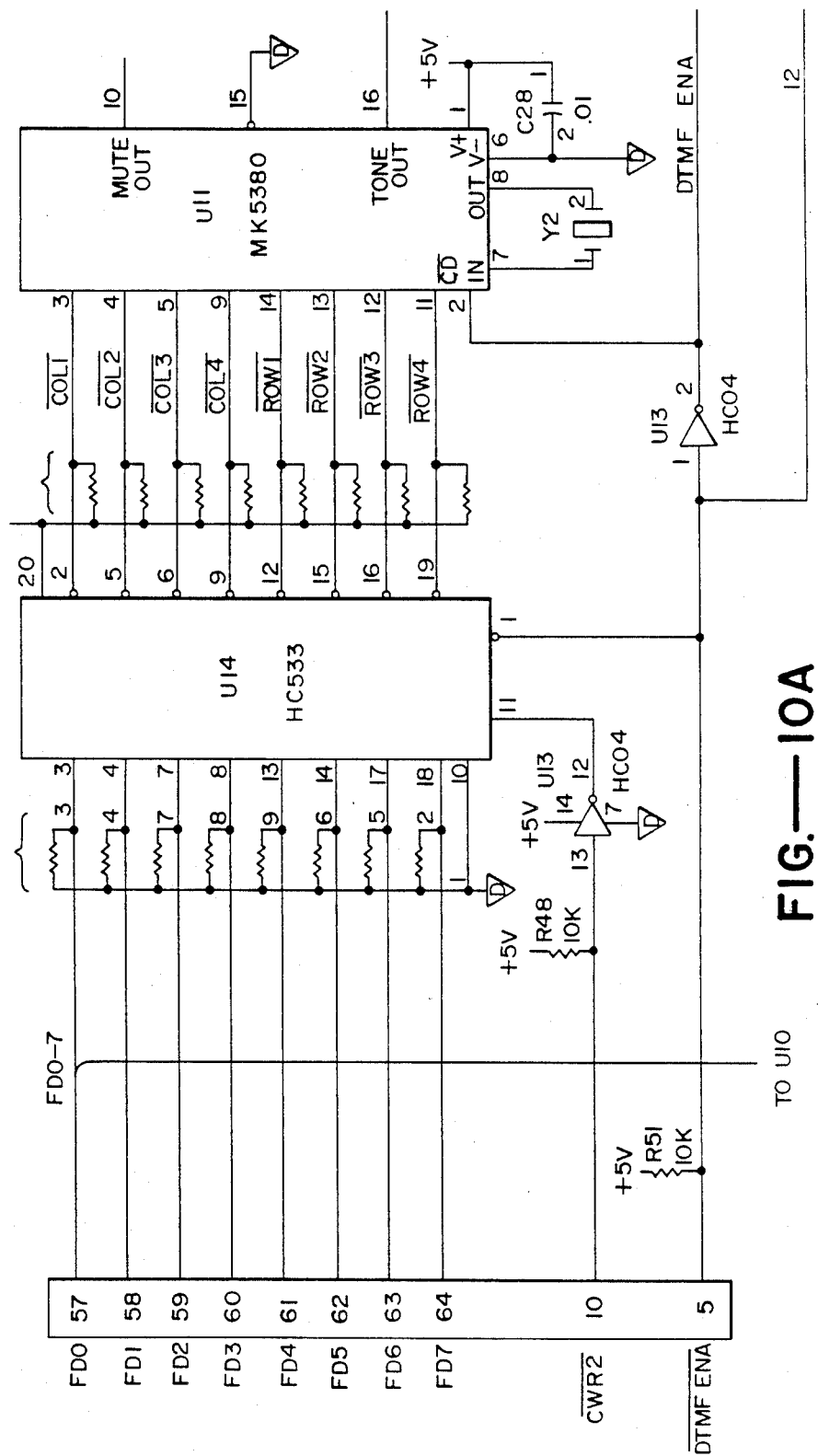
FIG.—10A

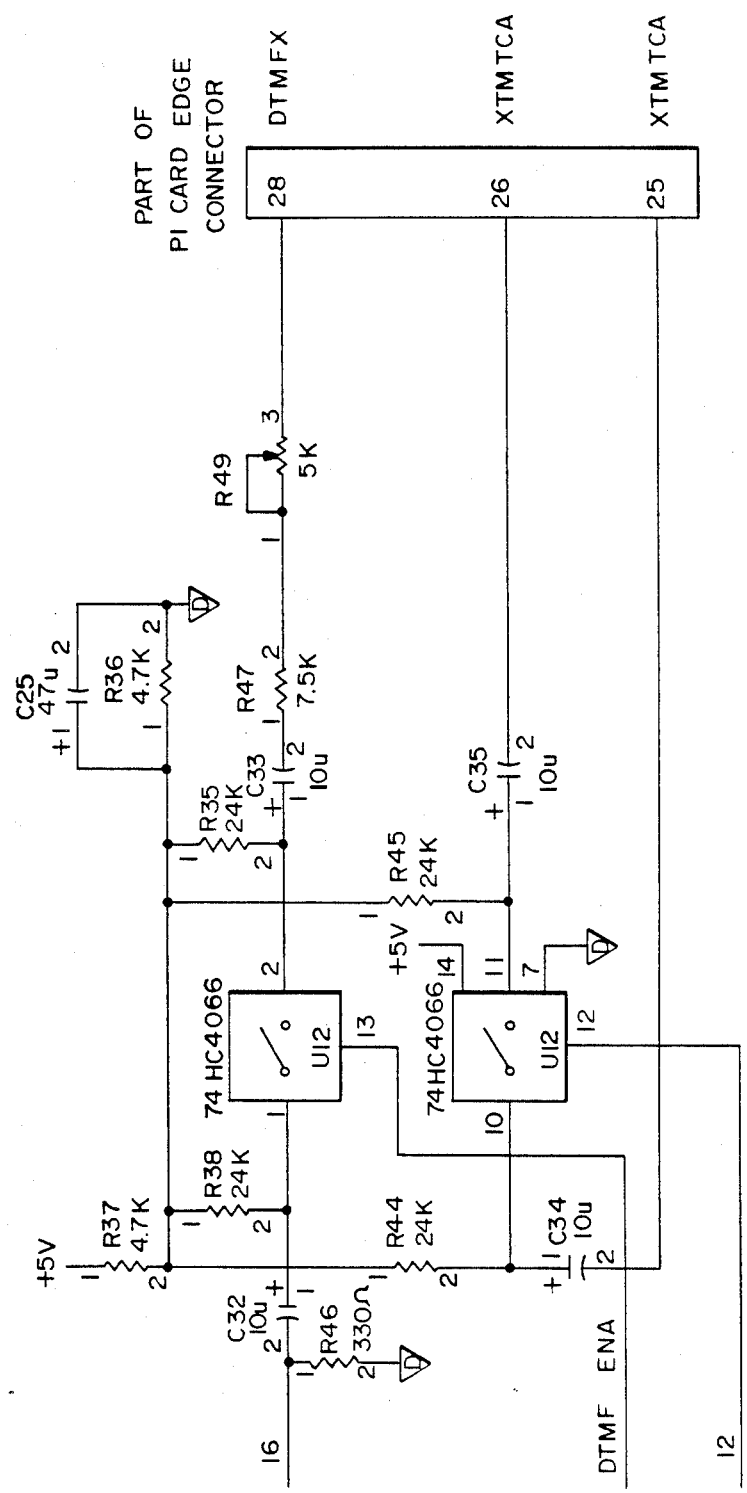
FIG.—10B

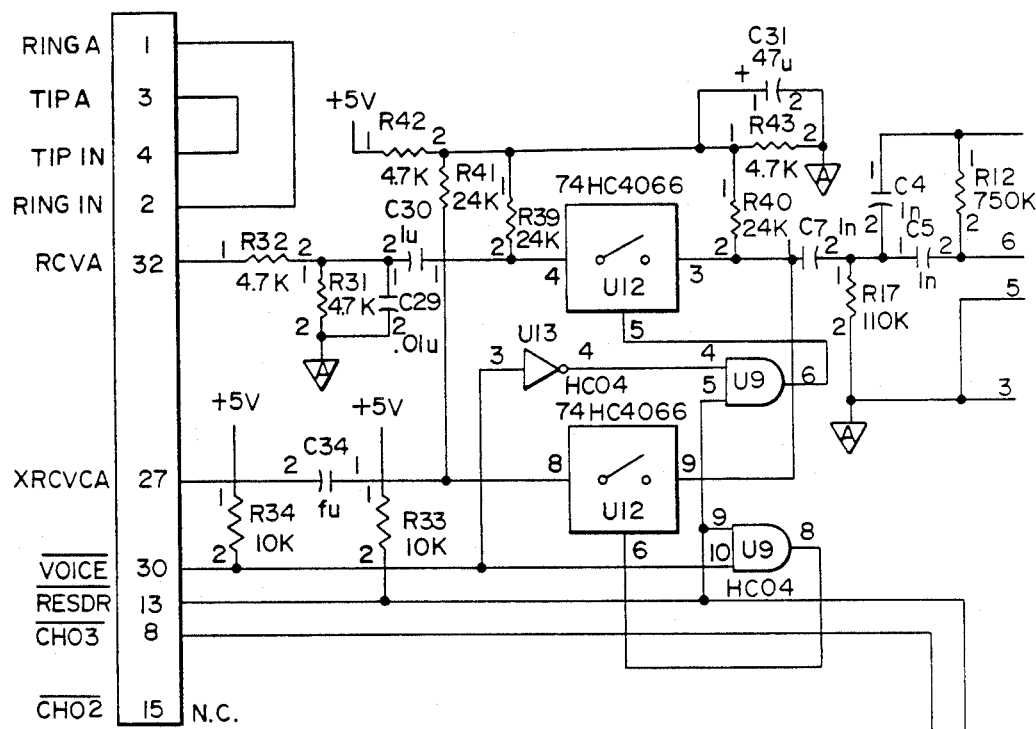
FIG.—10C

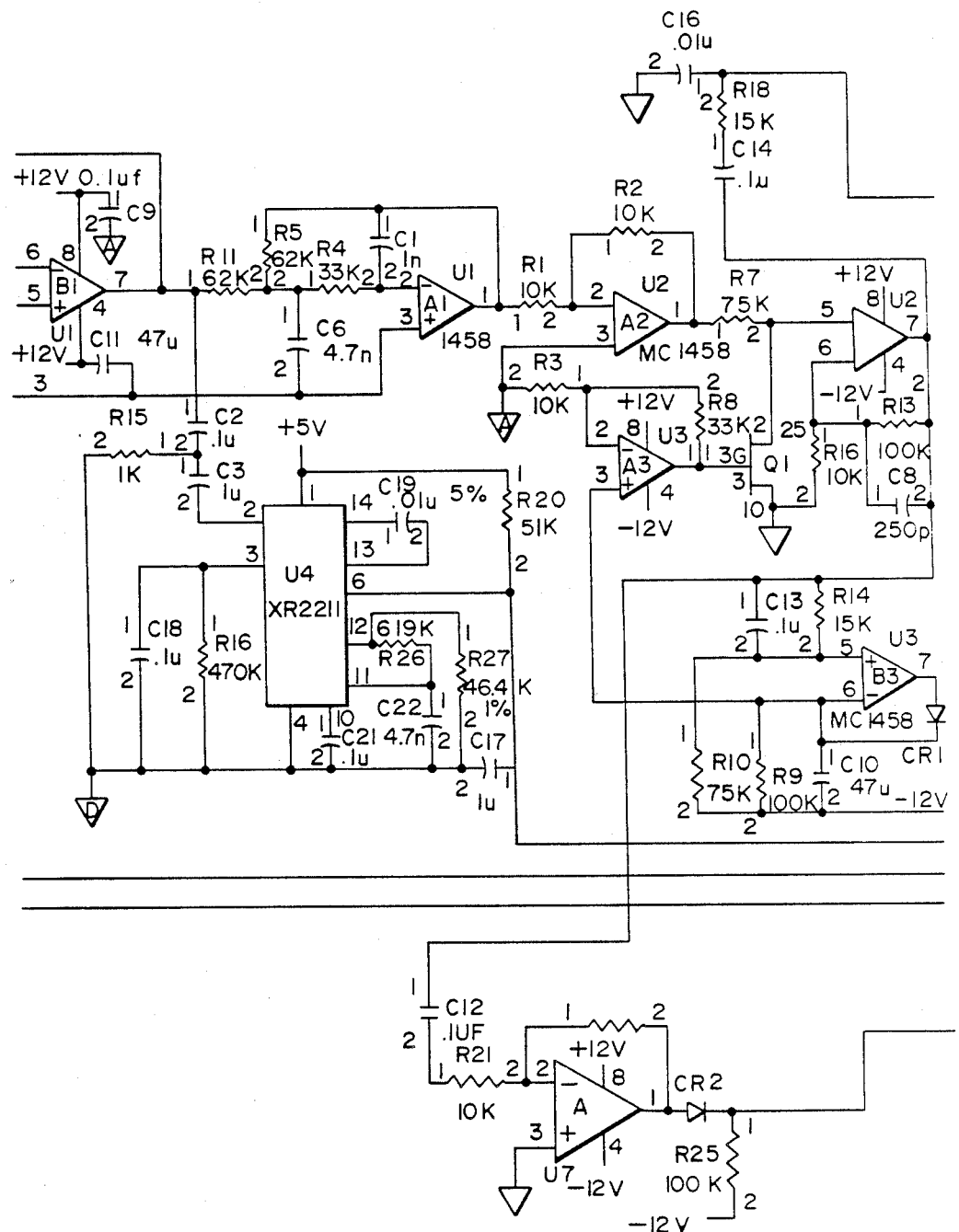
FIG.—10D

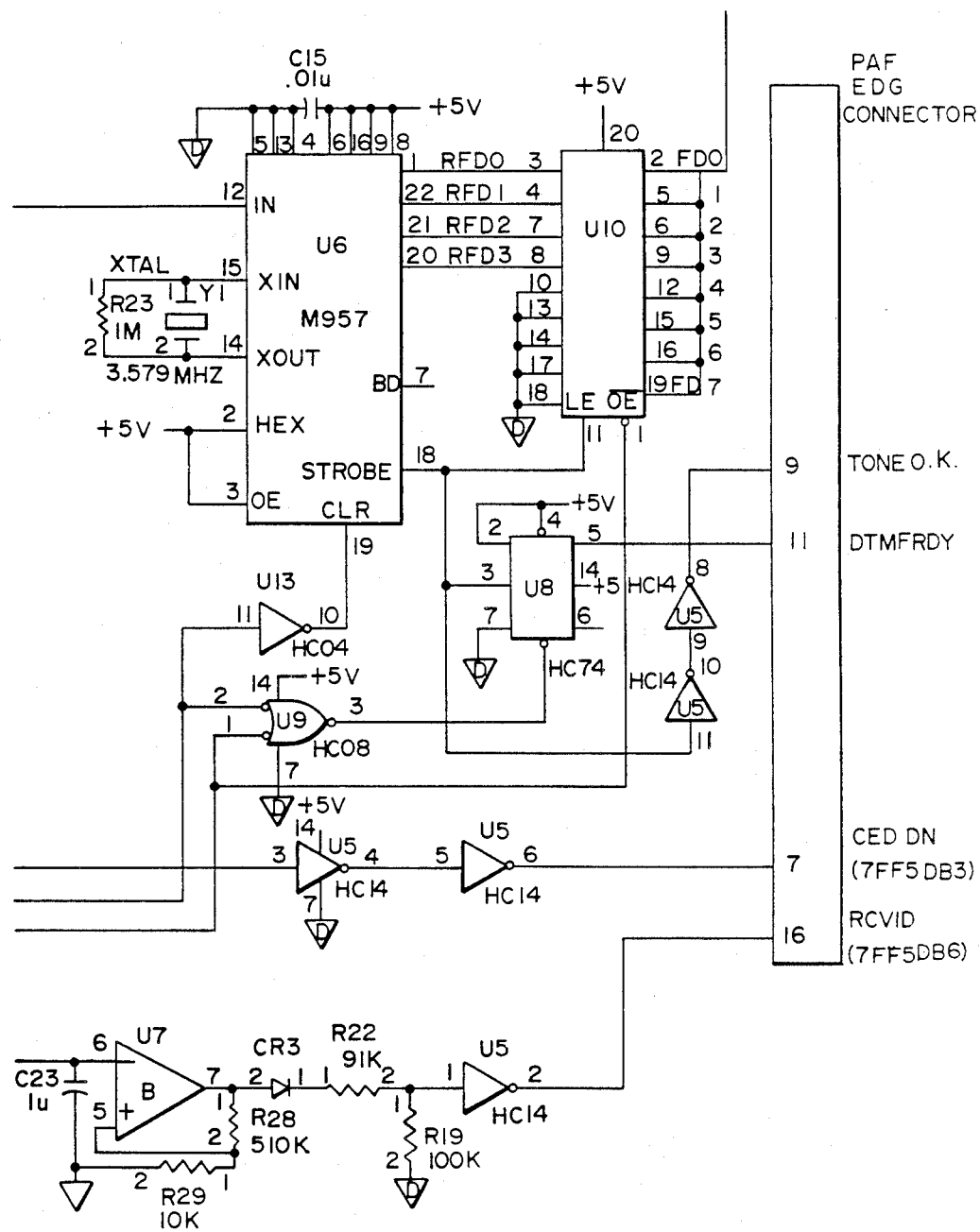
FIG.—10E

TELECONFERENCING SYSTEM

CROSS-REFERENCE TO RELATED APPLICATIONS

The present invention is a continuation-in-part of pending application Ser. No. 890,692 filed July 25, 1986, now abandoned and commonly assigned to the same assignee as the present invention.

BACKGROUND OF THE INVENTION

The present invention relates to an audiographics teleconferencing system.

As is known in the prior art, teleconferencing systems which permit users to transmit audio and image data (such as graphical information on a document) between a sending terminal and a receiving terminal at a remote location. The users of such a system can telephonically discuss the aspects of particular documents, which can be transmitted via a conventional facsimile machine from the sending terminal to the receiving terminal. However, a plurality of users (such as three or more) have in general not been able to participate in such a teleconference. The prior art has not provided the capability of establishing teleconferencing capabilities between a sending terminal and a plurality of receiving terminals. One reason for this deficiency has been a point-to-point facsimile transmission requirement, which generally requires one facsimile transceiver to communicate with only one other facsimile transceiver at a time.

A further problem with teleconferencing systems is the fact that conventional facsimile transceivers will frequently "hang up" during the conference if an error or some other type of problem occurs during document transmission. This of course is undesirable in teleconferencing systems.

Another problem in the prior art is that while teleconferencing systems can include both transmission of image information for hard copy purposes as well as for transparency (viewgraph) purposes, there has been no capability of a simultaneous type of communication aspect.

SUMMARY OF THE INVENTION

It is an object of the present invention to provide an improved teleconferencing system.

It is a more particular object of the present invention to provide a teleconferencing system which permits a sending terminal to alternatively transmit audio and image data (such as graphics information) to a plurality of receiving terminals over only one telephone line connection to enable a true simultaneous teleconferencing capability for a plurality of users.

The present invention comprises a teleconferencing system which includes a plurality of teleconferencing terminals. Any one of the teleconferencing terminals can, at any given time, be a sending terminal to transmit either audio or image information (such as a document or the like). The terminal acting as a sending terminal can alternately transmit audio and image information to the remaining receiving terminals. Each of the receiving terminals includes means for printing the transmitted image (graphics) information and, in addition, permit simultaneous audio-communications between each of the terminals in the teleconferencing system.

According to a further aspect of the present invention, the teleconferencing system includes means for effecting a interactive protocol in order to assure that each of the receiving terminals will be capable of receiving and displaying image information.

Other objects, features and advantages of the present invention will become apparent from the following detailed description when taken in conjunction with the accompanying drawings.

BRIEF DESCRIPTION OF THE DRAWINGS

FIG. 2 depicts a pictorial diagram of a teleconferencing terminal according to the present invention.

FIG. 6 depicts a diagram of a Table 1, which illustrates a call set-up according to the present invention.

FIGS. 7-1 through 7-11 illustrate an interactive protocol.

FIGS. 8A-8C depict diagrams of a Table 3, which depicts error conditions for a teleconferencing system according to the present invention.

FIGS. 9-0 through 9-23 depict state diagrams of the functional aspects of a teleconferencing system according to the present invention.

FIG. 10 depicts a schematic diagram of an energy detection circuit which forms part of the present invention.

DETAILED DESCRIPTION OF THE DRAWINGS

Figure 1:
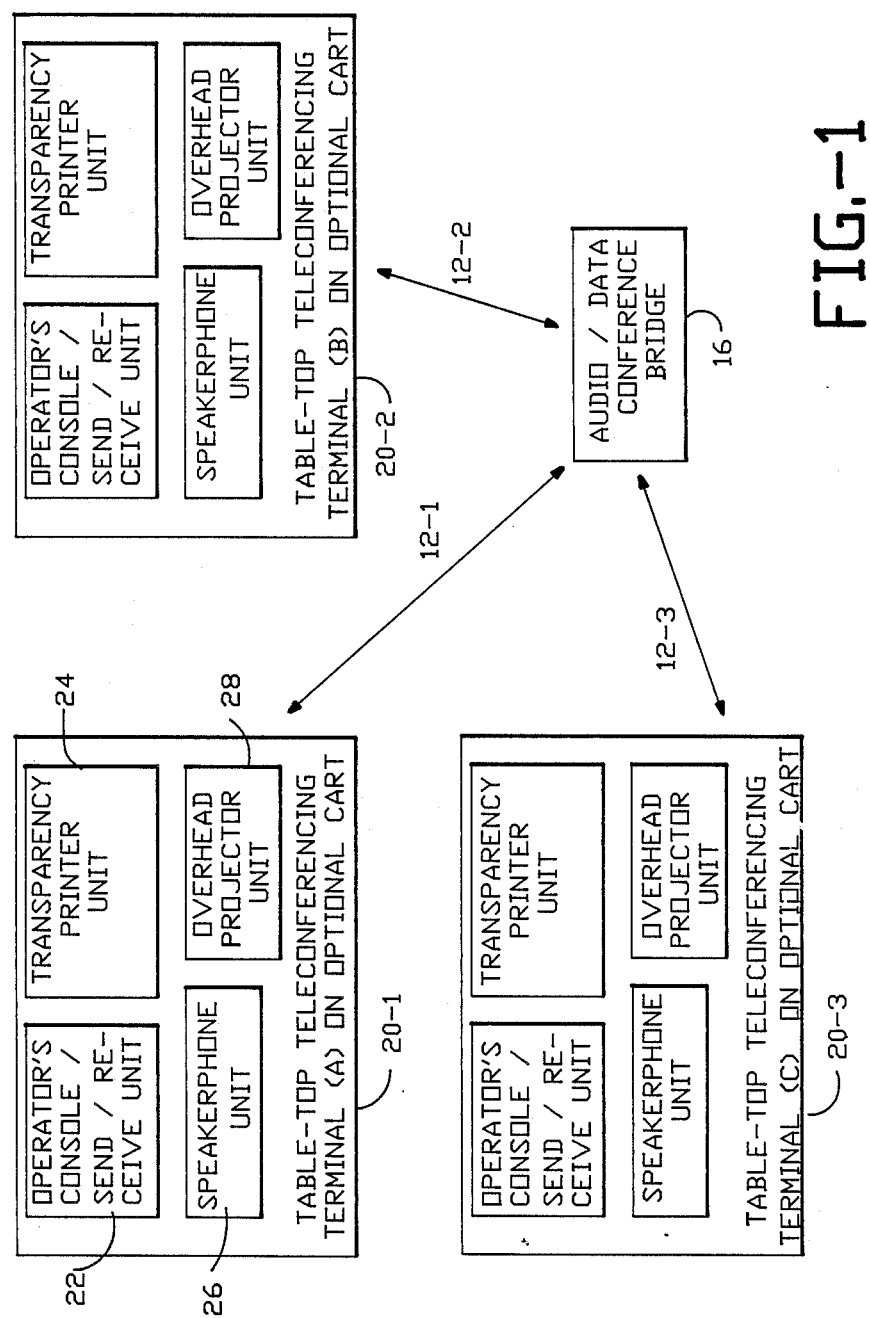
FIG. 1 depicts a block diagram of a teleconferencing system according to the present invention.

A system overview of a table top teleconferencing system will be described first in order to provide a better understanding of the aspects of the present invention. The table-top teleconferencing system according to the present invention is a low-cost system used for both teleconferencing and facsimile transmission. It can be employed in small offices as well as large conference rooms. It contains six principal components:

Conference Control (Sender/Receiver) Terminal—A telephone, specialized speakerphone, and modified facsimile transceiver integrated into a single unit.

Speakerphone—A high quality speaker/microphone unit.

Transparency Printer—A system that prints on a transparent material to provide viewgraphs for overhead projection.

Overhead Projector—Low noise, high quality, fold up viewgraph projector.

Optional Mobile Cart—Permits ready transport of the system between desired locations.

Multipoint Audio/Data Conference Bridge—Allows three or more user terminals to interchange voice and image information.

A. Conference Control Terminal

The Conference Control Terminal is a portable teleconferencing system which can be used in an office or conference room. In the simplest scenario, conferees at two separate locations each connect their units to a dial-up telephone line. One dials the other, using the dialer built into the unit; the conferee at the remote end answers (by pressing the telephone ON button) and the teleconference begins. In order to enhance verbal communication, the speaker/microphone unit of the terminal can be moved and placed upon a table or other suitable surface up to 13 feet away.

Imagery can be transmitted from one party to another at any time during the conference by inserting a document into the Terminal scanner and pressing the start button. Either party may initiate transmission. Voice is suspended until image transmission is completed, an error occurs, or one party manually aborts the transmission, whereupon voice communication is re-established.

The standard paper hardcopy output at the receiving end is typically adequate to serve as a discussion medium for conferences of three persons or fewer. For larger conferences, a transparency printer may be connected, which prints a transparency for overhead projection. If conferees wish to avoid the silent period which occurs while imagery is being transmitted, they may do so by installing an additional speakerphone system and telephone line in their office or conference room.

Research has shown that 50-80% of all audiographic teleconferences (depending upon the type of user) involve only two parties (i.e., are point-to-point). However, this implies that 20-50% of audiographic teleconferences involve three or more groups (although seldom more than five) linked together through some type of bridging system.

The teleconferencing system according to the present invention has been designed to make bridged conferences as simple to conduct as point-to-point teleconferences. Bridging is discussed in more detail below.

It is expected that the system will likely be primarily resident in a secretary's office where, when it is not being used for teleconferencing, it can be switched to a facsimile mode and used as a standard facsimile system.

In order to move the system easily between the central location where the system is stored, and offices or conference rooms as required, it is expected that users will find it convenient to house the terminal on a small mobile cart.

B. Transparency Printer

As previously noted, hardcopy is probably a sufficient medium for teleconferencing in small conferences where all parties can visually share the output (probably three or fewer persons). However, in the conference room, sharing a single hardcopy output among a large number of people is impractical. For that application, a transparency printer may be used.

The transparency printer (slaved to the printer in the Conference Control Terminal) prints a high quality viewgraph (in addition, hardcopy is output from the terminal). The overhead projector enables groups of as many as 25 or more persons to see viewgraph imagery even in a fully lighted room.

C. Overhead Projector

The viewgraphs created by the transparency printer can be satisfactorily displayed using most commercial overhead projection systems. A number of these units, however, create a high level of fan noise which will likely degrade voice communication during the teleconference. Additionally, many projectors do not possess sufficient brightness or resolution to fully utilize the high quality imagery created by the transparency printer. Finally, for mobile (cart based) applications of the teleconferencing system, a folding viewgraph projector capable of being stored in the cart is highly desirable.

One of the components which will be offered as part of the teleconferencing system will be a quiet, high brightness, high resolution, folding overhead projector.

D. Mobile Cart

An optional cart can be utilized which will facilitate the movement of the teleconferencing system between the location where the system is expected to be stored (i.e., a secretary's office) and office and conference room locations where the system will be utilized on an as needed bases.

A single cart can service office teleconferencing, or office and conference room teleconferencing. In the former (office (use), the cart might contain only the Confax Terminal located on top of the cart along with its detachable speaker/microphone unit. In the latter (office and conference room application), the Transparency Printer is located below the Terminal, in an additional pull-out drawer. The drawer serves to hide the printer from view. The Overhead Projector may be stored in a compartment on the side of the cart. There is also a shelf located at the base of the cart for storing supplies such as thermal paper, printer ribbon and transparency material.

The cart has a 15 foot power cord on a retractable reel. The telephone line cord is 10 feet long and is also on a retractable reel.

E. Multipoint Audio/Data Bridge

The Multipoint Bridge enables three or more groups of conferees to interchange both voice and data communication. Conferees can either each dial a single number to connect to the bridge (meet-me mode) or a single conferee acting as the host can phone other conferees and add them onto the bridge (add-on mode).

Interaction in a multipoint conference will be identical to that in a two-party conference. Conferees may speak to one another using the speakerphones or handsets available at each Terminal. Image communication may be initiated whenever a conferee at any end inserts a document into the Conference Control Terminal scanner and presses the start button. During transmission, voice is suspended (at all ends) and imagery is broadcast to all conferees. When the transmission is completed (or an error to abort occurs) voice communication is restored. The conference is terminated when all conferees hang up, although individual conferees may disconnect at any time during the conference.

Both network based and customer premise based bridges can be utilized.

Referring now to FIG. 1, the block diagram of a teleconferencing system according to the present invention is depicted.

According to one aspect of the present invention, the teleconferencing system 10 depicted in FIG. 1 is a table top teleconferencing system including a plurality of teleconferencing terminals 20. In the block diagram depicted in FIG. 1, the teleconferencing system 10 includes teleconferencing terminals 20-1, 20-2, and 20-3. As has been previously described, existing teleconferencing systems have not in general provided a simultaneous teleconferencing capability between a plurality of terminals. The present invention overcomes this problem by providing teleconferencing capabilities between a plurality of teleconferencing terminals.

In FIG. 1, three teleconferencing terminals are depicted. However, the present invention can provide additional teleconferencing capabilities with additional users, as will be described.

Referring again to FIG. 1, each teleconferencing terminal 20 interconnects with one another via a standard Public Switched Telephone Network communication line 12 and an audio/data conference bridge 16. The communication line 12 (such as lines 12-1, 12-2 and 12-3) could be a common telephone subscriber line connection between a respective teleconferencing terminal 20 and the audio/data conference bridge 16.

The conference bridge 16 could be provided by existing central office facilities. The aspects of a conference bridge are known in the prior art and need not be described in further detail in connection with the aspects of the present invention. Existing bridge networks are known for establishing normal telephone conference calls between a plurality of users. The present invention utilizes a bridge capability to provide a true teleconferencing capability as, for example, for three or more groups of conferees.

In FIG. 1, each teleconferencing terminal 20 includes, as depicted in terminal 20-1, a Conference Control Terminal (send/receive) unit 22, a receive transparency printer unit 24, a speakerphone unit 26, and an overhead projector unit 28. Each teleconferencing terminal can be contained in a suitable mobile cart which provides a further improved aspect of the present invention, namely a portability aspect in connection with teleconferencing systems. The portability of teleconferencing terminal 20 enables users to move from one location to another easily and quickly and yet still provide the improved teleconferencing aspects, as will be described in more detail below.

Figures 1, 7:
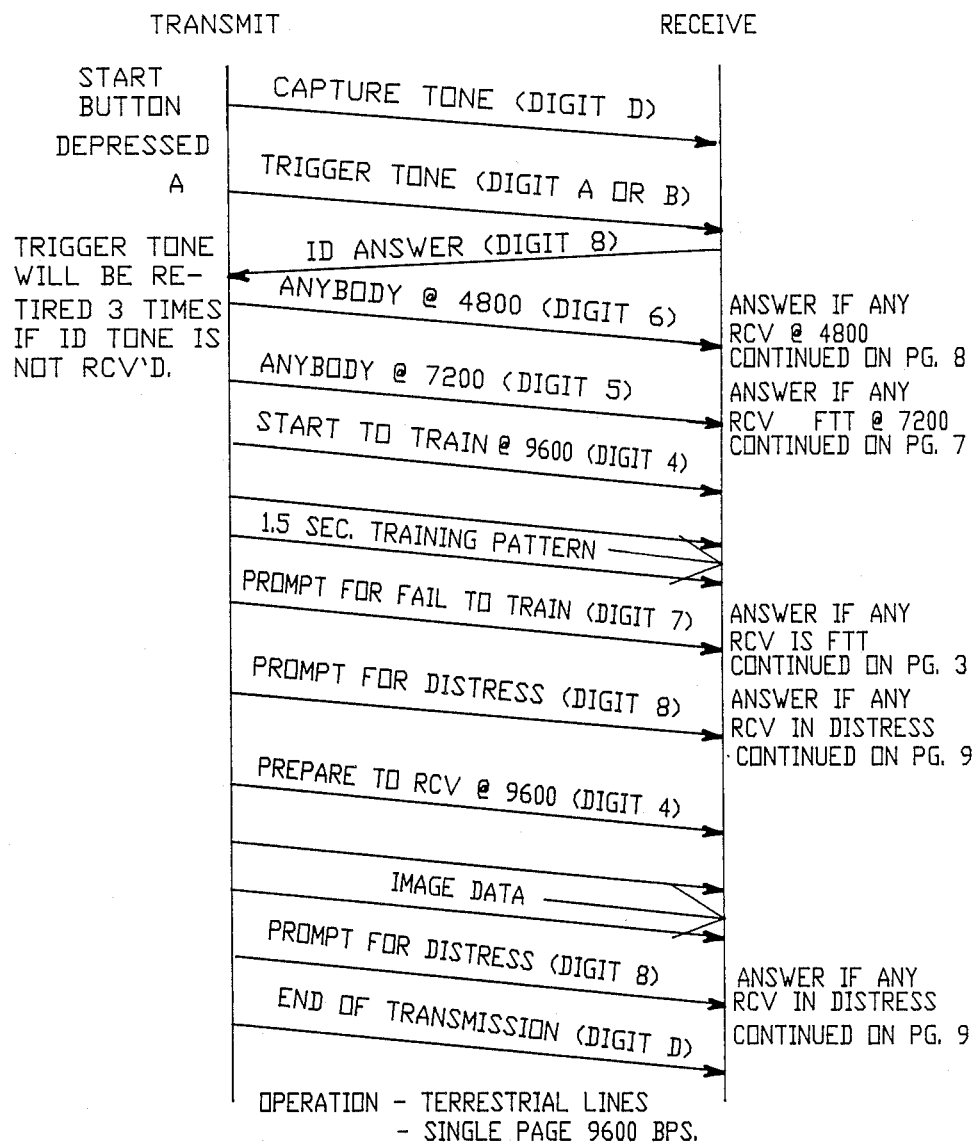
Figures 2, 7:
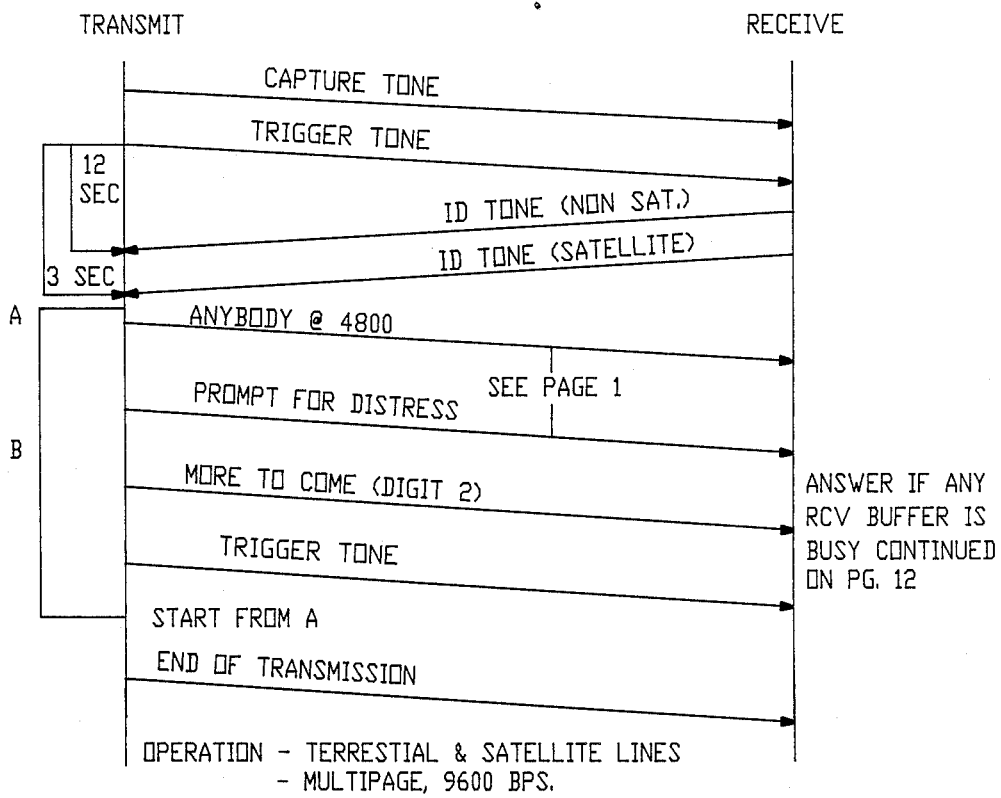
Figures 3, 7:
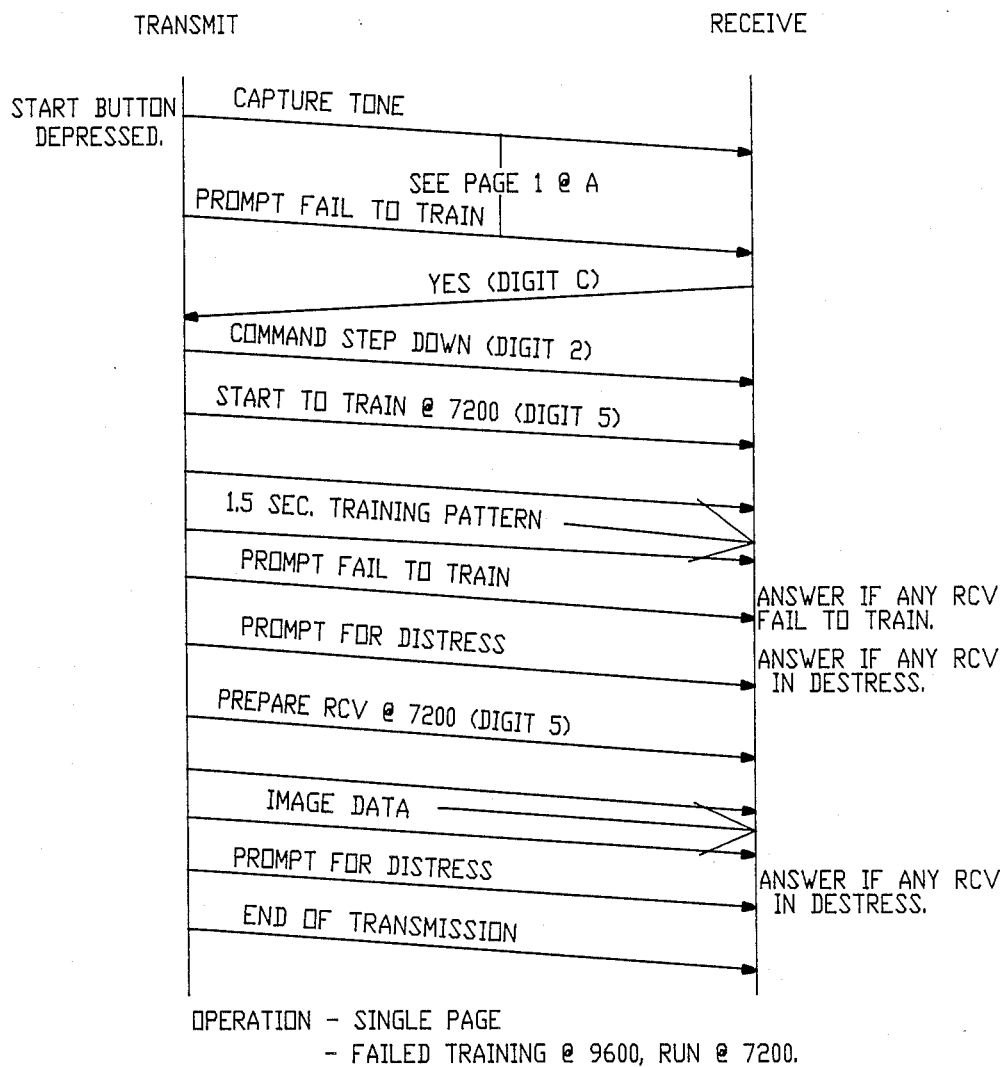
Figures 4, 7:
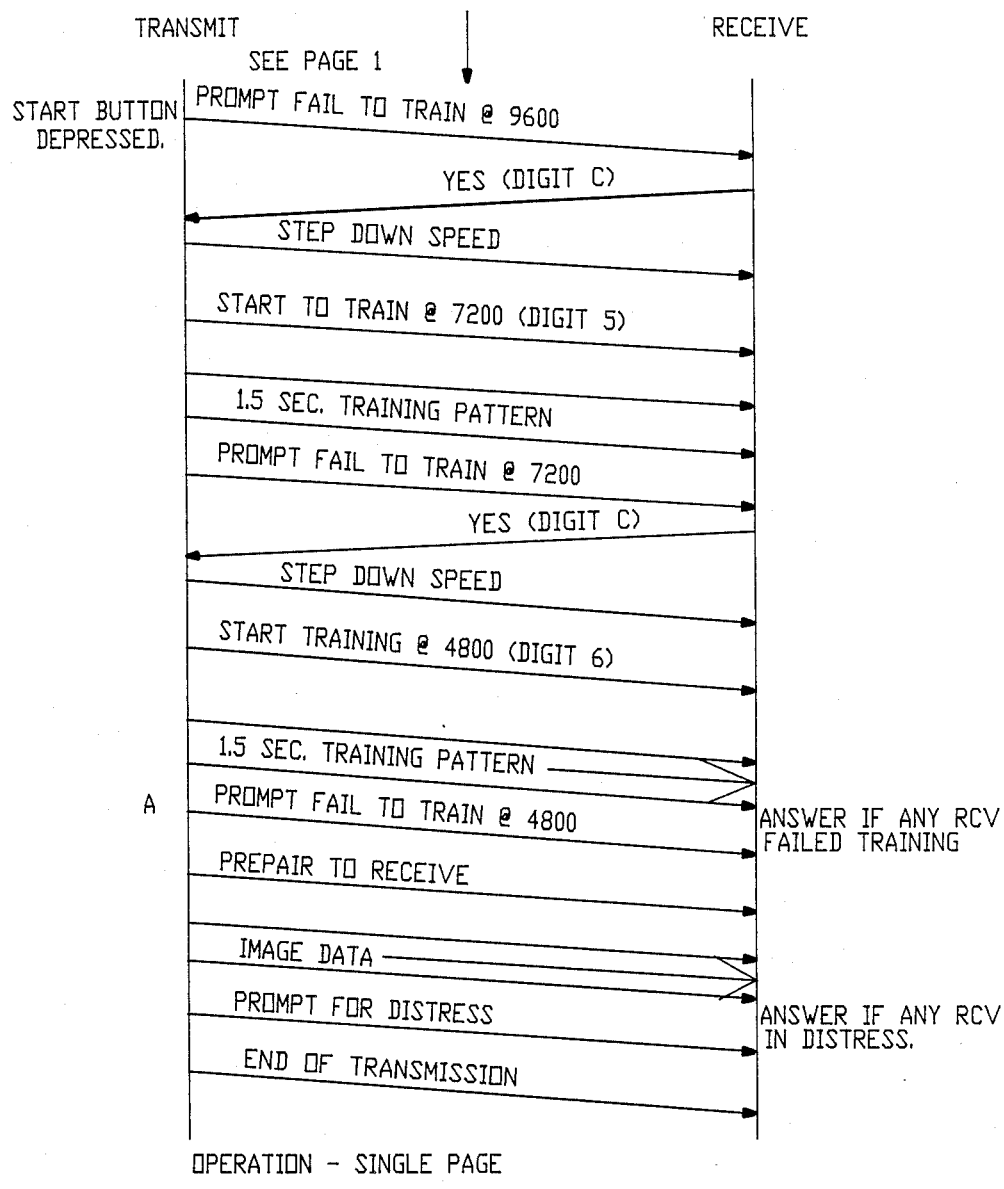
Figures 5, 7:
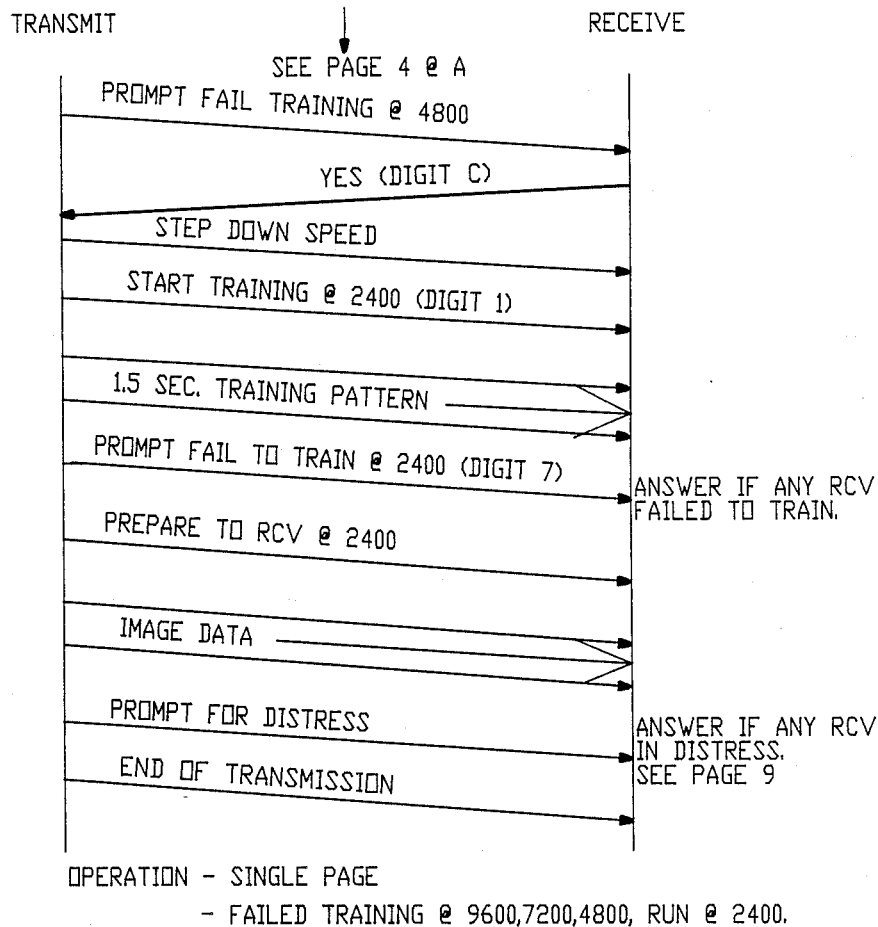

Referring now to FIG. 2, the major components of a teleconferencing terminal 20 of FIG. 1 are depicted.

The Conference Control Terminal 20 of FIG. 2 includes an operator's console and facsimile transceiver unit 22, which is utilized for transmitting/receiving image data typically which may appear on a document.

The unit 22 includes a facsimile transceiver machine 30 which can transmit or receive information on a document 36 in a known fashion. In a teleconferencing environment, a user will insert a document 36 into a facsimile 30 which is intended to be transmitted to another similar terminal at a remote location. The transmission/reception of facsimile type information is not being claimed per se, but does form part of the overall aspects of a teleconferencing system according to the present invention. The document being transmitted is received in tray 37.

The operator's console unit 22 of FIG. 2 includes a conventional telephone handset 32 and an operator controlled keyboard 34, the details of which will be described in more detail below.

Unit 22 also includes a document receptacle 38 for receiving a transmitted document such as document 36 from another teleconferencing terminal from a remote location.

Still referring to FIG. 2, the teleconferencing terminal 20 includes as another component a speakerphone unit 26, which permits, in conjunction with operator's console unit 22, a user in a teleconferencing system to speak freely with others interconnected via an audio data conference bridge 16 (shown in FIG. 1). The speakerphone unit 26 is pictorially shown in FIG. 2 for purposes of simplification of the description of the present invention.

In some teleconferencing applications, users might want to make use of a transparency capability, which is provided by a transparency printer unit 24. In addition to having a hard copy document printed for use in a teleconferencing system, users can utilize a transparency unit 24 for making viewgraphs. The teleconferencing terminal also includes an overhead projector unit 28 for projecting the transparencies provided by unit 24. Thus the present invention provides a complete teleconferencing capability with both hard copy production of documents by unit 22 and production of transparency images by unit 24 for projection by an overhead projector 28.

Figure 3:
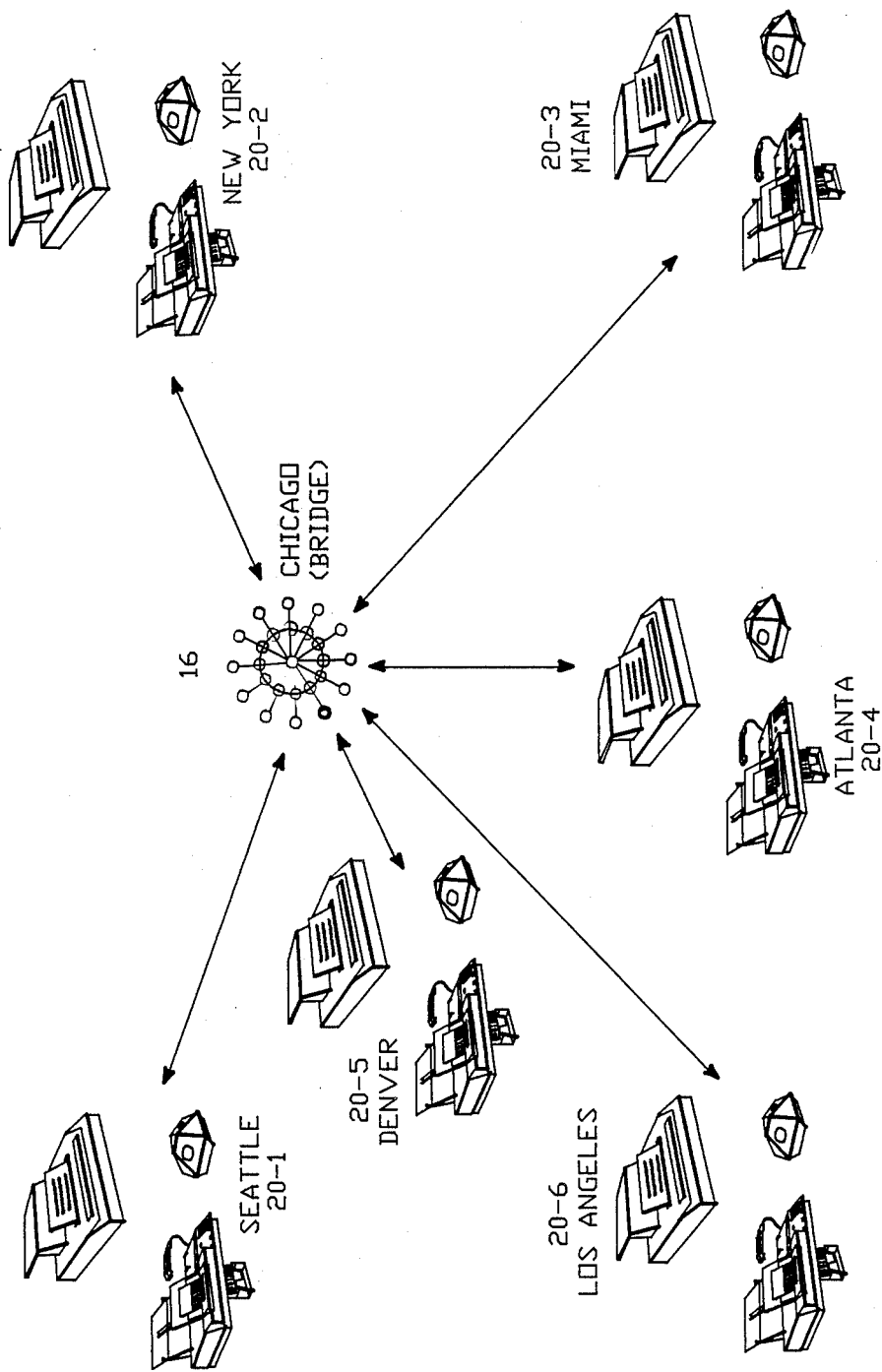
FIG. 3 depicts a pictorial diagram of a multi-site teleconference system according to the present invention.

Referring now to FIG. 3, a pictorial diagram of a multi-site conference system according to the present invention is depicted. For purposes of explanation, the teleconferencing system will include six teleconferencing terminals, as indicated by numerals 20-1, . . . 20-6. For purposes of explanation, assume that the multi-site conference includes users at the locations indicated in FIG. 3 (Seattle, New York City, Miami, Atlanta, Denver, and Los Angeles).

Assume further that a suitable network bridge is utilized at a facility in Chicago. According to the aspects of the present invention, a sending terminal such as terminal 20-1 located in Seattle will alternatively transmit audio and image data as controlled by a user to the remaining terminals 20-2, . . . 20-6.

Each terminal 20 depicted in FIG. 3 includes means for transmitting either audio or image data simultaneously to all of the other terminals (which then act as receiving terminals). Each of the receiving terminals includes means for displaying an image corresponding to the transmitted image data and means for audibly displaying the audio information corresponding to the transmitted audio data. Each terminal 20 in FIG. 3 includes the components depicted in FIG. 2 which include a Conference Control Terminal, speakerphone unit, receive transparency printer unit and overhead projector unit, as previously described.

A user can thus receive hard copy documents via a suitable Conference Control Terminal and communicate in a conference call capability with the remaining terminals via a speakerphone unit. A user at each of the terminals can also print a transparency of any transmitted image utilizing a transparency printer unit such as depicted in FIG. 2 and display that transparency with an overhead projector unit.

Each terminal 20 depicted in FIG. 3 can act as a sending terminal to effect audio and image data transmission to the remaining terminals in a teleconferencing system, according to the present invention. All participants in such a teleconferencing system can effectively communicate with one another in order to audibly communicate and, in addition, to establish image communications, typically in connection with documents.

Figure 4:
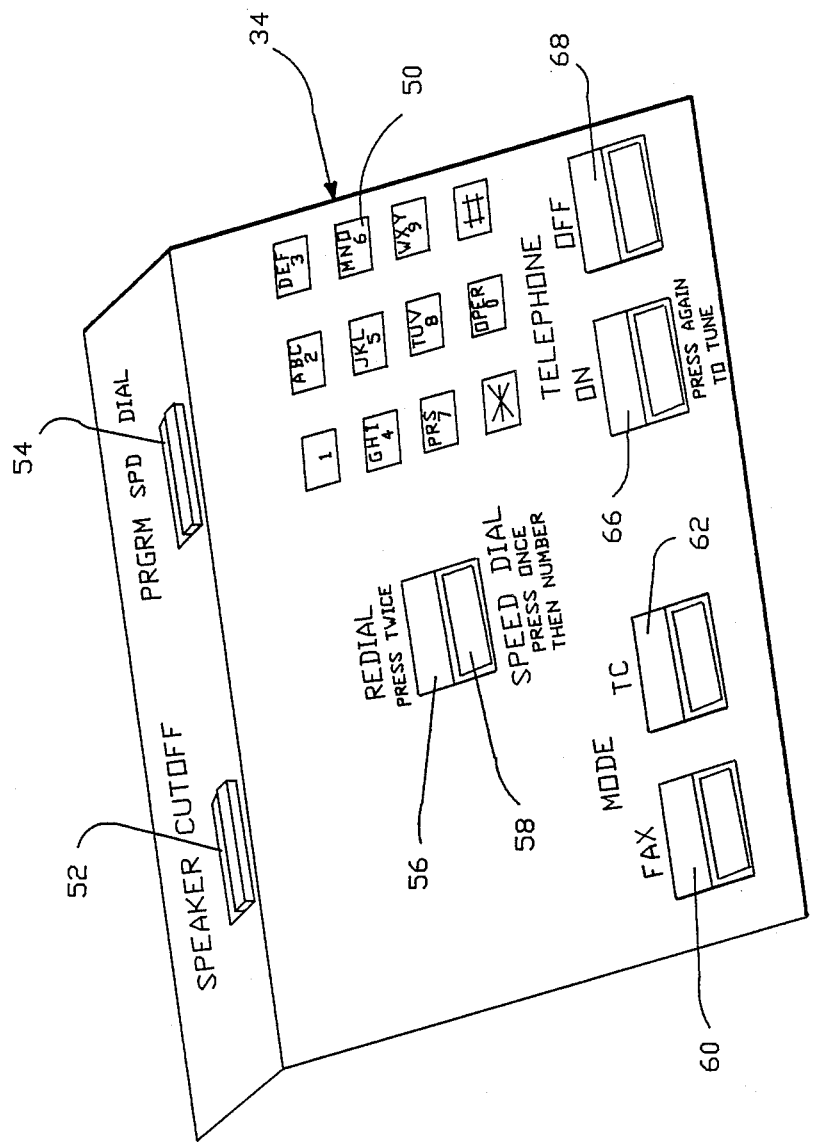
FIG. 4 depicts a partially perspective view of an operator's console control unit, which forms a portion of the send/receive unit of FIG. 2.
Figure 5:
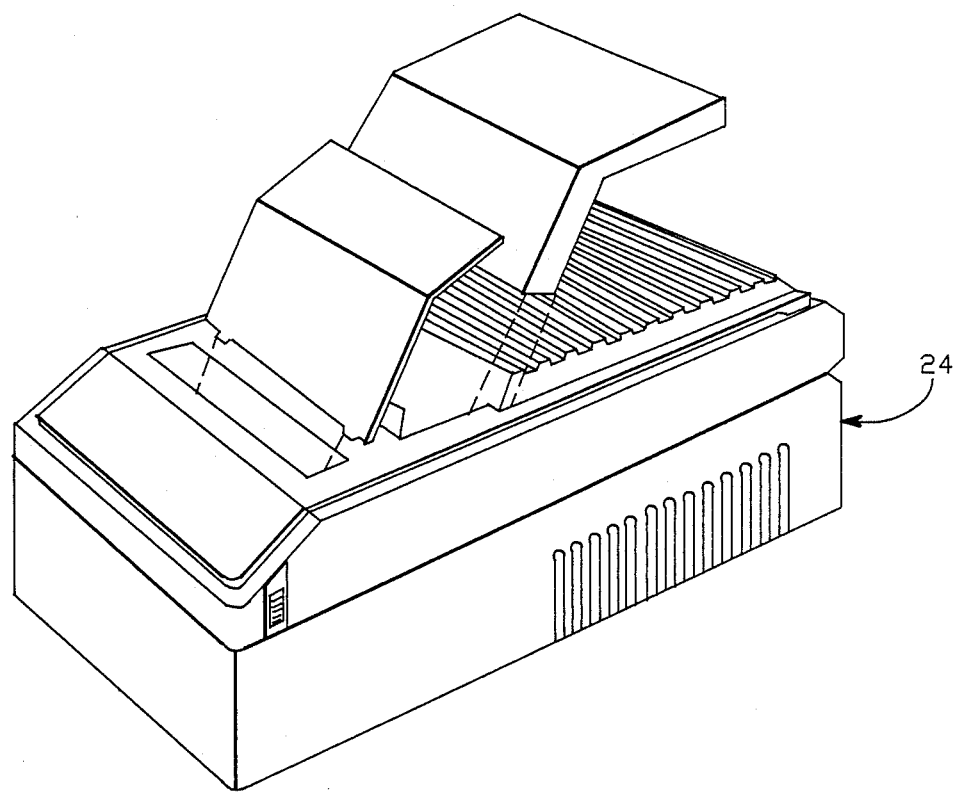
FIG. 5 depicts a partially perspective view of a transparency printer unit, which forms a portion of the send/receive terminal of FIG. 2.

Referring now to FIG. 4, a partially perspective view of the operator's console control unit 34 which forms a part of the Conference Control Terminal of FIG. 2 is depicted.

The control unit 34 includes a standard 12-key telephone dial pad 50 which, when actuated by a user, permits the establishment of communications with another terminal in a remote location through a telephone network.

The control unit 34 also includes a speaker cut-off switch 52 and program speed dial switch 54. Also, unit 34 includes a redial key 56 and speed dial key 58. The functions of keys 54-58 are well known in the art.

Unit 34 also includes keys for operating either in a facsimile mode of operation or a teleconferencing mode of operation. These modes of operation are controlled by FAX key 60 or TC key 62, respectively. As will be described, the present invention provides for multiple modes of operation.

Unit 34 also includes a telephone ON key 66 and a telephone OFF key 68 for initiating or terminating a telephone connection.

The system according to the present invention is controlled by software implementation. The aspects of the control of the present invention will be described in conjunction with the state diagrams depicted in FIGS. 9-0 through 9-23 (collectively FIG. 9).

CONFERENCE CONTROL TERMINAL 22

Figures 6, 7:
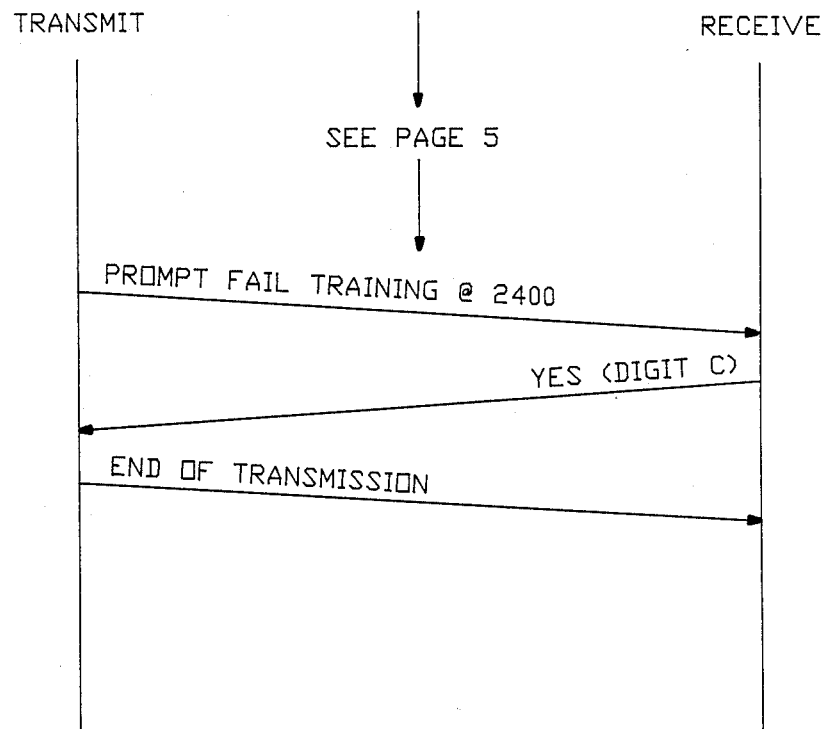
Figure 7:
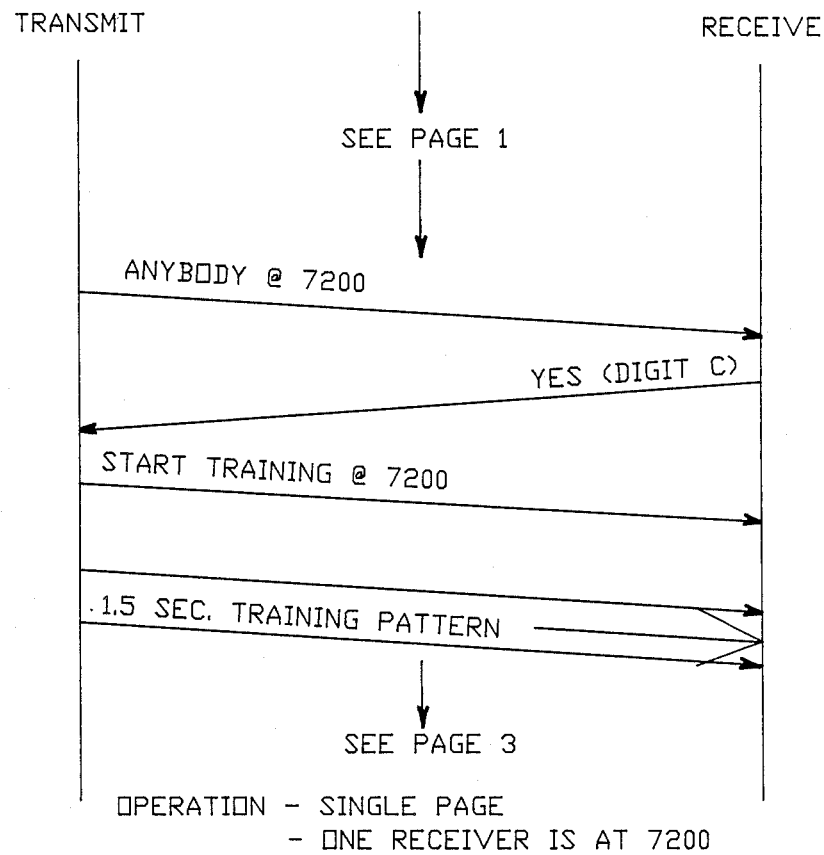
Figures 7, 8:
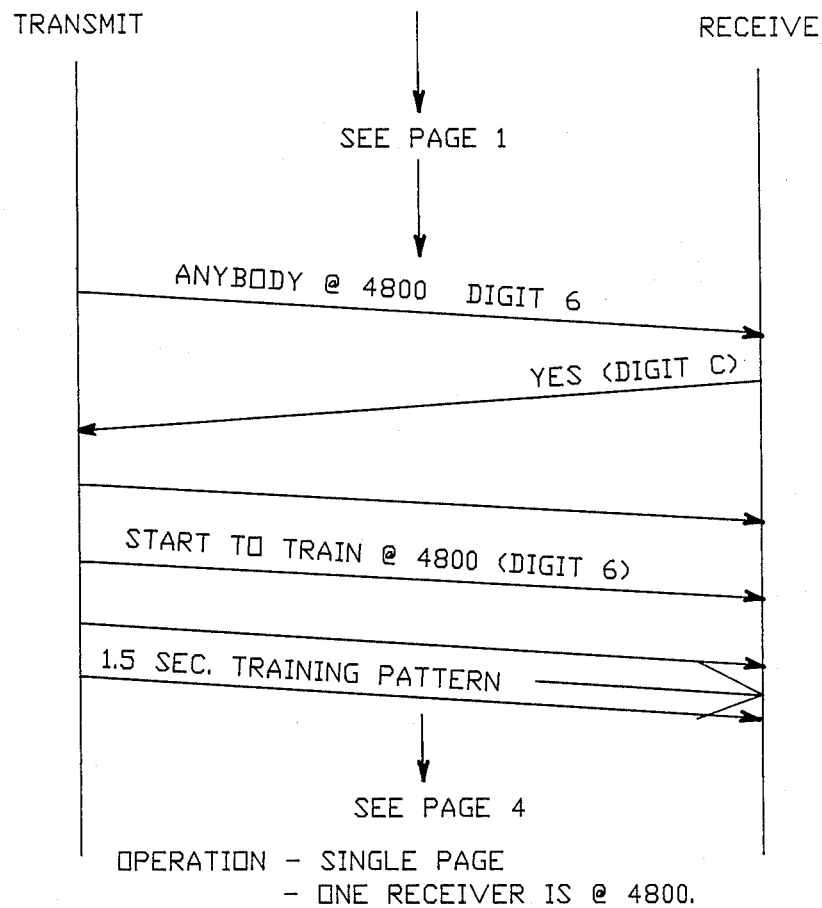
Figures 7, 8, 9:
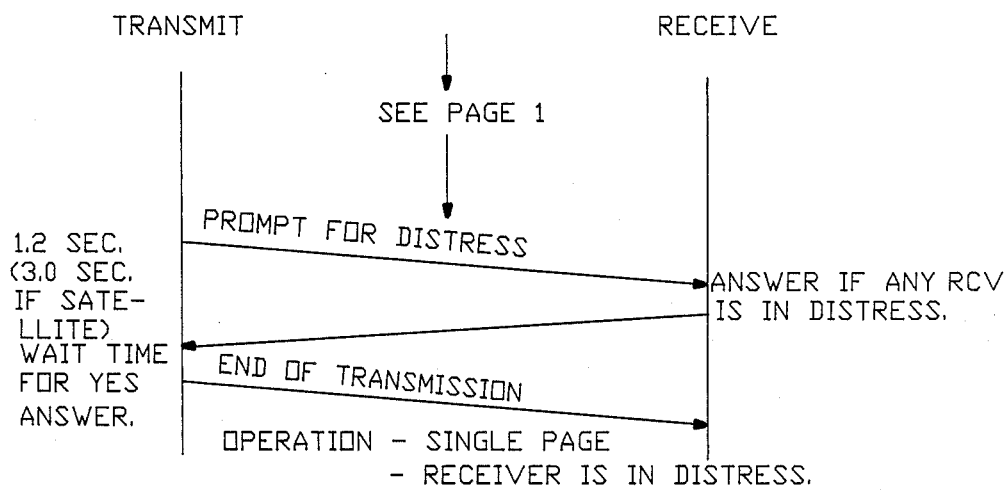

The complete operation of the Conference Control Terminal 22 of FIG. 2 is detailed in the State Diagrams shown FIGS. 9-1 through 9-23 (collectively FIG. 9). The following description provides an explanation of the major system operations detailed in FIG. 9, as well as a discussion of a number of non-operation related aspects of the system.

The Conference Control Terminal 22 is a modified Ricoh Model R-120 facsimile transceiver. All fax capabilities of that system will be utilized. In addition, software control (depicted in the state diagrams of FIG. 9) provides a powerful and user friendly teleconferencing capability consisting of:

(1) A flexible bridge handling capability.

(2) A unique protocol for setting resolution and transmission speed in a multipoint configuration. The protocol sequence is initiated simply by inserting a document into the scanner and pressing the start button.

(3) An error detection scheme and manual stop capability capable of operating from any Terminal in a multipoint arrangement.

(4) A number of tests to sense and prevent potential user errors.

(5) The facility to return to a conversation state when an error is detected or a manual stop is requested at the sending or any receiving Terminal.

(6) A series of new messages presented on the alphanumeric display to provide the user with detailed feedback regarding the state of the protocol handshaking and image transmission.

Teleconference Control Console and Speakerphone—All primary telephony and conference mode controls and indicators are located on the teleconference control console 34 attached to the side of the transceiver unit 30. Adjacent to this console is a removable speaker/microphone unit 32.

(1) Teleconference Control Console 34—The Teleconference Control Console 34 of FIG. 4 contains four primary control/display modules:

(a) Telephone Line ON/OFF Control—Depression of the ON control 66 causes the telephone line to go off-hook; the OFF switch 68 restores the line to the on-hook state. This control utilizes two separate momentary pushbutton switches within a clearly marked region labeled "telephone" (See FIG. 4). When the unit is in the off-hook state, a green indicator in the ON button lights to remind the user that the telephone is active. When the unit is in the on-hook state, a red indicator in the OFF button is illuminated. A telephone subsystem is used containing echo cancellation circuitry which requires tuning once a call is established. Tuning will be initiated by momentarily depressing the ON button 66 while the green light is illuminated. All parties must be silent for about two seconds during the tuning period.

(b) Dial Subsystem—The Confax Terminal has a standard telephone dial pad 50 with a ten number memory for speed dialing. A last number re-dial capability 56 is provided. The dial pad is capable of both pulse and touchtone dialing.

(c) Mode Selection—Mode selection is accomplished by pressing one of the buttons, one labeled "FAX" 60 and the other labeled "TC" 68. The buttons have a momentary action with a green lamp situated in the center of each button. The active mode is indicated by illumination of the green lamp.

(d) Speaker Cutoff—In teleconferences where an auxiliary sound system is used (on a separate telephone line) and the speakerphone unit of the telephone subsystem is left attached to the Conference Control Terminal, it may be desirable to prevent audio signals to and from the speakerphone unit 26. Otherwise, crosstalk between the two sound systems may disrupt the conference. A "speaker cutoff" switch 52 is provided on the Confax control console 50 to perform this function. The switch is an alternate action, momentary pushbutton with a yellow lamp placed in the center of the button. The lamp is illuminated when the speaker/microphone module is cut off. The switch is only operable when the telephone subsystem is off-hook; i.e., the telephone ON lamp 66 is illuminated. When the telephone subsystem is returned to the on-hook state (i.e., telephone OFF lamp 68 is illuminated), the speaker cutoff function is reset to the OFF state, extinguishing the cutoff lamp 52. Handset audio shall not be controlled by the speaker cutoff button.

(2) Speakerphone—The speakerphone 26 of FIG. 2 is a high quality unit which includes an echo cancelling function and automatic adjustment of gain to reduce the audible effect of background noise.

The speaker/microphone unit of the speakerphone is capable of being removed by up to 13 feet from the Terminal. The line cord to the speakerphone is recoiled into the Conference Control Terminal using a spring activated spool winder.

Speaker/Microphone Unit—The speakerphone 26 contains a 4" speaker which is oriented output down over a cone-shaped dispersion baffle. Above this speaker is included a microphone unit containing two microphones aimed horizontally along the surface of the table encased in two round tubes which are set at a 90 angle to each other. The sensitivity of the microphones is controlled by an AGC unit located in the speaker/microphone unit.

The speaker/microphone unit of the speakerphone has two controls for mute and volume.

Mute—The speaker/microphone unit contains a momentary pushbutton type control which, when held down, cuts off input from the microphone. When the mute control is depressed, a red lamp on the speaker/microphone housing flashes.

Volume Control—A rotary control is provided to adjust the volume of the speakerphone. Audio is still audible at the lowest setting.

(3) Transparency Printer jack—A jack to connect the Transparency Printer is located at the rear of the transceiver unit.

The Conference Control Terminal is connected to the public switched telephone network (PSTN) by insertion of a cord containing an RJ11C plug into a suitable modular receptacle. The telephone cord, approximately 10 feet in length, is located at the rear of the Terminal. The cord can be retracted into the optional cart using a recoil winder.

System Modes of Operation a. Modes—The Terminal is capable of being set into two different modes:

(1) Standard CCITT compatible facsimile (Fax Mode)

(2) Teleconferencing (TC Mode)

b. Mode Upon Power Up (1) Telephone On Hook:

(a) Attempt to dial out—When the system is powered up, the system is in a "no mode" state. The message "Choose Mode" blinks on a panel display. In addition, neither mode lamp is lit. If the user attempts to go off-hook (by pressing the ON button of the speakerphone) the off-hook state (dial tone) does not occur. A brief buzz sounds, warning the user that an inappropriate action was taken. In addition, to attract attention to the message on the display, the system beeps for a period of 5 seconds. This state (blinking message and denial of off-hook access) continues until a mode is chosen.

When a mode is chosen (by pressing one of the mode buttons) the lamp, associated with the mode button depressed, is steadily illuminated and the blinking message on the panel display ceases. The user can then go off-hook by pressing the telephone ON button—no warning shall sound.

(b) Incoming Call—If there is a call to the Terminal while it is in the above state, the system is automatically switched to the teleconferencing (TC) mode. The TC lamp blinks, alerting the user that the system was forcibly placed in that mode. The call may be answered by pressing the speakerphone ON button and conversation (and all other TC functions) may take place.

c. Local Terminal Mode Change After Multiple Rings Without Answer:

(1) If the local Terminal is in the Fax Mode, it auto-answers as soon as possible after the first ring (standard capability).

(2) If the local Terminal is in the teleconferencing mode, the local Terminal mode is changed to the auto-answer Fax Mode if there is no answer in response to an incoming call after two to six rings. The Fax Mode lamp blinks to alert the local user that the mode has been changed from its original state.

d. Change of Mode—The mode of a Terminal may be changed if the Terminal is in one of three different states:

(1) Idle state.

(2) Any speech state.

(3) When a remote Fax Terminal has been reached and has not yet timed out (is still emitting a CED or DIS response). If all Terminals are changed to a similar mode (i.e., all Fax or all TC), image transmission between Terminals may be made without error. If, however, one or more Terminals is in a mode different than that of another with which it is connected, the Terminals will be in a mixed mode state. Transmission in a mixed mode state will lead to one of the errors described in Table 3 (FIG. 8).

If either mode button is depressed at any other time, a brief buzz sounds, signalling the user that an inappropriate action was taken.

In order to prevent a mixed mode state from occurring, two safeguard routines have been devised:

(a) Fax Call Timer—When a call is made from a Terminal in the Fax Mode and the start button is not pressed within 120 seconds, it is assumed that the Terminal in the Fax Mode is in a conversation state and should be in the TC mode. A warning message "Verify Mode" is displayed for 5 minutes on the panel display of the Terminal in the Fax state.

The logic underlying this approach assumes that a user attempting to reach a remote facsimile unit (or Terminal in the Fax Mode) will typically send a document within 120 seconds and, therefore, no warning will be displayed. On the other hand, two conferees engaged in a teleconference will rarely send imagery within the first 120 seconds of interaction; the warning message should cue the user whose Terminal is in the Fax Mode to change it to the TC Mode, avoiding the error when imagery is sent. Pressing either mode button on the Terminal in the Fax state shall cause the flashing warning to cease.

(b) Automatic Change From TC to Fax Mode During An Attempted Transmission—In order to prevent Error 2 (Image sent from Terminal in TC mode to Terminal in Fax Mode) from occurring, an additional safeguard routine has been devised. When a transmission is attempted from a Terminal set in the TC Mode to a Terminal set in the Fax Mode (which auto answers), the Terminal in the TC Mode is automatically changed to the Fax Mode upon receiving the CED tone of the remote unit. The Fax lamp of the changed Terminal is set to a flashing state to signal the user that the mode of the Terminal was changed automatically by the system.

The CED tone emitted by the remote Fax Terminal lasts for approximately 2.7 seconds. It is the cue to the local user to press start in order to begin image transmission. It is also the cue used by the Error 2 (Transmission from Terminal in TC Mode to Terminal in Fax Mode) prevention safeguard routine. After the CED signal is detected by the safeguard routine, a timer is set. The local user has 10 seconds to press start from the time CED ends or the safeguard routine is not invoked. In this latter case, Error 2 will occur if the local user presses start to begin image transmission.

The precise consequences of Error 2 are described below. At about 16 seconds after the Fax Terminal starts emitting a CED tone, an alarm will sound at the Fax Terminal and the message "AnswerPhone/Press-Stop" will be displayed. If the Fax party goes off hook and presses stop, the Fax party will probably hear the TC protocol and transmission sequence and hang up. If the Fax party chooses to hold the line through the TC protocol and transmission sequence (about 40–60 seconds), voice communication will be possible after the TC Terminal returns to an audio state. If, however, the Fax party does not respond to the alarm or hangs up upon hearing the TC protocol-transmission sequence, it is likely that the Fax Terminal will time out (in approximately 33 seconds after CED begins) and disconnect. The local user, who will likely still be off hook, will then hear telephone disconnect response (such as PBX ticking, dial tone, hold tone or central office announcement). The TC party will probably hang up.

If Error 2 occurs during manual Fax transmission (where the TC party presses start first), or when the Terminals are in a mixed mode speech state, it is possible that CED tone will not be sounded at the Fax Terminal and the Error 2 prevention safeguard will not be invoked. This condition will lead to the same outcome and options as if the TC party fails to press start within 10 seconds of the end of the Fax CED tone. The Fax Terminal (as noted above) will produce an alarm and message after 16 seconds and dependent, upon whether the Fax party responds to the alarm and holds or disconnects, either speech or a Fax Terminal disconnect will occur.

It is impractical to guard against all user errors. The safeguards just described will not be invoked upon certain occasions. For example, if, during a speech state, a user accidentally switches to the Fax Mode while the mode other Terminals to which the user is connected are in the TC Mode, the Fax Timer will not be initiated to warn of the mixed mode condition. Users must, therefore, exercise caution in changing modes during a speech state.

B. Facsimile Mode

1. Standard Facsimile Feature—The Terminal when in the Fax Mode will contain the standard features incorporated in the standard facsimile transceiver, such as the Ricoh model R120. The system will operate according to CCITT protocol for facsimile transceivers in standard G3, G2 or G1 mode.

2. Call Set-up—Table 1 depicted in FIG. 6 details the system interaction which occurs when a call is placed from a Terminal set in the Fax Mode to other remote systems.

a. Terminal in Fax Mode to Remote Fax Unit—When a call is made from a Terminal in the Fax Mode to a remote Terminal in the Fax Mode, the user should hear the CED response signal of the remote system, press start and image transmission should take place in the normal manner.

In standard fax machine operation in which a standard telephone is used to dial the remote party, the local party typically places the receiver on hook after initiating transmission. Upon completion of image transmission, both remote and local units disengage and the telephone connection drops automatically. The local user need not go on-hook (press the OFF button of the speakerphone) in order to terminate the call.

It is possible that the local user set in the Fax Mode may be of the mistaken belief that his Terminal is set in the TC Mode and intends to reach a remote TC Mode Terminal in order to set up a teleconference. Upon hearing the remote Fax response, the local user will likely realize the error; he has two options at this point: he may hang up (go on-hook) aborting the call or he may continue to hold the line in an attempt to communicate with the remote user.

The latter can take place in two ways: About 16 seconds after the remote unit has responded, it will begin to sound an alarm (remote end). If a user at the remote end hears the alarm and presses the speakerphone ON button and the stop button on his Terminal, verbal communication may take place between the users. The mode mismatch can then be discussed and corrected. The local user can also choose to transmit an image (likely a written message) to the remote user. He must, however, do so within 30 seconds. If he waits longer than this period, the remote fax machine disconnects.

b. Terminal in Fax Mode to Terminal in TC Mode (or Telephone)—If the remote unit reached is a Terminal in the TC Mode and a user at the remote end answers the call, the two parties will be in a mixed mode conversation state. If, during the ensuing conversation, the local user does not switch his Terminal to the TC Mode (or the remote user does not switch to the Fax Mode), and attempts to send imagery to the TC Terminal (or a Telephone) Terminal, a serious error (discussed in a following section) will occur. The Fax Call Timer routine, previously discussed, should prevent many of such mixed-mode transmission errors from occurring. Conversation is ended when both parties go on-hook (by pressing the speakerphone OFF button). If the remote TC unit is on but is not answered, it will switch (as previously discussed) to the Fax Mode after 2-6 rings. The local user may then transmit imagery (upon hearing the remote unit CED tone) in the manner previously discussed where a remote facsimile unit is accessed.

c. Terminal in Fax Mode to Fax Unit in Manual Answer Mode—The Ricoh Model R120 and several other facsimile units can be set in a manual mode. If a Confax unit set in the Fax Mode (either automatic answer or manual) phones a fax machine set in a manual answer mode, the phone will ring at the remote end. If the remote party answers, the parties can converse. Imagery can be sent by a manual procedure. The typical approach is for the receiving machine to press start, producing a CED tone. The sending party, upon hearing this tone, is cued to press start, transmitting the image. It should be noted, however, that despite the fact that this is the recommended procedure, the actual order of pressing start is inconsequential so long as the maximum hold time (about 33 seconds) is not exceeded.

d. Terminal in Fax Mode to Meet-Me Bridge—If the remote unit reached is a meet-me bridge, the bridge will answer the call unless full or locked to new entrants (in which case, the user will hear a busy signal); the user will join other users on the bridge and will be in a conversation state. This condition parallels that of reaching a Terminal which is set in the TC Mode. If an attempt is made to transmit imagery, all conferees on the bridge having Terminals in the Fax Mode must first switch to the TC Mode or a mixed mode error will occur. The Fax Timer is once again used to attempt to minimize this form of mode mismatch error. Any user may disconnect from the bridge by dropping the call (that is by going on-hook).

e. Terminal in Fax Mode to Add On Bridge—In add-on bridging, one of the members of the conference acts as the host, adding every other member of the conference to the bridge. The host also controls interaction during the conference. If the host reaches a Fax Terminal in auto answer mode and hears the CED response tone, he will be very unlikely to add the Terminal to the bridge. Mixed mode transmission errors should, therefore, be far fewer in add-on bridging than in meet-me bridging where a caller having a Terminal in the Fax Mode may call and join the bridged conference.

f. Terminal in Fax Mode to Telephone—If a local Terminal in the Fax Mode reaches a telephone, the units will be in a conversation state if the telephone is answered. An error will occur if there is any attempt to transmit imagery from the Fax Terminal. The communication state is ended when both parties go on-hook.

3. Error Conditions—As previously noted, an error condition will arise when a transmission is attempted from a Terminal in one mode to a Terminal in a different mode. These are detailed in Table 3, which is depicted in FIG. 8.

a. Terminal in Fax Mode to Terminal in Bridged or Non-Bridged TC Mode—An attempt to send imagery from a Terminal set in the Fax Mode to one set in the TC Mode leads to Error 1 (reference Table 3). This type of error typically arises when a conferee has mistakenly left his Terminal in the Fax Mode, believes it to be in the TC Mode, and attempts to send imagery to a remote Terminal in the TC Mode. The Fax Call Timer discussed previously was instituted to prevent this type of error.

The local party, when reaching a Fax machine in the auto answer mode, may either hold the line in hopes that the party on the Fax end responds to the warning message which is displayed or the local party may change to the Fax Mode in order to send a written message to the remote Fax Terminal.

As previously discussed, about 16 seconds after the remote Fax Mode Terminal answers, an alarm is sounded at the remote end. If the local party is holding the line and a user at the remote end presses stop and goes off hook, the two parties will be in a verbal communication state and may discuss and correct the mode mismatch. Alternatively, the local user may switch to the Fax Mode to transmit a written message to the remote unit if such transmission takes place within about 33 seconds. After that period, the remote Terminal will not respond to a start command and will disconnect. (The local user should then go on hook). The local user must depress the TC Mode button to return to the TC state.

b. Terminal in Fax Mode to Telephone—An attempt to send an image from a Terminal set in the Fax Mode to a telephone set also results in Error 1. The Fax Timer (which will also be present in this type of interaction) should serve to minimize this error.

c. Scanner and Paper Jams/Out of Paper or Transparency Printer Donor or Receptor Material—If a scanner or paper jam should occur, or the printer or Transparency Printer unit is out of paper or donor/receptor material, it is necessary for the conferee with the offending Terminal to clear the jam, or add paper or donor/receptor material.

d. Dropped Telephone Connection—This error state should be readily correctable. Both parties will go on hook; one will redial the other (the redial capability should prove of assistance if the party redialing was the original caller).

4. Transparency Printer Output—No transparency output (discussed in a following section) is produced when the system is in the Fax Mode (even if the transparency pringer is connected and ready) with the exception that transparency output shall be produced when a local copy is requested. Thermal hard copy output will be produced at the receiving Terminal in the standard manner.

C. Teleconference Mode

1. Answer Setting—Selection of the TC Mode sets the system to manual answer (auto-answer disabled). However, as previously noted, the system automatically reverts to the auto-answer Fax Mode if an incoming call is not manually answered within 2–6 rings.

2. Resolution—Both standard and fine resolutions may be selected (at any time). Changes in resolution will, however, only be implemented (as for Fax) between transmitted pages. The setting of the transmitting system determines the resolution at all ends.

3. Call Set-up—Depression of the telephone ON control places the system in an off-hook state. Dial tone will be audible over the speaker, muted to a level judged to be satisfactory (about 50 dbA). The dialpad is used to telephone the system at the remote end. DTMF or dial pulse feedback and call progress signals are audible over the speaker.

As previously noted, the speaker/microphone unit of the speakerphone may be moved away from the Terminal (significantly reducing auditory noise from the Terminal) to a remote work surface up to 13 feet away. Depression of the telephone OFF control on the console control panel will restore the system to an on-hook condition, terminating the conference.

The system interactions, which occur when a call is placed from a Terminal set in the TC Mode to other remote units, is detailed in Table 1, FIG. 6.

a. Terminal in TC Mode To Terminal in Fax Mode (or to any standard facsimile transceiver)—When a call is placed from a Terminal set in the TC Mode to a Terminal set in the Fax Mode, the user hears (upon auto-answer of the Fax system) an approximately 3 second 2100 hz "CED" tone, followed by an additional cyclic (DIS) tonal pattern. This response should be sufficient to indicate to the user that the remote unit reached is not a Terminal set in the TC Mode (nor a telephone). If the sender attempts to send imagery despite this obvious terminal mismatch indication, as previously noted, a safeguard routine will automatically switch the Terminal in the TC Mode to the Fax Mode to avoid the mixed mode transmission error (if the TC party presses start within 10 seconds of the onset of the CED tone). More likely, the local user will either abort the call, hold the line for a possible voice answer at the end, or switch their Terminal to the Fax Mode if they desire to transmit a message to the remote system.

b. Terminal in TC Mode to Terminal in TC Mode—If the party at the remote end answers the call, the parties will be in an auditory communication state and dialog may take place. In addition, imagery can be sent between units at any time. The conference is concluded when both parties go on hook dropping the telephone connection.

Once in the TC speech mode, conference parties may switch to the Fax Mode (Fax speech state) and, if they so desire, manually transmit imagery. Parties may occasionally wish to do this at the end of a conference to send a multi-page document, since in the Fax Mode, once transmission has begun, the parties may both leave the system unattended and transmission will continue. Since the systems are in FAx mode they will both drop the line automatically (i.e., go on-hook) once the image transmission is completed.

c. Terminal in the TC Mode to Meet-Me Bridge—In meet-me bridging, conferees are interconnected to one another by telephoning the bridge directly. If the bridge answers, the local user will be in an auditory communication state with all conferees already present on the bridge. When a new conferee is added to the bridge, a tone is sounded to alert conferees already connected, of the addition of a new conferee. All users may converse or send imagery to one another at any time. A conferee may drop off of the bridge by simply going on-hook. A tone is sounded to announce that a conferee has left the bridge. If the bridge is full, the local user, when dialing the bridge, hears a busy signal; the user should then abort the call by going on-hook. Some bridges (e.g., the AT&T DCS bridge) allow the bridge to be locked so that new parties cannot join the bridge. This is particularly useful during a transmission state. Parties attempting to join the bridge during a locked state will hear a busy signal and should hang up.

d. Terminal in the TC Mode to Add-On Bridge—Teleconferencing using an add-on bridge is essentially identical to that for a meet-me bridge with the exception, previously discussed, that a host conferee must add each party to the bridge. The host may leave the bridge at any time to add or drop conference members. Parties will hear a tone when a new party is added or drops off of the bridge.

As noted earlier, the host serves to screen out the addition of Terminals in the Fax Mode to the bridge, minimizing the number of mixed mode errors (relative to meet-me bridging). Conferees are still free to change modes while in a speech state (just as they are in meet-me bridging) and can inadvertently create a mixed mode condition.

e. Terminal in the TC Mode to a Standard Telephone—A local user whose Terminal is in the TC Mode may place a call to a standard telephone. If the remote user answers, conversation may ensue. Since the telephone cannot, of course, receive imagery, an attempt to transmit imagery will produce an error (discussed in a previous section). The telephone connection is dropped when both parties go on hook. If there is no answer at the remote end, the local user should abort the call by going on-hook.

4. Protocol for Controlling Resolution Setting, Transmission Speed Determination and Image Transmission—Imagery is capable of being sent from any end at any time during the conference. It is desirable that the average business page be capable of being transmitted within 25 seconds to 45 seconds (at standard resolution).

Transmission of imagery shall be activated by loading one or more (up to 30) documents into the scanner then pressing the start button. When the start button is depressed, voice communication shall be suspended until:

a. The transmission of all documents loaded into the scanner has been completed.

b. The transmission is manually aborted.

c. An error condition occurs. Voice communication is then re-established (assuming that the telephone connection between the units has not been lost).

Transmission speed is determined by a "Broadcast and Listen" technique. This protocol sets the image resolution, sets the transmission speed, controls the image transmission procedure and communicates error conditions.

The "Broadcast and Listen" protocol used DTMF tones of 500 msec duration broadcast by the sending Terminal to all receiving Terminals. See FIG. 7 for a graphic representation of the protocol procedure. Receiving terminals also reply to the sender using DTMF tones.

The protocol procedure starts with the sending terminal transmitting a signal to the receiving Terminals to prepare to receive the transmission, signals the resolution setting to be used and cues the receiving terminals to cut off the speakerphone audio (silence the speaker and mute the microphone) and to disable the keypad. The receivers respond with a tone that is sensed by the sender and indicates that at least one receiver is present. The timing of the response tone is measured by the sender and used to determine if one or more receivers are on a satellite connection. If so, the sender adjusts the protocol to allow for the satellite delay. The protocol then goes into a procedure for setting an image data transmission speed that will be sufficiently error free to permit a high quality image to be transmitted.

The protocol first attempts to set a data rate based on the number of data errors received in the previously transmitted image by at least one of the receivers. If the error rate of the image data received by a receiving terminal during the previous facsimile image data transmission exceeded a certain threshold level required to produce a usable and satisfactory image, then that receiver can request during this protocol exchange that the data rate be lowered by the sender for the next image data transmission. That is, the receiver can cap the data rate at a lower rate until the error rate improves, then the receiver can release the cap. The capping procedure will override the data rate set in the next speed setting part of the protocol using the pattern of test data because the protocol starts testing at the capped or lowered speed.

A test data burst with a known pattern is then broadcast at 9600 bps or at the lower capped rate from the sending Terminal to all receiving Terminals. After a one-and-one-half-second period, this burst is halted and the sending Terminal begins to listen for a DTMF "can't receive tone" from any unit which detects excessive data errors in data at 9600 bps (triggered by a prompt tone set from the sending unit). If there is an error rate above the limit at one of the Terminals, that Terminal shall emit a "can't receive" signal. If no tone set is received by the sending Terminal, imagery is broadcast to all receiving Terminals at 9600 bps.

If one or more tone sets are received from the receiving Terminals, the sending Terminal broadcasts a DTMF "step down" tone set which signals all receiving Terminals to prepare to receive a test data burst at 7200 bps. The 7200 bps test burst is broadcast, a prompt for the receive units to send a "can't receive" signal is broadcast from the sending unit and the broadcast and listen procedure repeated. If one or more Terminals cannot receive at this speed, the procedure is repeated at 4800 bps and then at 2400 bps if the test data pattern at 4800 bps is not sufficiently error free. If one or more Terminals indicates an inability to receive at 2400 bps, the broadcast and listen procedure is aborted and the system returned to the TC speech state. The return to the TC speed state is signalled by the broadcast sending terminal of a post-transmission signal set.

The DTMF tone set signals the end of the transmission test and receivers restore speakerphone audio and enable the keypad.

When the sending terminal sends a prompt to the receiving terminals during the protocol procedure, one or more, or in some steps of the protocol, all of the receiving terminals will reply with a DTMF tone response that has a duration of 500 milliseconds. The response will likely overlap in time and be transmitted to the bridge at the same time. Different bridges respond in different ways to two or more similar tones at similar power levels being received at the same time. Some will switch to the first signal or the strongest signal received and hold on that transmitter until the tone stops or a more powerful signal interrupts. Other bridges will switch rapidly between incoming signals of similar power, holding on each transmitter for only 50 milliseconds or so. In the first case, the DTMF detector at the send terminal (which is now receiving reply(s) from the receiving terminals) can properly detect the DTMF tone; however, in the second case the rapid switching between incoming signals by the bridge makes it impossible for the DTMF detector to detect and identify the reply tone reliably. Failure of the sending terminal to properly detect a reply from one or more receivers will cause an error or a complete failure in the protocol procedure, and the system will not operate properly. To correct this potential problem, a secondary signal detector circuit was added to the system that will detect signal energy of approximately 500 milliseconds duration at the time a receiver reply was expected. If the DTMF detector does not detect a valid DTMF tone reply when expected in response to a prompt, the software will check if the signal energy detector circuit has detected signal energy of approximately 500 milliseconds in duration at the time a reply is expected. If the signal energy is detected, the system assumes that this is a valid DTMF tone reply from a receiver. The signal energy is used only in the absence of detection of a valid DTMF tone.

5. Manual Stop Capability—Conferees have the capability from any Terminal of stopping the transmission of imagery by pressing the STOP botton. When a stop is signaled from the sending end, transmission is halted within two seconds. Since a stop signal from the receive end cannot reach the sending unit while the transmission is in progress, a "broadcast and listen" scheme similar to that used to set speed and resolution is employed. This means that a manual stop from the receive end will only be possible prior to the speed/resolution set-up protocol and after a full page has been received. The manual stop signal is transmitted from any remote Terminal after the sending terminal prompts for distress. The manual stop at a receiver is handled the same way as any other distress condition. The post transmission signal set described previously will be broadcast by the sending Terminal to all receive Terminals to signal the end of transmission, restore the speakerphone audio and enable the keypad.

The panel display on the unit at which stop was pressed, displays the message "Manual Stop". All other units display the message "problem exists-wait."

6. Error Conditions a. Transmission Attempted from a Terminal in One mode to a Terminal in a Different Mode—The errors resulting when a transmission is attempted between Terminals in different modes is detailed in Table 1 (FIG. 6).

(1) Terminal in TC Mode to Terminal in Fax Mode—If an attempt is made to transmit imagery from a Terminal set in the TC Mode to one set in the Fax Mode (after the latter answers and responds), as previously noted, the TC Mode Terminal is automatically switched to the Fax Mode to avoid incurring Error 2.

(2) Terminals in TC Mode to a Standard Telephone—Error 3 results if an attempt is made to transmit imagery from a Terminal set in TC Mode to a standard telephone. If all users remain off hook, the telephone line will not be dropped. Audio communication will eventually be restored (40–80 seconds). A following discussion will deal with the possibility that during a conference, telephone based users may wish to wait on the line during the image transmission period (in silence) in order to be able to participate in the auditory part of the conference.

b. Machine, Power or Line Errors Occurring At Sending or Receiving Terminals—A number of different errors can occur at the sending or receiving Terminals during the transmission of an image. The "Broadcast and Listen" approach employed to set transmission speed and resolution and for the detection of a manual abort once again is employed to deal with Terminal errors. When an error occurs at the sending Terminal, image transmission is halted, a specific error message displayed and the post-transmission signal set is broadcast to all receiving Terminals to signal the end of transmission, restore speakerphone audio and enable the keypad.

The error message "problem exists-wait" is displayed at all receiving Terminals.

When an error occurs at a receiving Terminal, a specific error message is displayed at the problem Terminal and a DTMF distress signal is broadcast from the Terminal upon the reception of a DTMF cue signal from the sending Terminal. Cue signals are sent after the speed/resolution set-up protocol and before the image data is started, and after a full page has been transmitted.

When the sending Terminal receives the distress signal, the post-transmission signal set is broadcast to all receiving Terminals to signal the end of transmission, restore speakerphone audio and enable the keypad.

The message "problem exists-wait" is displayed at all Terminals not themselves in an error state. The scanner and all printing systems shall be cleared if possible.

There are three different Terminal errors which can occur during transmission:

(1) Scanner and Paper Jam/Printer Out of Paper or Transparency Printer Out of Donor or Transparency Material—The occurrence of a scanner (sending Terminal) jam, paper jam (receiving Terminal) or an out of paper (or donor/receptor material) condition during a transmission shall lead to the error indication "Paper Jam" on the panel display of the responsible Terminal. Once voice communication is re-established, it should be a straightforward matter for the conferees to discuss and fix the problem. When the jam or printer material is cleared or replaced, the offending Terminal should be immediately capable of resuming the teleconference.

(2) Transparency Printer Not Ready—If a transmission is attempted when the Transparency Printer is connected but not in a ready state, the message "Vugraph Printer Not Ready" is displayed at the appropriate Terminal. Correction of this problem and resumption of the conference should be similar to that for a paper jam.

(3) Dropped Telephone Connection—When the telephone line is lost at the sending Terminal, it will likely be necessary that the sender rephone the remote parties or the bridge (if meet-me). The radial capability will assist this reconnection if it is the sender who established the original call.

The case for add-on bridging may be, however, more complex. If the host is dropped, some bridges require that the entire conference be re-established.

c. The facsimile transceiver will continue to send poor quality copy even though transmission line errors cause a resend signal to appear at the sending terminal, or a line fail message to appear at the receiving terminal. Moreover, the facsimile transceiver does not indicate that a number of pages were sent with an unsatisfactory number of errors until the completion of transmission, when the message "check report" appears and the transmission status report is printed showing the pages sent in error.

One observation that has been made is that the facsimile transceiver frequently appears to set the transmission speed at 9600 bps (having tested and accepted the integrity of the transmission line at that speed) even though imagery sent at that speed incurs an unacceptable number of transmission errors (indicated in the transmission report after transmission has been completed).

A second observation is that such imagery sent at a lower speed (typically 7200 bps) is transmitted with a minimum number of errors.

One improved approach which (given the above observations) increases the image quality of copy transmitted, is to lower the starting speed tested during the protocol whenever a resend, line fail or error indicated in the register storing the transmission report occurs.

The approach is as follows: If the sending unit incurs a resend or any receiving unit receives a page in error (or line fail) due to poor transmission:

(a) The sending unit will send a signal (new DTMF message) which causes all units to begin any new speed/transmission set-up protocol at one level lower than that used to begin the previous protocol. This requirement necessitates that the failed page data contained in the facsimile register (used to generate the transmission report provided at the conclusion of document transmission) be interrogated.

(b) This forced step down lasts for a period of time, say five pages, at which time the system will once again attempt to initially set transmission at 9600 bps.

(c) The message "max xxxx bps" is shown on the alphanumeric display (where xxxx is 9600, 7200 or 4800) for a maximum of 30 seconds in order to indicate to users that transmission line problems exist (possibly leading the user to eventually dial a new line in hopes of getting a better connection).

d. Reset—The act of going on-hook shall reset all Conference Controller Terminal latches except that set to specify the Mode state.

7. Transmission During Prolonged Error State—If one of the Terminals interconnected in a bridged conference is in an error state which cannot be readily remedied, it may be desirable to allow other conferees to receive imagery while the Terminal is being repaired. In addition, it is likely that the party with the disabled Terminal will want to participate in the audio portion of the conference. This option is provided for in the TC protocol and error detection routines.

Essentially, once a Terminal has caused an abort, it is set to an audio only condition until the problem causing the abort has been rectified and the Terminal is once again in service. When the error at the problem Terminal is initially detected, all Terminals return to the TC speech state as previously described. If the conference members elect to continue the conference despite the fact that the Terminal causing the original abort will be in a prolonged error state, they may do so in a straightforward manner by simply resending the imagery originally sent. Audio at the disabled Terminal will be cut off as usual, but during the re-transmission period, that Terminal will not participate in the protocol or error detection interchange process. The party having the disabled Terminal hears silence while imagery is being sent to the other Terminals. When the transmission has been completed, audio shall be restored at the disabled Terminal (simultaneously with audio restoration at all other Terminals). The party with the disabled Terminal may then participate in the audio portion of the conference. This process will be continued until the disabled Terminal has been restored to a working state. Once restored, the conference proceeds in a normal fashion with all Terminals capable of receiving imagery.

8. Switch-Hook Flash—A switch-hook flash is signalled using the FLASH button. When the ON button is initially pressed, the speakerphone is placed off-hook; the conferee may then dial out to reach the remote party.

When the remote party has been connected (remote party presses ON button to answer) and the parties are in a speech state, either party may initiate a switch-hook flash by pressing the FLASH button.

The Conference Controller Terminal monitors the duration of the depression and will restore the system to an off-hook state within the proper flash interval, whether the requesting party has released the FLASH button or not.

9. Transparency Printer Output—As previously discussed, the Transparency Printer is a unit which produces a high quality transparent replica of the thermal printer output which can be used for overhead projection (providing an inexpensive means for large audiences to view the imagery transmitted). Image data shall be sent from the Terminal at either end to the transparency printer when:

a. The transparency printer is connected to the Terminal.

b. The teleview printer has sent an indication to the Terminal that it is in a ready state. The transparency printer cannot print imagery as rapidly as the Conference Controller Terminal is capable of sending it; therefore, a page buffer is required. When several pages are sent successively, the system is halted until the transparency printer has completed printing the page to avoid a buffer overflow.

If a transparency printer is connected to the sending terminal and is in an active state, a transparency is printed at the sending as well as the receiving end during the transmission of an image.

D. Call to Confax Terminal from a Standard Telephone

A local user having only a standard telephone can enter into a teleconference with Terminals set in the TC Mode (both in unbridged and bridged configurations).

a. Standard Telephone To Terminal in the Fax Mode—There is only one possibility for useful discourse between a telephone and a remote Terminal set in the Fax Mode. The local user can continue to ring the remote Fax Terminal in hopes that a user on the remote end will hear the alarm sounded at the Fax Terminal (about 16 seconds after the Fax Terminal responds to the call), press the stop button, and answer the phone. Otherwise, within 33 seconds, the Fax unit disconnects and the telephone connection drops; the local user should then go on hook.

b. Standard Telephone to Terminal in the TC Mode—A local user having a standard telephone may call a Terminal set in the TC Mode. The users may converse if the remote user answers, however, an error will occur if any transmission of imagery is attempted between the units. The call is ended when both parties go on hook.

If the remote TC Terminal does not answer, it reverts to the Fax Mode after 2–6 rings. The interaction may then be treated as that between a telephone and Fax Terminal described previously.

c. Standard Telephone to Meet-Me Bridge—A user having only a standard telephone can dial and join a teleconference interconnected through a meet-me bridge (unless the bridge is full or locked whereupon the user will hear a busy signal).

Conversation can take place normally between all parties. Obviously, however, imagery cannot be sent to the telephone based user. If such imagery were to be transmitted among users having Terminals in the TC Mode, the telephone based user having been joined to these units through the bridge, would hear the transmission signal as a loud high frequency auditory output. This scheme adds the flexibility of allowing Conference Control Terminal and telephone based users to participate together in a teleconference which (particularly if the telephone based user has a copy of the imagery being exchanged) could prove desirable in a number of instances.

d. Standard Telephone to Add-On Bridge—A host may add a conferee having only a telephone to the bridge in the same manner as adding a Terminal in the TC mode. The same restrictions which apply to the telephone based users connected through a meet-me bridge applying to such users interconnected through an add-on bridge.

SYSTEM STATE DIAGRAMS (FIG. 9)

General Principles

When the terminal is in one mode (either on or idle), the other mode is off.

When the lamp for a mode is on (steady), pushing the button for that mode has no effect on the mode lamp.

When the lamp for a mode is flashing, pushing the button for that mode changes the lamp for that mode to on (steady).

Selecting a mode causes the "Choose Mode" warning (upon power-up) to cease. In addition, no further beep warning is sounded when the speakerphone on button is pressed (placing the telephone line in an off-hook state).

Pressing either mode button causes the "Verify Mode" warning to cease.

Only the lamp for the mode that is on is lit; the other lamp is off.

Resolution can be set at any time in either mode (standard is default). The resolution of images being transmitted will be changed, however, only after a page has been sent and a new page is introduced into the scanner.

In the Fax Mode, pressing Start puts the speakerphone in an on-hook state (same as pressing off button).

Mode changes are acknowledged only during idle and speech states and when a fax machine in auto answer mode is reached. At other times, a buzzer sounds when a mode button is pressed to signal users of an inappropriate action.

The act of going on-hook resets all Confax Terminal latches except that set to specify the Mode state.

When the Conference Controller Terminal is in the Fax Mode, turning the power off resets all Conference Controller latches. When the Conference Controller is in the TC Mode, turning the power off resets all Conference Controller latches not associated with the speakerphone and control console.

Messages shown at terminals are for a maximum of 30 seconds except for "choose mode" which will be displayed indefinitely and "verify mode" which will be displayed for 5 minutes.

The manual Fax transmission sequence is described in FIG. 9-9.

The voice request sequence is described in FIG. 9—9.

The prompt for inability to receive (or distress) feedback from remote units during the speed/resolution set-up protocol are initiated by a prompt signal from the sender.

Telephone disconnect response is described in FIG. 9-20.

Pre- and post-transmission signal sets are detailed in FIG. 9-14. These signals are used to operate the remote terminal audio and signal the start and end of transmission.

Failure to obtain a sender prompt within 3.5 seconds of the predesignated time in the speed/resolution set-up and stop/error routines results in an abort. The message "system error" is displayed at the offending Terminal (for a maximum of 30 seconds).

A Terminal in an error state can still participate in the conference-receiving audio only (silent during image transmission). This routine is described in FIG. 9-14.

Transparency Printer

The initial transparency printer is a modified Toshiba Model TN-5400 thermal transfer printer.

A data cable from the transparency printer is connected into the back of the Conference Control Terminal.

Data Interface

The data interface between the terminal and the transparency printer is appropriate to produce adequate image quality. The interface circuitry and data buffer are contained in the transparency printer. A full page buffer is included in the interface, as the transparency printer may not be able to print at the data rate sent by the terminal. As previously described, the data transmission is halted when successive pages are being printed, if the page buffer is not empty (in order to avoid a buffer overflow). If the buffer is not emptied in 20 seconds, a system error is declared. Once emptied, an additional 3-second delay is imposed to allow for differential page feed rates between the Conference Control Terminal scanner and the transparency printer paper feeder. The transparency printer sends a ready state signal to the terminal when:

a. The unit is powered up.

b. No jam condition exists.

c. Adequate transfer ribbon and receptor (transparency) materials exist.

d. The transparency printer interface page buffer is empty.

On/Off Line Option—The transparency printer contains a pushbutton activated control which enables output from it to be locally inhibited (placed into an off-line mode). Local deactivation of output from the unit does not affect the ready state signal sent to the terminal. It is identical to that sent when the unit is placed in an on-line mode. The pushbutton control shall be lighted when the unit is in the on-line state.

Printing Speed—The transparency printer prints at a speed of 14 ms/line. Since the Conference Controller terminal is capable of outputting at a line speed of 10 ms/line, the page buffer described above is provided in the interface between the Conference Controller terminal and the transparency printer.

Resolution—The transparency printer prints imagery at 8 dots/mm and 8 lines/mm. Image area is 1600 lines×2048 lines.

Image Quality—The transparency printer is capable of printing legible 6-point text for imagery transmitted at a standard resolution. In addition, the unit prints solid areas with a density greater than 1.3 and with no deletions in solid area uniformity greater than 2/mm in width. Output contrast is 100 to 1 for text and approximately 1000 to 1 for solid areas.

Transfer Ribbon/Indicator—The transparency printer uses a roll form of TCR transfer ribbon capable of producing at least 500 pages of imagery of standard letter (11") length. When the transfer ribbon is expended, a red warning light indicates that condition on the front panel of the printer.

Transparency Material—The transparency material for the teleview printer is automatically fed into the machine. The transparency material is 8½"×11" polyester sheets approximately 2-4 mils thick. The cassette used to hold the sheets contains at least 50 sheets. A warning light indicates when the last sheet of such material has been used.

When a sending terminal sends a prompt to the receiving terminals during the protocol procedure, one or more, or in some steps of the protocol, all of the receiving terminals, will reply with a DTMF tone response that has a duration of 500 milliseconds. The responses will likely overlap in time and be transmitted to the bridge by the receiving terminals at the same time. Different bridges respond in different ways to two or more similar tones at similar power levels being received at the same time.

Some will switch to the first signal or the strongest signal received, and hold on that transmitter until the tone stops or a more powerful signal interrupts. Other bridges will switch rapidly between incoming signals of similar power, holding on each transmitter for only 50 milliseconds or so.

In the first case, the DTMF detector at the sending terminal (which is now receiving reply(s) from the receiving terminals) can properly detect the DTMF tone, because the detector must receive the tone for a minimum of 80 milliseconds to properly identify the tone signal. In the second case, the rapid switching between incoming signals by the bridge makes it impossible for the DTMF detector to lock on, detect and identify the reply tone reliably. Failure of the sending terminal to properly detect a reply from one or more receivers will cause an error or a complete failure in the protocol procedure, and the system will not operate properly. To correct this potential problem, a secondary signal detection circuit was added to the system that will detect signal energy on the incoming telephone line at the time a receiver reply was expected. If the DTMF detector does not detect a valid DTMF tone reply when expected in response to a prompt, the software will check if the signal energy detection circuit has detected signal energy of at least 140 milliseconds in duration at the time a reply is expected. If the signal energy is detected, the system assumes that this is a valid DTMF tone reply from a receiver. This signal energy detection is used only in the absence of detection of a valid DTMF tone.

Figures 7, 8, 9, 10:
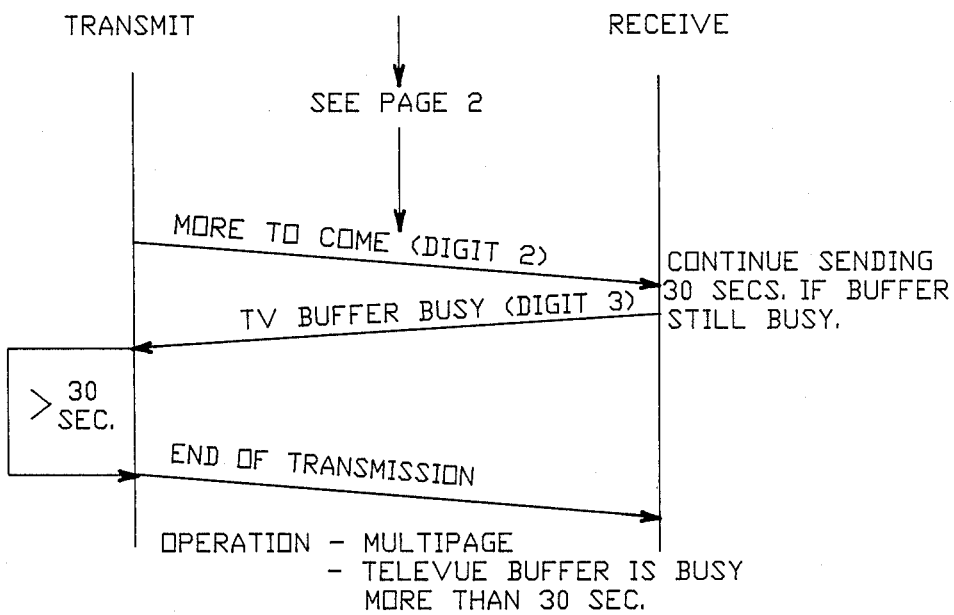
Figures 7, 8, 9, 10, 11:
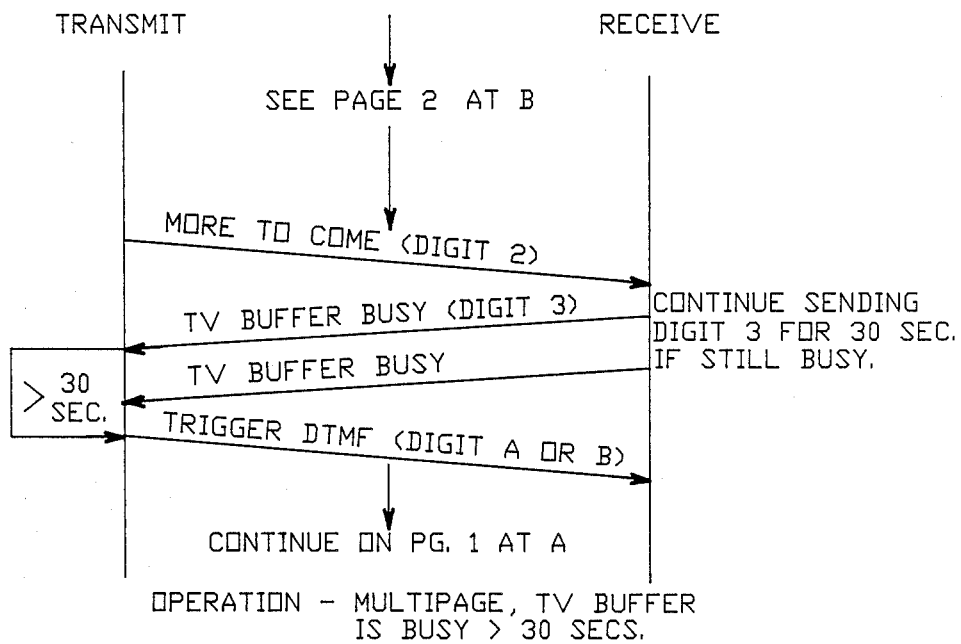
Figures 1, 9:
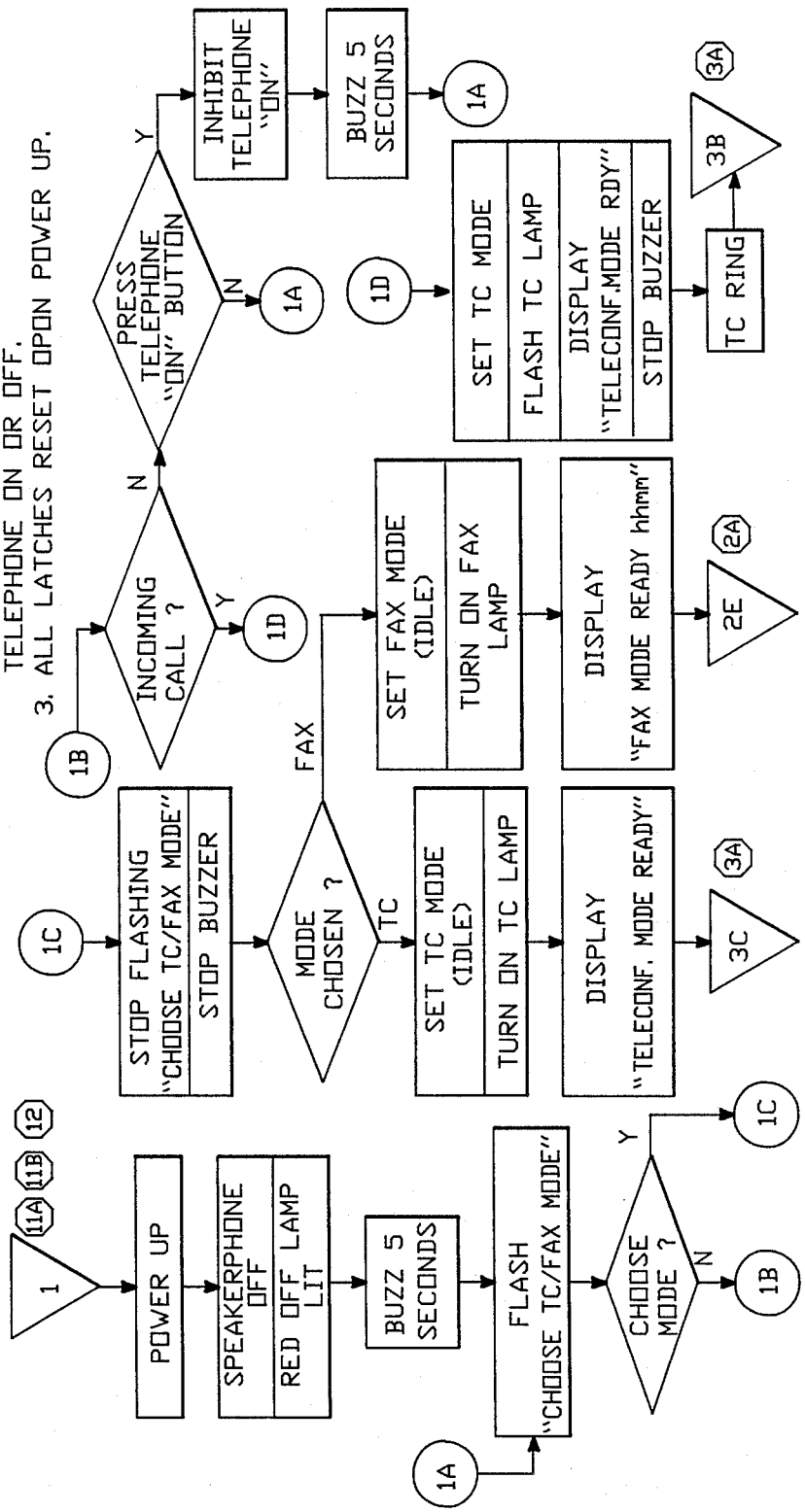
Figures 2B, 9:
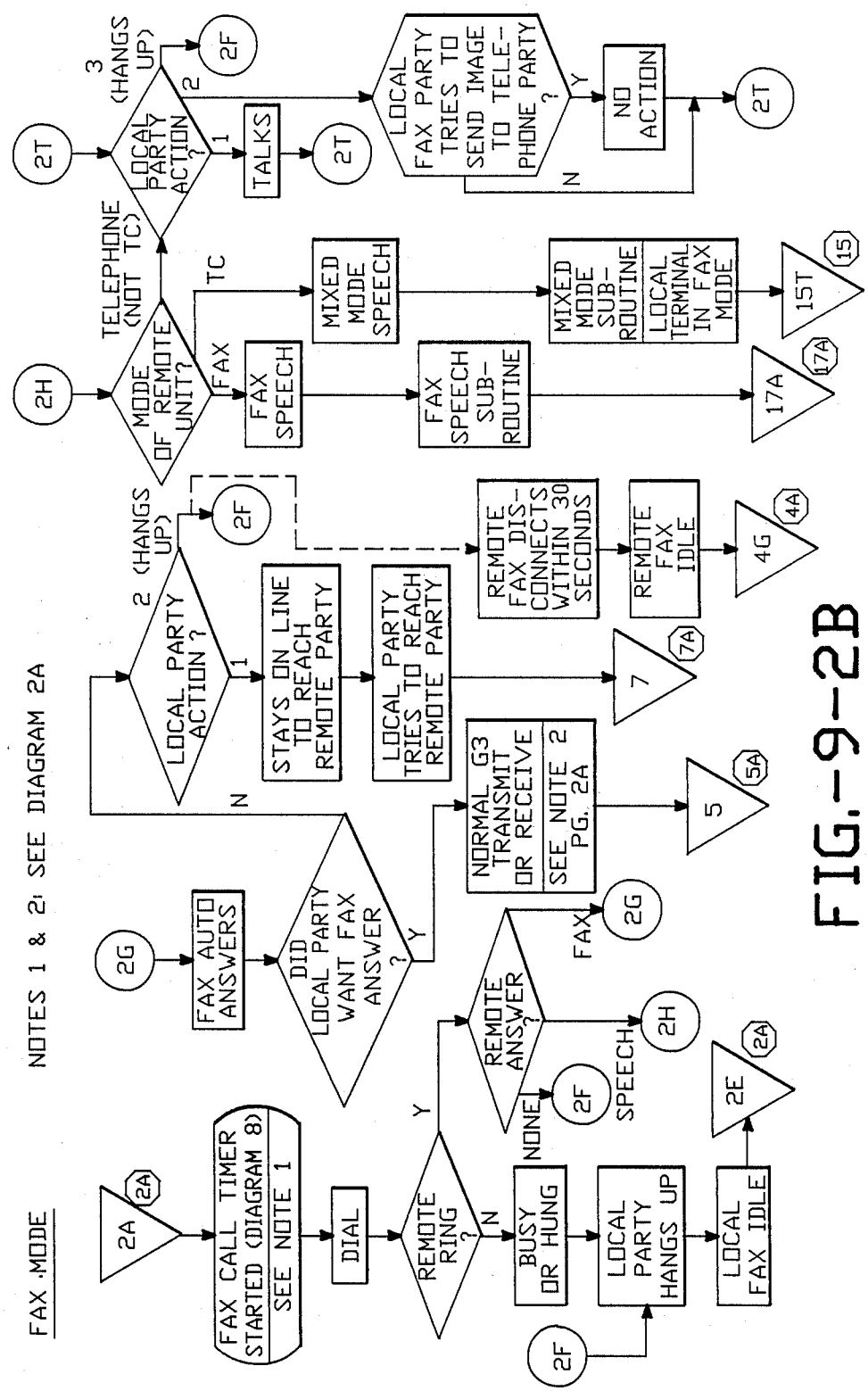
Figures 3A, 9:
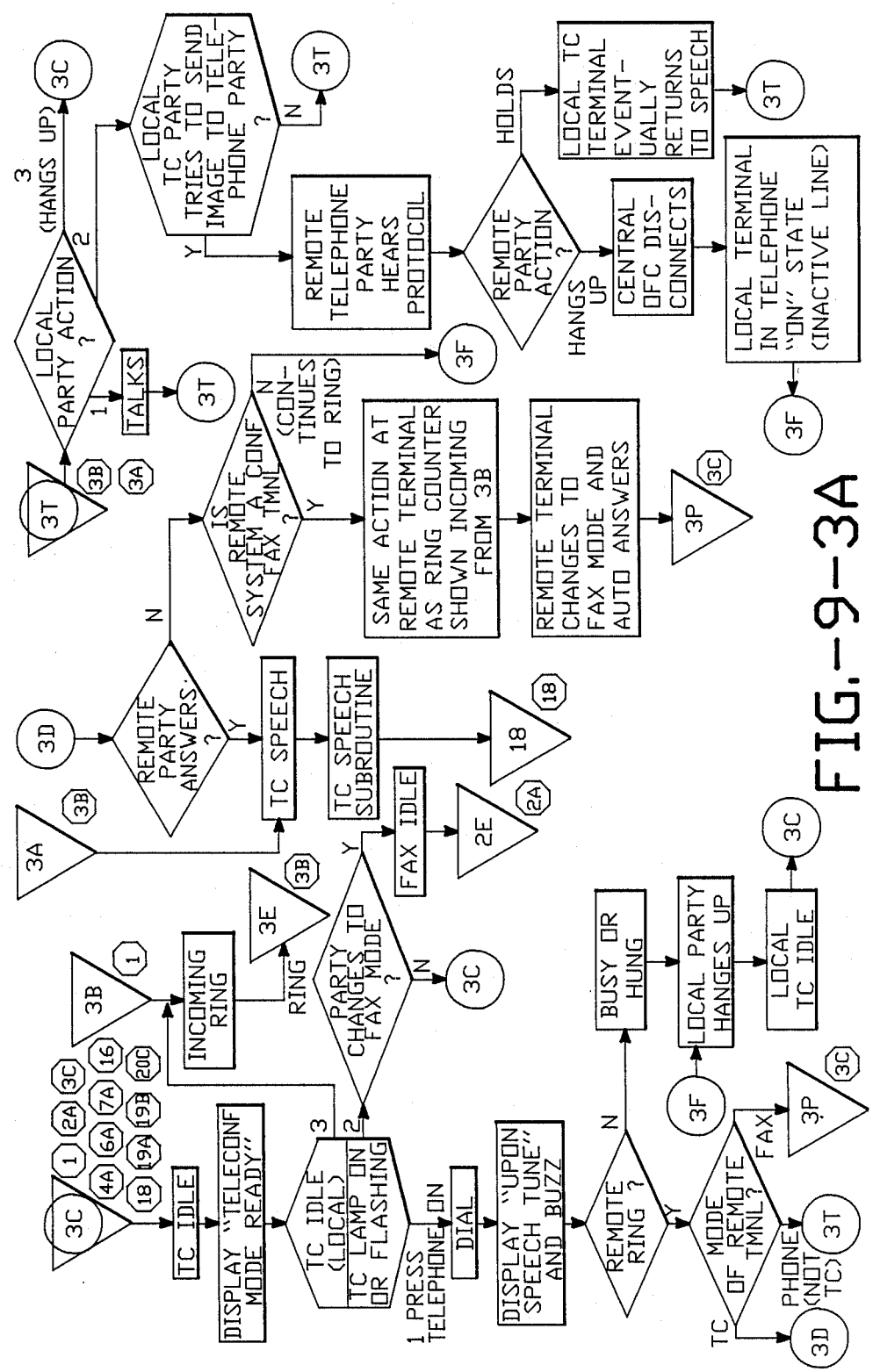
Figures 3B, 9:
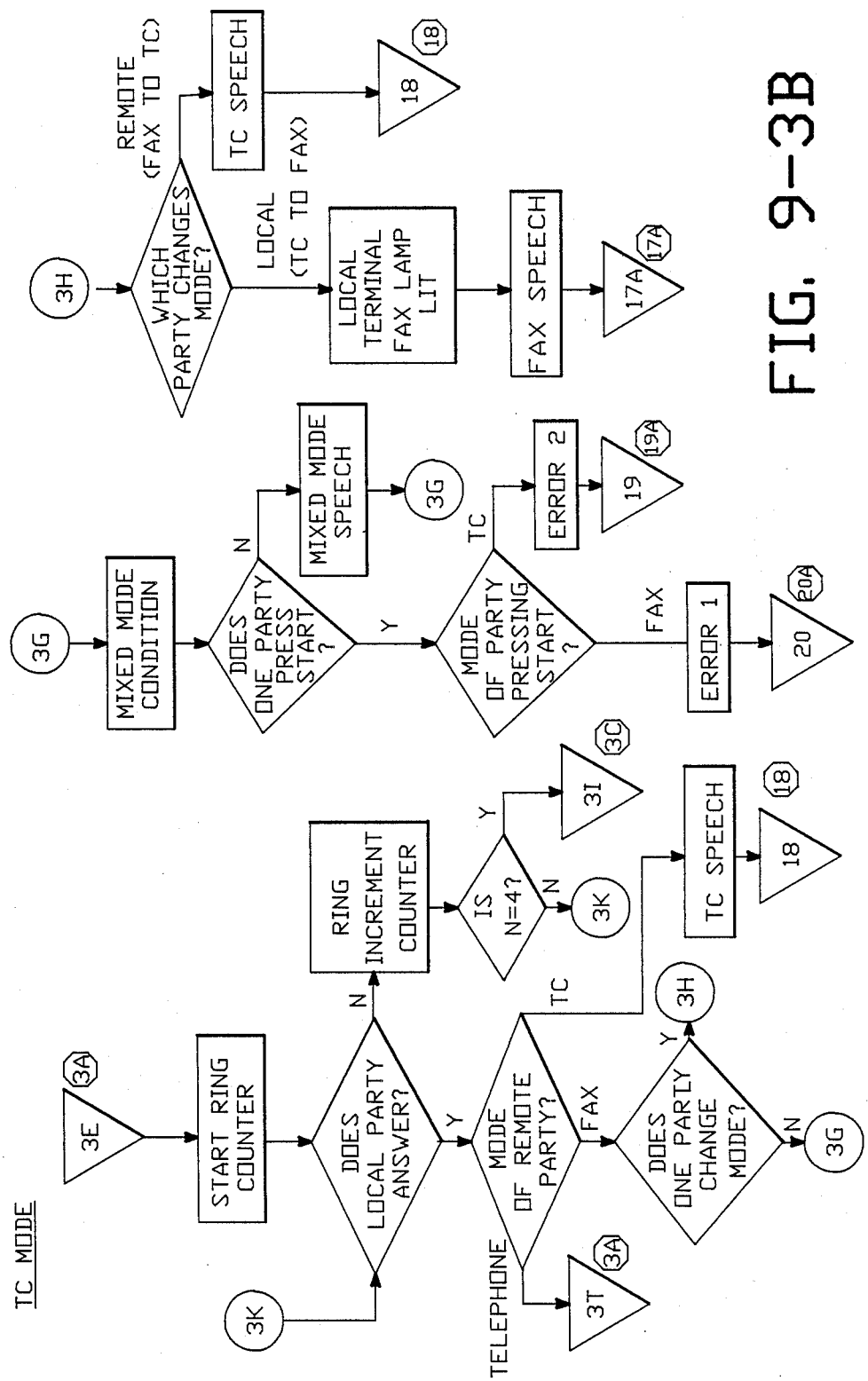
Figures 3C, 9:
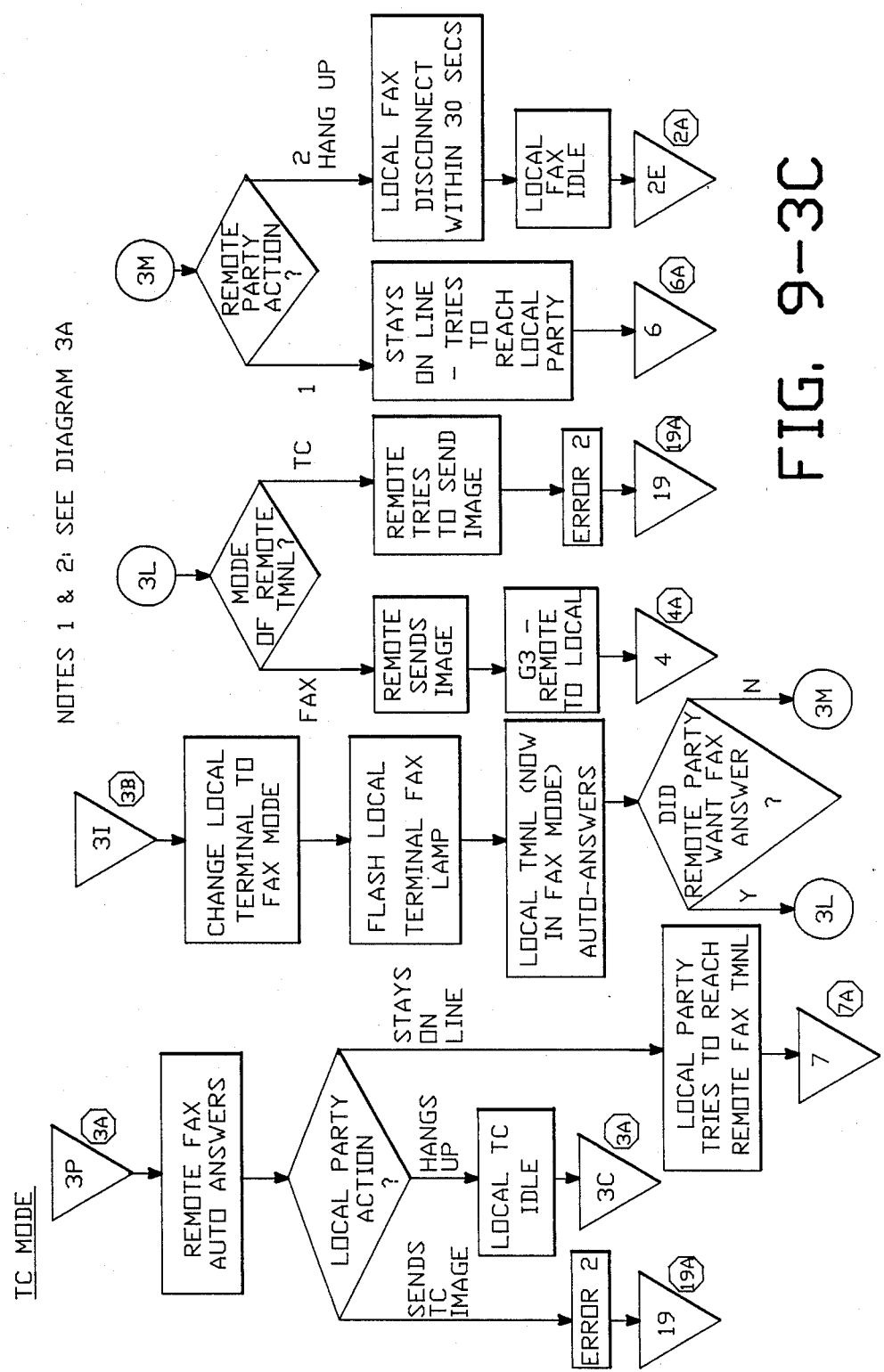
Figures 4A, 9:
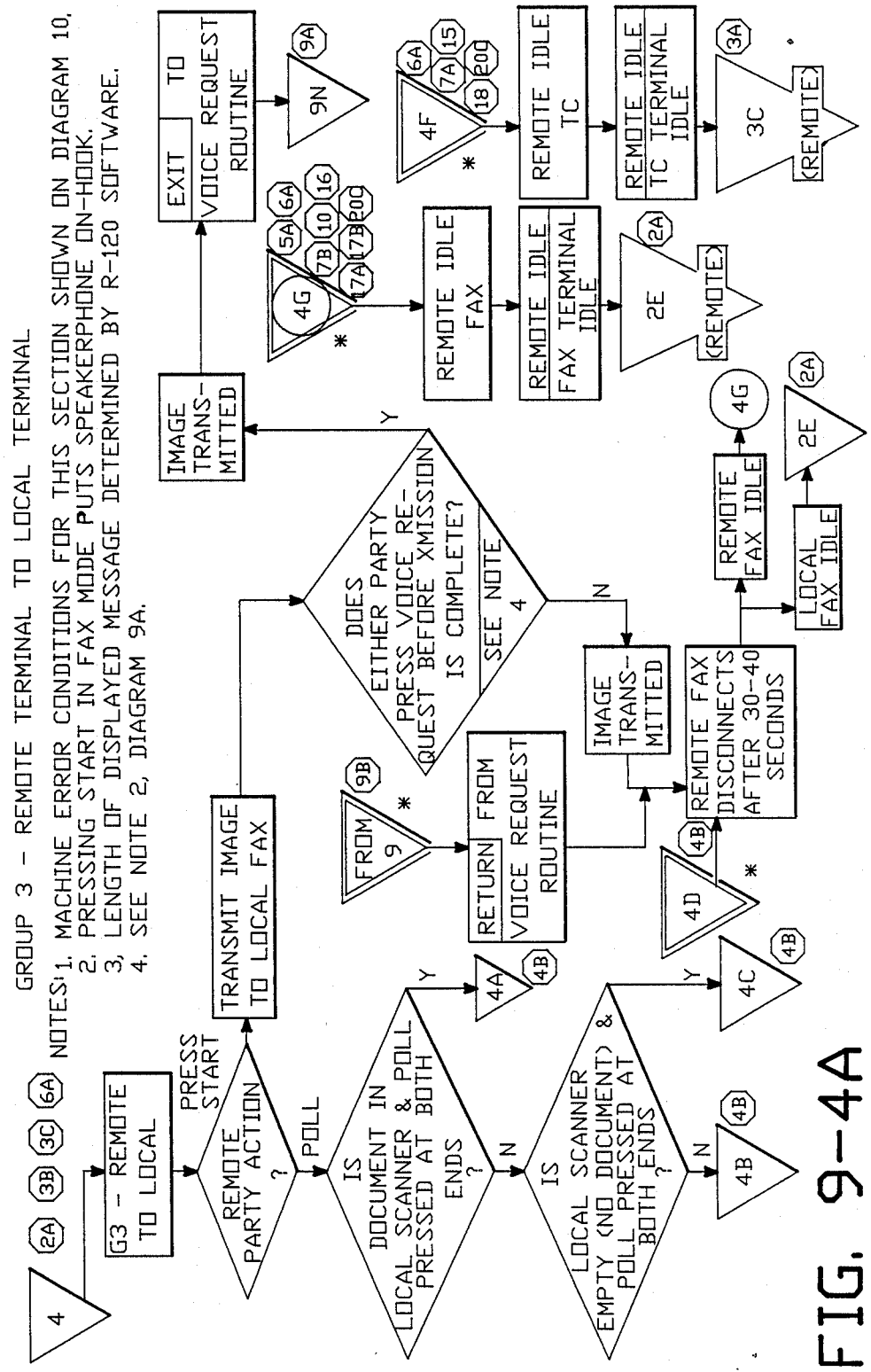
Figures 6A, 9:
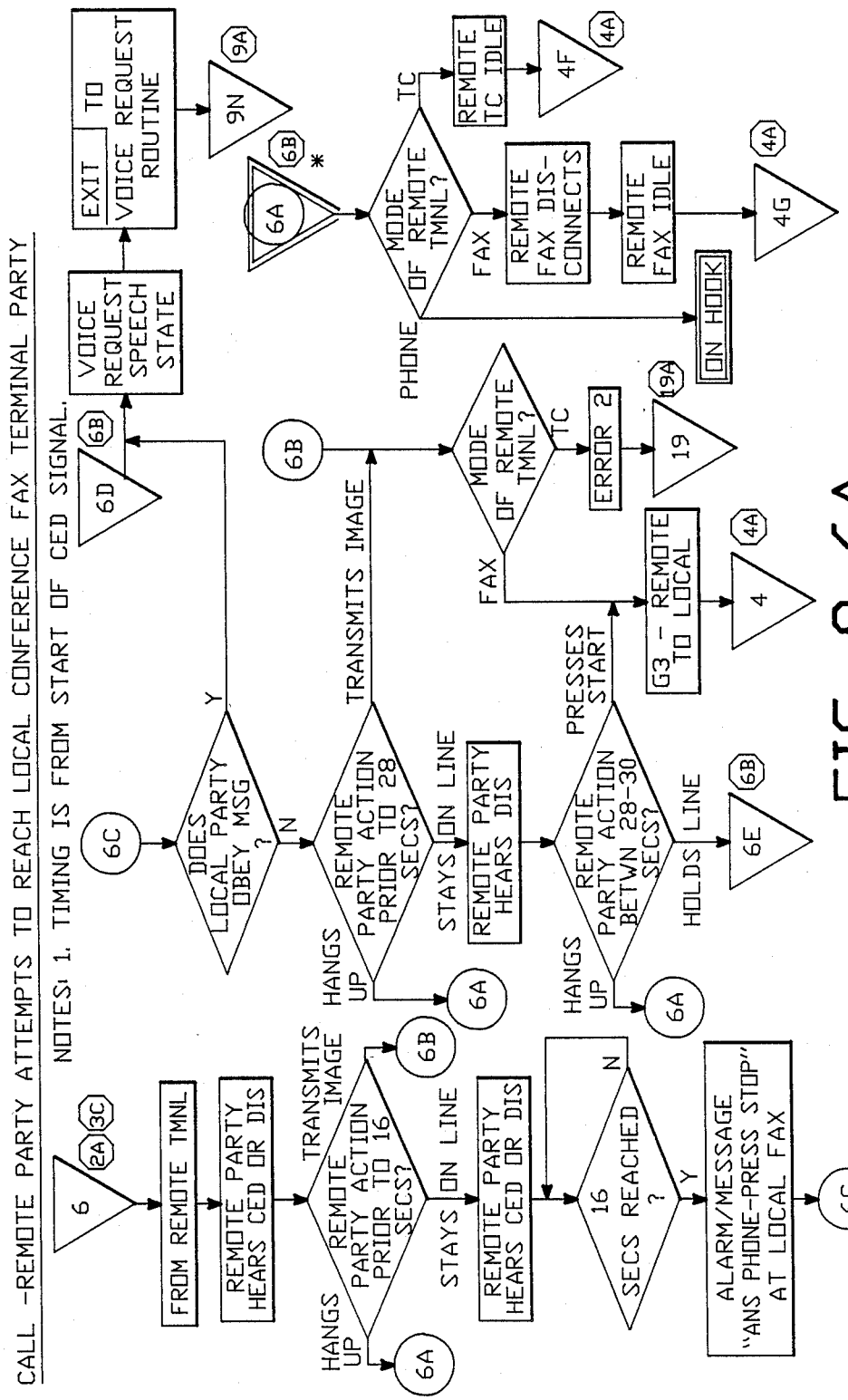
Figures 8, 9:
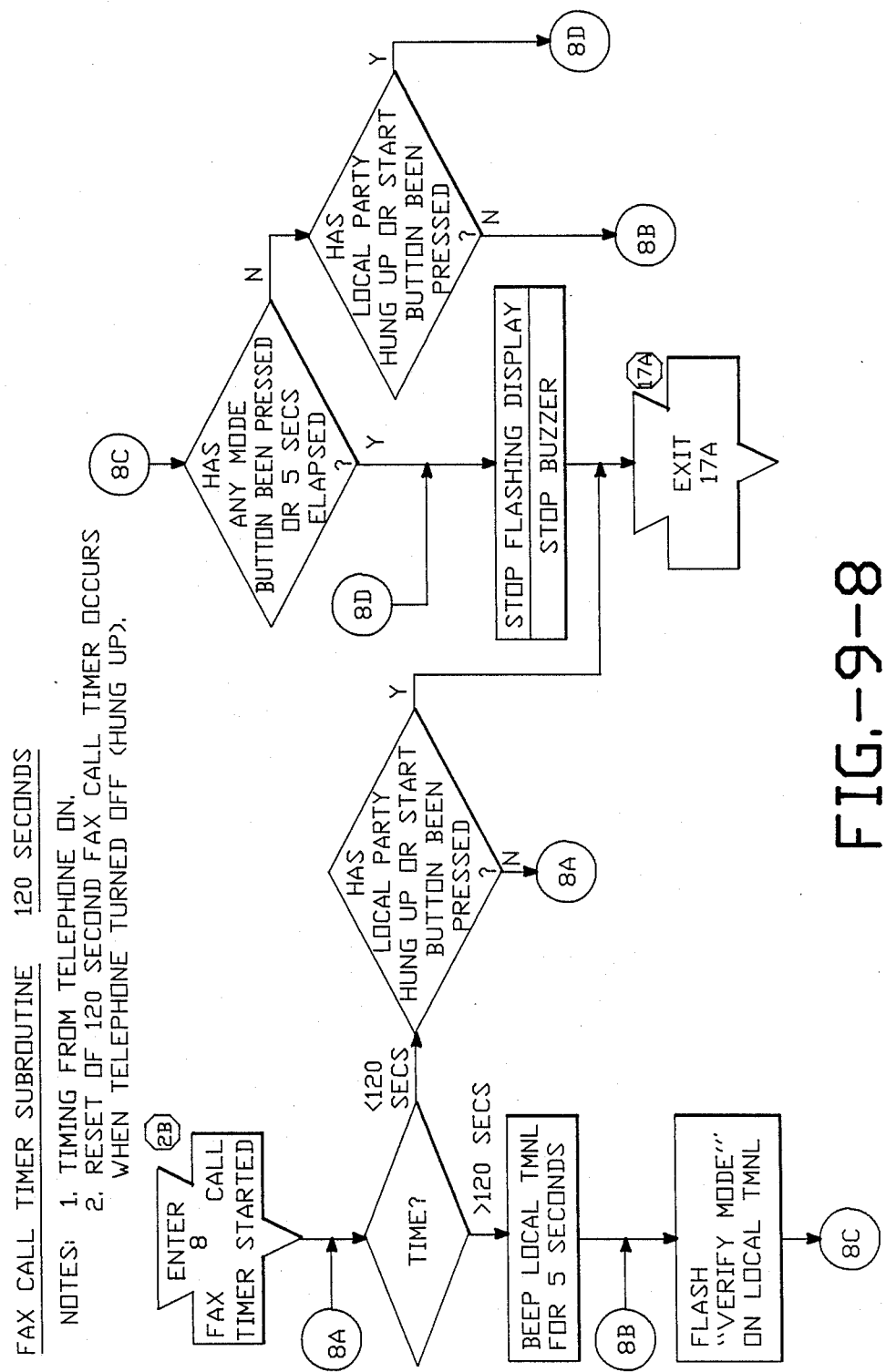
Figures 9, 9B:
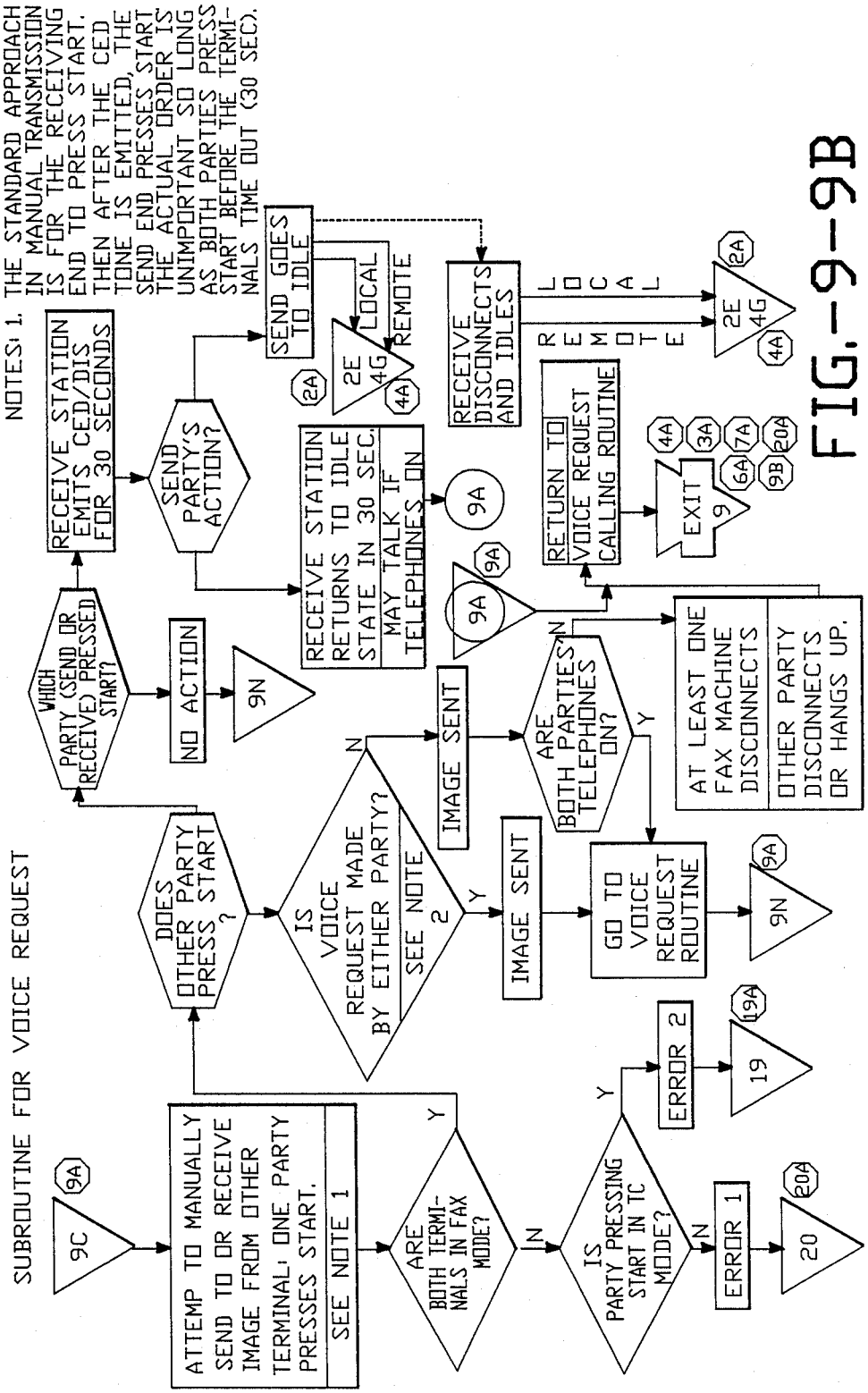
Figures 9, 10:
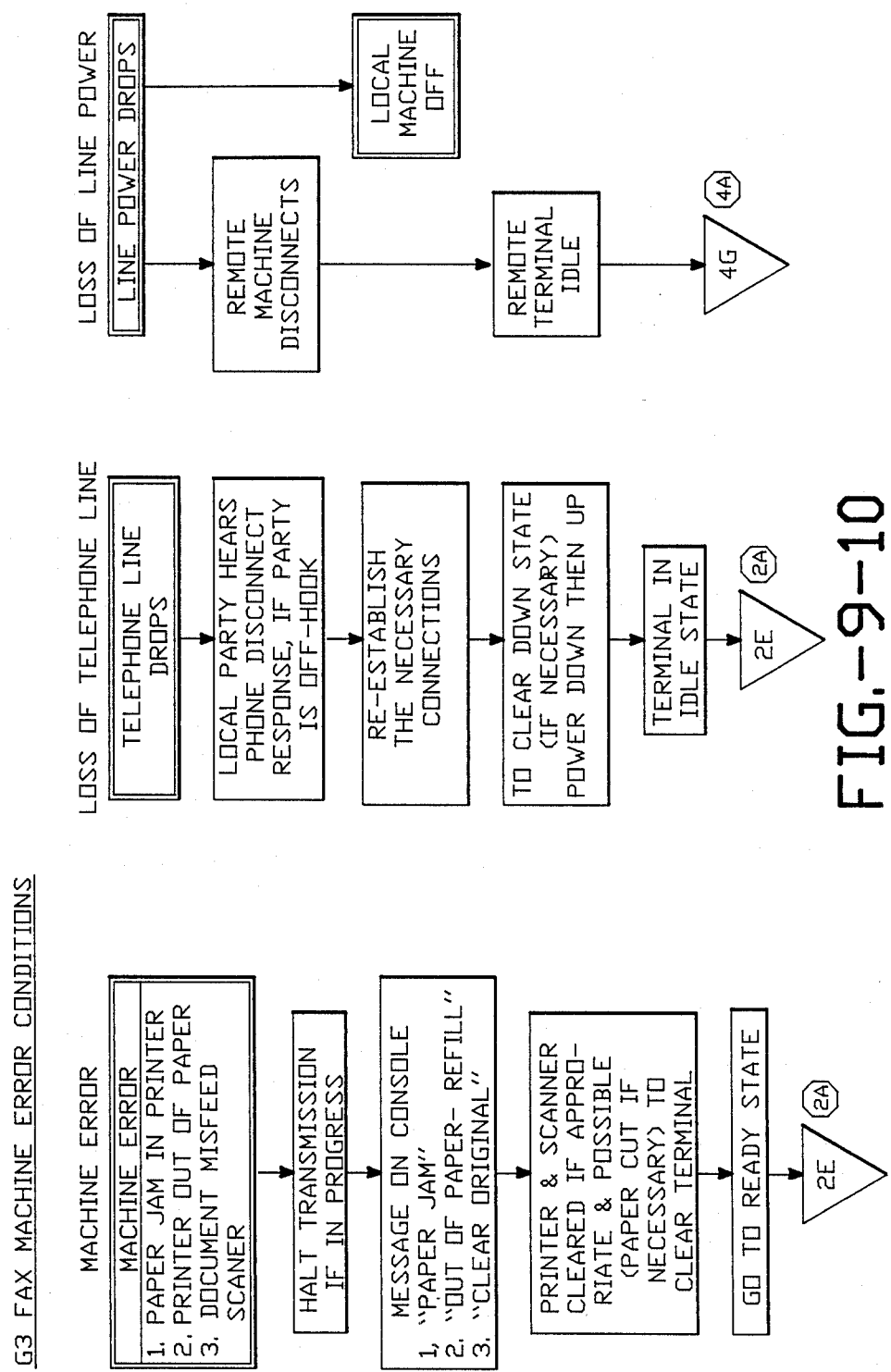

The energy detection circuitry is shown in the schematic drawing in FIG. 10 in the area enclosed by a dotted line. This circuitry takes the incoming telephone connection signal RCVA after it has passed through a bandpass filter which passes the band 500 Hz to 1700 Hz and through an AGC circuit that maintains the incoming signal in a 10 db range from an input range of 35 db. The signal is taken off at the input of the DTMF detector U6 pin 12 and put through the energy detect circuit consisting of two operational amplifier stages and a logic inverter which provides a positive true output signal called RCVID available at pin 16 of the card edge connector.

The first stage of the amplifier U7 (LA) amplifies the signal and peak detects it, while the second stage provides some hysteresis. The diode, CR3, and the resistive pad are used to buffer the output levels to be compatible with the HCMOS input at pin 1 of U5. From U5 pin 2 the switched output is provided to pin 16 of the card edge connector.

The hysteresis provided by the second amplifier stage is important because the input signal may cycle at approximately 50 milliseconds because of the rapid switching by the bridge. The RCVID should stay on during this rapid cycling because of the hysteresis as the DTMF tone is still being sent by the replying receiver(s) and the cycling distortion in the incoming telephone line is caused by the bridge. While the cycling distortion of the signal prevents the DTMF detector U6 from properly detecting the DTMF tone, the energy detection circuit detects the presence of energy and the duration can be determined by software in the microprocessor.

The software in the 8085 microprocessor checks the RCVID signal every 20 milliseconds during the time when a receiver reply is expected. The presence of energy, indicated by RCVID on, for a continuous period of 7 check cycles or 140 milliseconds is accepted as the presence of a DTMF tone, and this information will override the DTMF detector indication of no DTMF tone present. The software logic then continues as though a proper DTMF response was received.

System Operation

Referring now to FIG. 2, a user initiates calls via a standard 12-key telephone dial pad. A point-to-point call is then placed in the same manner as any other phone call. When operating through a bridge, such as bridge 16, the instructions for that particular bridge will be followed. The user may place calls through either the telephone handset 32 or the speakerphone 26. Likewise, the recipient of a call may answer on either device. When contact is established, the users may converse as with a normal telephone. To carry out an image transmission, the sender will insert the document into the scanner input tray of facsimile 30 and push a single button. The system will then manage all aspects of the voice/image coordination. During transmission, the line will be used entirely for image data. When the document has been fully transmitted, the system will automatically return to a voice state.

Any party can become the sender of a document at any given moment; all others will receive. When the transmission is complete, anyone can again become the sender. Similarly, the system will organize voice traffic in a half-duplex mode; that is, when one party is speaking, the others become listeners. For another to be heard, he must wait for a pause in the current conversation. When a document has been received at a remote location, it can be marked (or annotated) and retransmitted by any party. All others will receive it.

The system will be able to sense conditions on the network and to adjust to noisy lines and other transmission problems. It will assure the quality of the image sent by adjusting its transmission speed. It will first try to transmit at its maximum rate of 9600 bps. In doing so, it will poll the receiving machines to detect errors or difficulties in reception. If any are encountered, it will reduce its speed, first to 7200 bps, then to 4800 bps, and finally to 2400 bps. If there are problems even at the lowest speed, it will terminate the transmission and prompt the user to re-dial the conference on a (hopefully) cleaner line.

The system contains internal error trapping routines which will protect the user from becoming stuck in a situation from which there is no recovery. Certain actions will simply be prohibited; the system will not respond. Others will bring forth an advisory message on the LCD display. A number of serious potential errors (discussed below) will be sensed and corrected automatically. In the worst case, the system will suspend its current activity and return to audio, so that the participants can work out a corrective action. Users will never be left in a state in which the system refuses to operate and voice communications have been cut off. The only situation from which there is no recovery is a network error that drops the user's line from the conference. In that case, there is no recourse but to re-dial the call.

The system will be able to correct a situation in which the calling party and the receiving party are in different modes (e.g., TC to FAX, or FAX to TC). Since the protocols are incompatible, the machines cannot communicate in this condition. In the first case (TC to FAX), the caller will hear the normal fax tones from the receiver. He will then be able to send a fax message (but only point-to-point) instructing the receiver to switch modes, or he may simply hang up. The second case (FAX to TC) is possible if someone leaves a system in TC mode unattended after conference use. In such case, the receiving machine will sense that no one is answering (after a predetermined number of rings) and it will switch itself over to FAX mode to receive the incoming transmission. In the case where a FAX to TC connection is made and two parties begin to converse, the system will warn the FAX party that he is in mixed mode, so that a correct transmission may be made.

There will be no limit to the number of parties that may be connected in a conference with the teleconferencing system according to the present invention. The number of parties is limited only by the conference bridge used.

When users wish to avoid the loss of audio capability during document transmissions, two parallel phone lines can be used, one for audio and the other for images. In such operation, the audio section of the system will be disabled by the user with a simple control, and the system will be used only for document transmission on demand. Voice communication will be carried out on the second line with a second speakerphone system.

Bridging

A bridge is a separate piece of equipment that allows multiple parties at multiple locations to join in a single telephone conversation. It is similar to a PBX in some respects, but it possesses much greater capability to control the quality of the joined calls. A bridge has various controls to adjust for noise, line losses, echoes and volume. It also facilitates call set-up and recovery from dropped lines.

Until now, bridges have been used only for audio conferencing. There have been no devices capable of transmitting images in bridged mode. The present system permits combined voice and image transmissions to be bridged for the first time.

Bridges are available in various sizes and capacities, usually measured in terms of the maximum number of lines that can be joined at one time. Smaller bridges can accommodate 5–10 lines. A medium-sized bridge can handle 20–60 lines. The very largest ones, operated by AT&T, have a capacity of 240 lines. A user may buy and operate his own bridge on his own premises, or he may make use of various bridging services which provide bridging on a per-use basis.

Most bridges are designed to be managed by a human operator. The operator serves the various purposes of assisting in call set-up, adjusting the bridge to maximize audio quality, and reconnecting any party that may inadvertently drop from the conference. There are, however, also automatic bridges which the user can operate remotely through the use of tones generated by his telephone keypad.

Bridged calls can be set up in one of two modes. "Meet Me" is a mode in which all participants call the bridge at an agreed upon time and are joined in a single call. Such conferences must be arranged in advance with the bridge operator, who provides the number to be called and then receives and joins all incoming calls. "Add-On," or "Dial-Out," is a mode in which one person initiates calls to all other participants. He may do so either with operator assistance or through an automated bridge.

Once a multi-point conference is established, it is conducted as though it were a normal telephone call. No other special action is required by any of the participants. They alternately talk and listen, as in any other conversation, while the bridge routes the audio signals among the conferees. In the case of the present system, documents may also be exchanged at will. When a conference is finished, people hang up (by pressing the Telephone off-button 68 of FIG. 4.). In Add-On mode, the initiator sometimes enters a simple log-off sequence. In the case where certain participants choose to leave the conference, the others may continue without interruption until all are finished.

The present invention is able to operate through any of the currently available bridges produced by AT&T, Darome, Westell or Confertech. It is intended to operate through any other manufacturer's bridge as well.

What is claimed is:

1. A teleconferencing system comprising
three or more audiographic teleconferencing terminals,
means for establishing and maintaining audio and facsimile image data communications between said teleconferencing terminals wherein said audio and facsimile image data communications are commonly established and maintained between all of said terminals through a public switched telephone network to an audio conference bridge wherein any one of said terminals can alternately act as a sending terminal or a receiving terminal during a teleconferencing session wherein each of said terminals has a single telephone line connection to said audio bridge and wherein each of said terminals includes means for transmitting said facsimile image data, where any one of said terminals can act as a sending terminal to either transmit audio information simultaneously to each of the remaining of said terminals or transmit facsimile image data simultaneously to each of the remaining of said terminals such that said remaining terminals act as receiving terminals wherein each of said terminals includes means for establishing a dual tone multi-frequency (DTMF) based broadcast and listen protocol when acting as a sending terminal to insure that each of said receiving terminals is connected and enabled for receiving facsimile image data and for establishing parameters for receiving facsimile image data, said sending terminal including means for generating and transmitting said audio information and facsimile image data to each of said receiving terminals, each of said receiving terminals including means for printing an image corresponding to said transmitted facsimile image data, telephone speaker means for generating audible signals corresponding to said transmitted audio information, means for acknowledging to said sending terminal receipt of protocol parameters and facsimile image data and wherein each of said terminals includes energy detection means for detecting DTMF signal energy within a certain time period when said DTMF signal energy would be received to confirm receipt of said protocol parameters.

2. A system as in claim 1 where each of said terminals includes first printer means for printing a hard copy form of said facsimile image data.

3. A system as in claim 2 wherein each of said terminals includes second printer means for directly generating a transparency image of said facsimile image data simultaneously with said hard copy, said transparency image suitable for projection using a standard overhead projector.

4. A system as in claim 1 wherein each of said terminals includes means for alternately operating in standard CCITT compatible facsimile mode for facsimile transmission terminals, or as teleconferencing terminals, or as a copier, or as a telephone/speakerphone, making said terminals multipurpose devices.

5. A system as in claim 1 wherein said broadcast and listen protocol provides for a status and control information means for controlling the simultaneous transmission of facsimile image data to two or more receivers by transmitting dual tone multi-frequency (DTMF) tone sets from said sending terminal to all said receiving terminals and wherein each of said receiving terminals include means for simultaneously replying back to said sending terminal with responsive DTMF tone sets without mutual interference to establish status and parameters supportable by all terminals in the teleconferencing session for facsimile image data communication.

6. A system as in claim 5 wherein said protocol controls the selection of a first predetermined data rate for facsimile image data based on error rates detected by any of said receivers in previous transmissions in order to improve the probability of successfully transmitting facsimile image data to all of said receiving terminals.

7. A system as in claim 6 wherein said protocol controls the selection of a second, slower predetermined data rate for facsimile image data if said first data rate cannot provide an acceptable probability of successfully transmitting facsimile image data between the transmitting terminal and all of said receiving terminals.

8. A system as in claim 1 wherein each of said terminals may include a speakerphone for audibly communicating said audio data.

9. A system as in claim 1 wherein each of said terminals is portable.

10. A system as in claim 3 wherein said transparency image is printed on a cut sheet of transparent plastic-type material.

11. A teleconferencing system comprising three or more audiographic teleconferencing terminals, means for establishing and maintaining audio and facsimile image data communications between said teleconferencing terminals wherein said audio and facsimile image data comunications are commonly established and maintained between all of said terminals thrugh a public switched telephone network to an audio conference bridge wherein any one of said terminals can alternately act as a sending terminal or a receiving terminal during a teleconferencing session wherein each of said terminals has a single telephone line connection to said audio bridge and wherein each of said terminals includes means for transmitting said facsimile image data, where any one of said terminals can act as a sending terminal to either transmit audio information simultaneously to each of the remaining of said terminals or transmit facsimile image data simultaneously to each of the remaining of said terminals such that said remaining terminals act as receiving terminals wherein each of said terminals includes means for establishing a dual tone multi-frequency based broadcast and listen protocol when acting as a sending terminal to insure that each of said receiving terminals is connected and enabled for receiving facsimile image data and for establishing parameters for receiving facsimile image data, said sending terminal including means for generating and transmitting said audio information and facsimile image data to each of said receiving terminals, each of said terminals including means for printing an image corresponding to said transmitted facsimile image data, telephone speaker means for generating audible signals corresponding to said transmitted audio information, and means for acknowledging to said sending terminal receipt of protocol parameters and facsimile image data.

* * * * *

UNITED STATES PATENT AND TRADEMARK OFFICE
CERTIFICATE OF CORRECTION

Figure 11B:
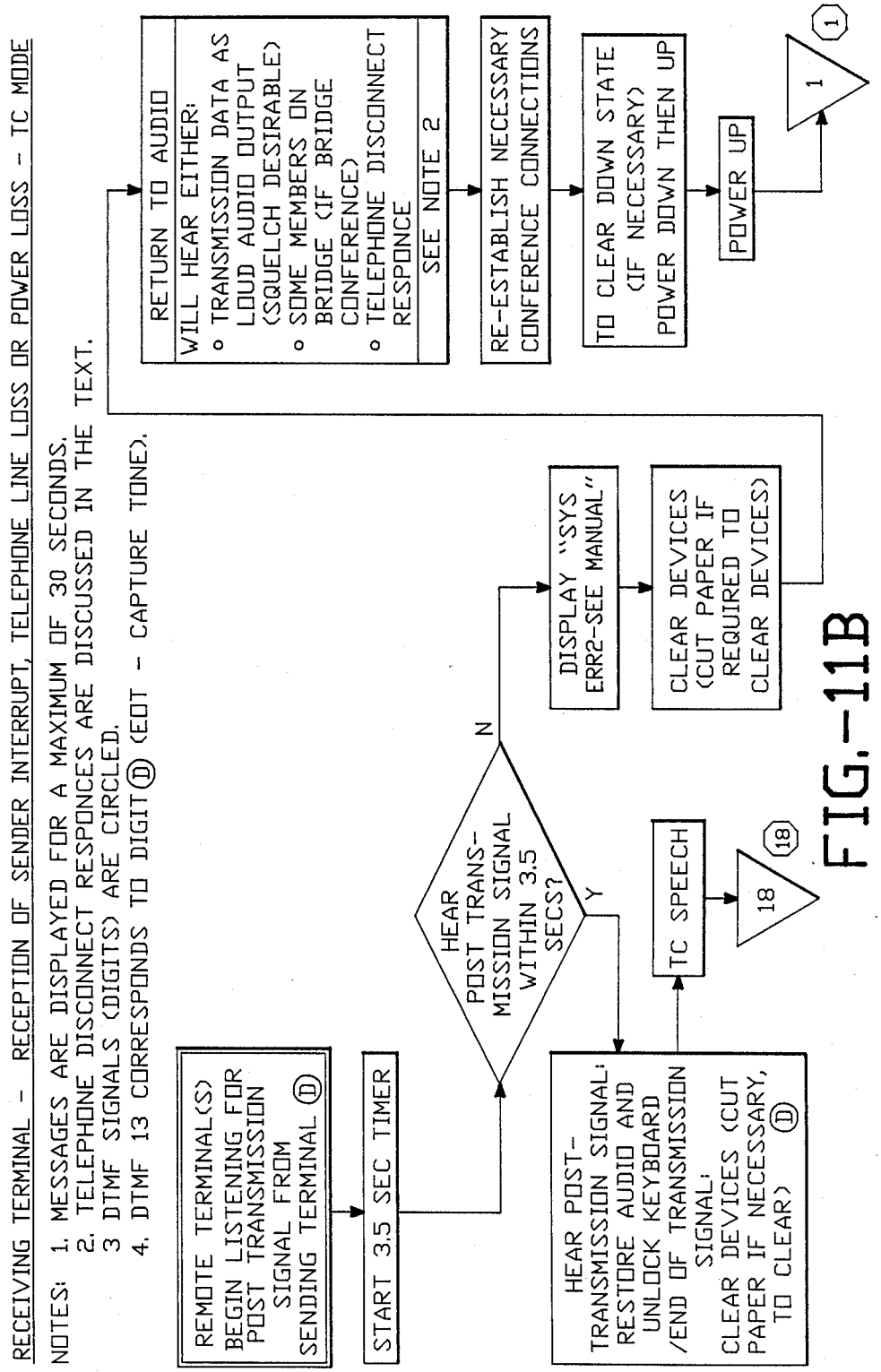
Figures 9, 10, 11, 12, 13, 13A:
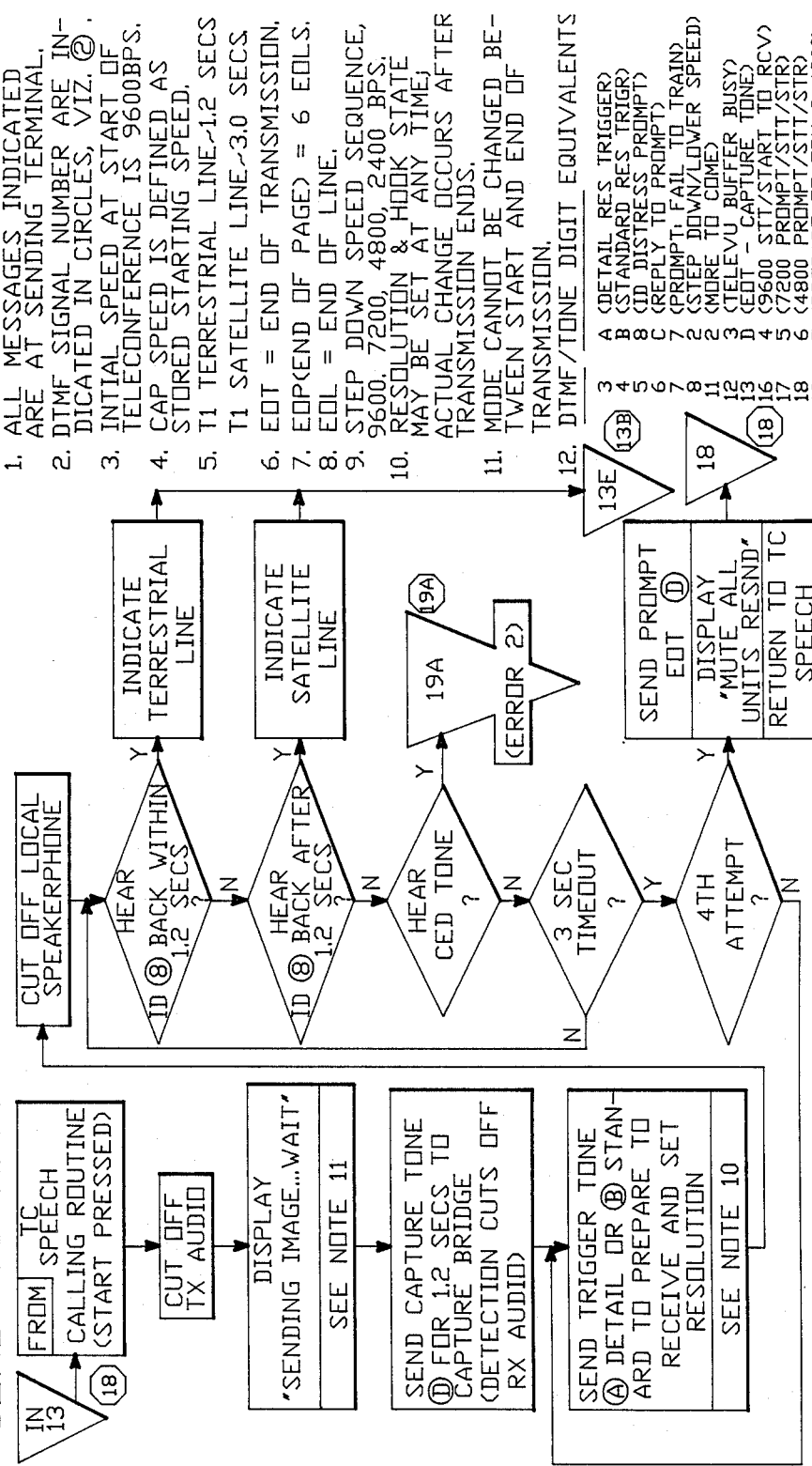
Figures 9, 10, 11, 12, 13, 14, 14A:
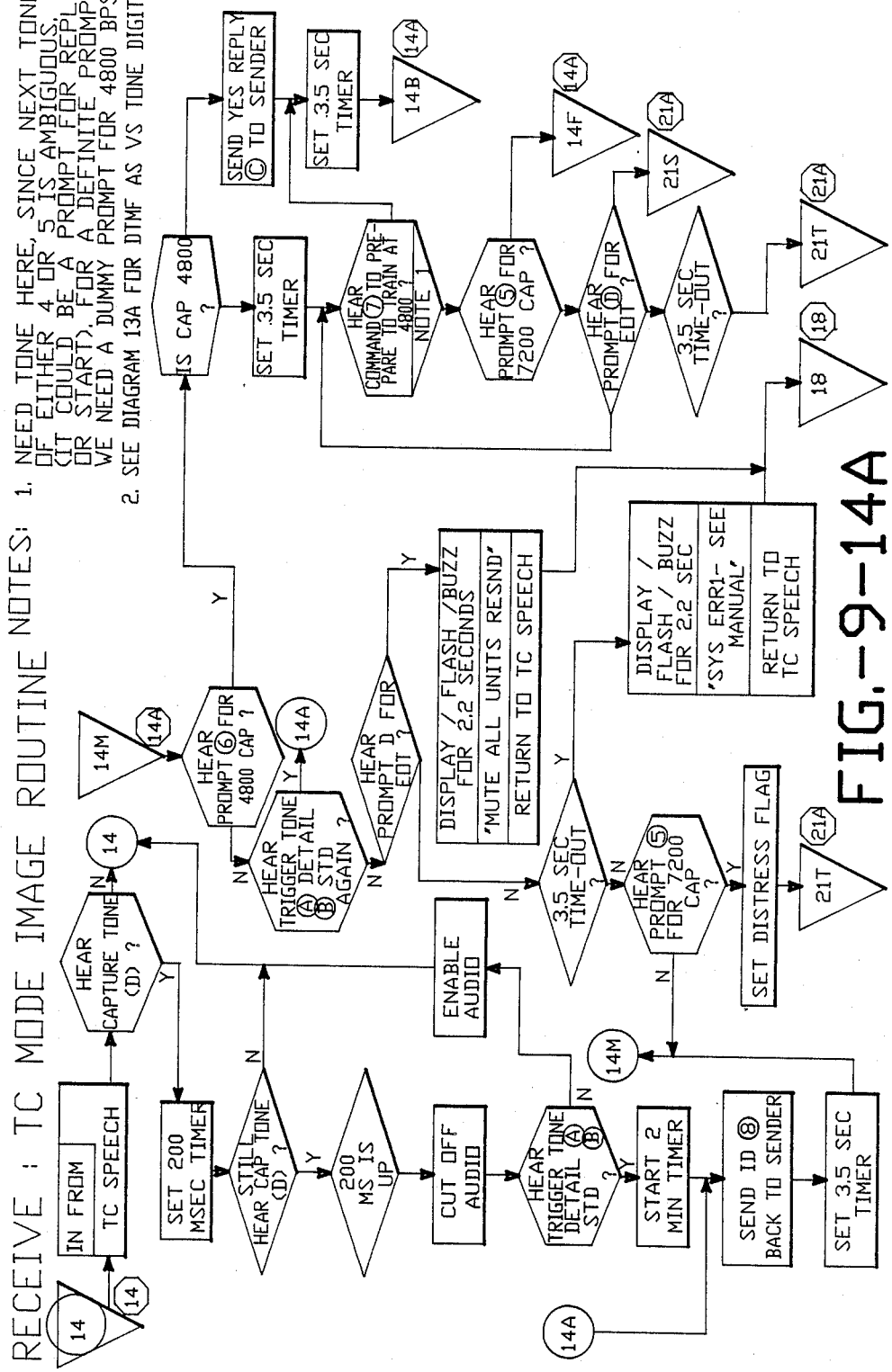
Figures 9, 10, 11, 12, 13, 14, 14B:
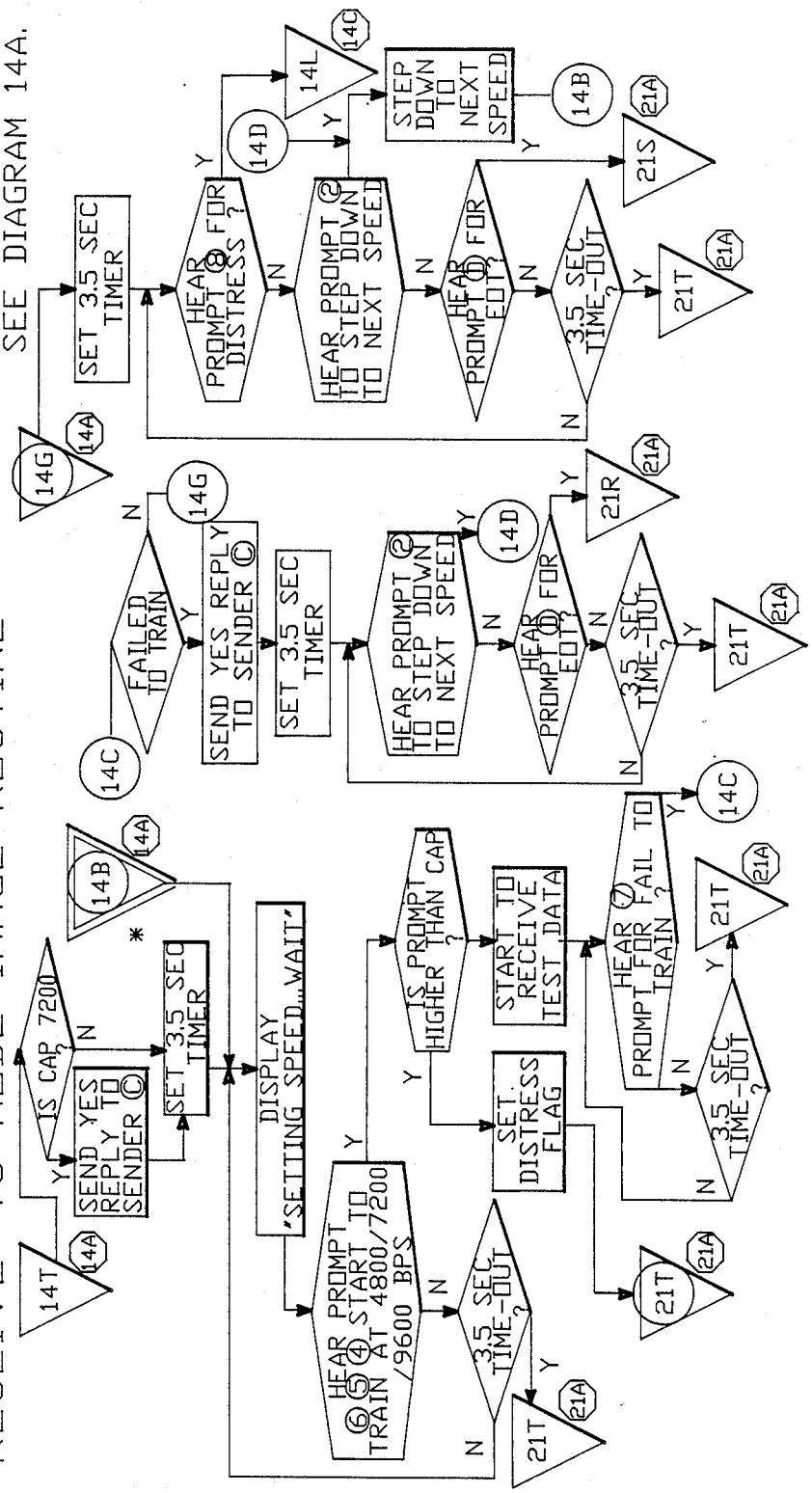
Figures 9, 10, 11, 12, 13, 14, 14C:
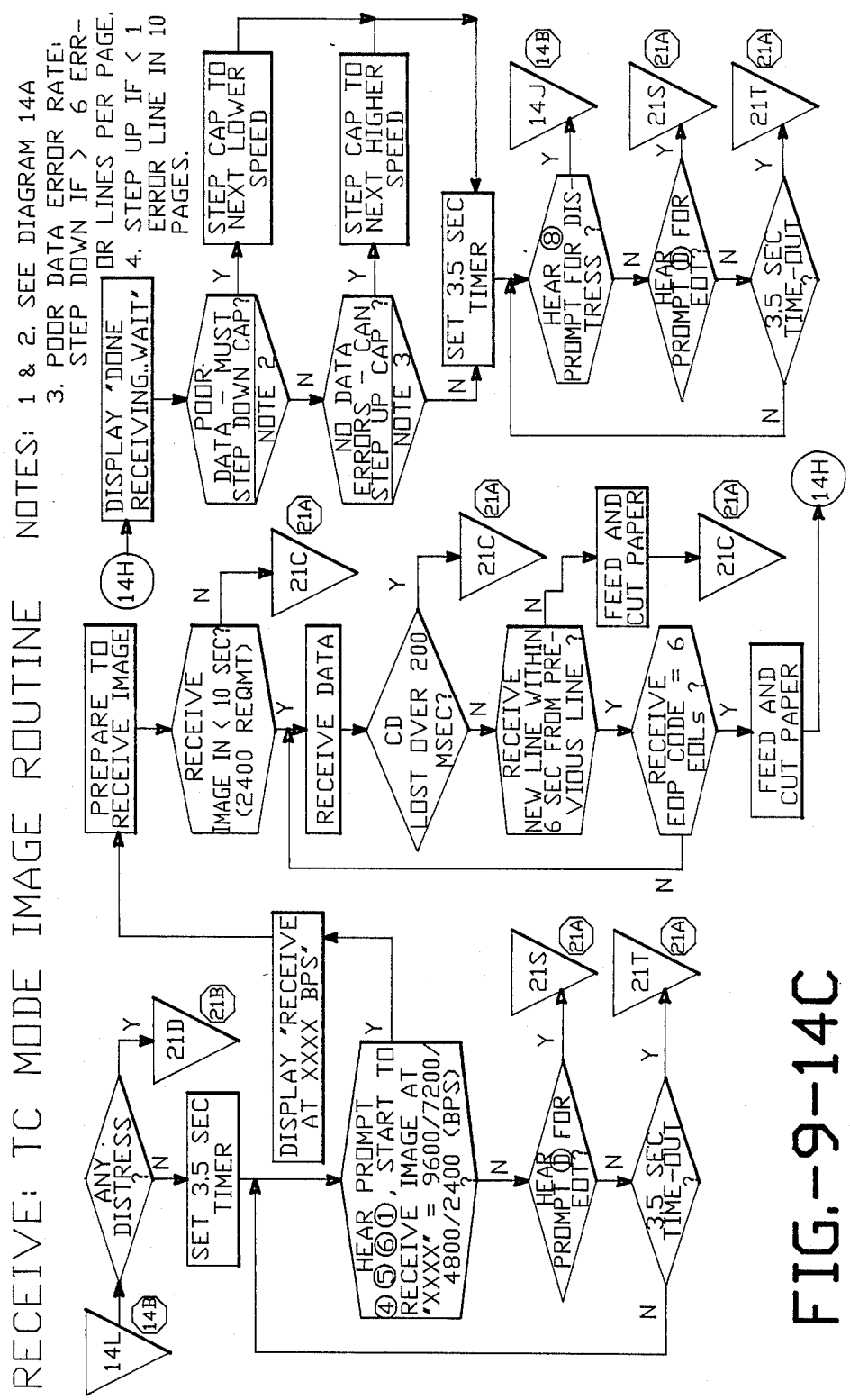
Figures 9, 10, 11, 12, 13, 14, 14D:
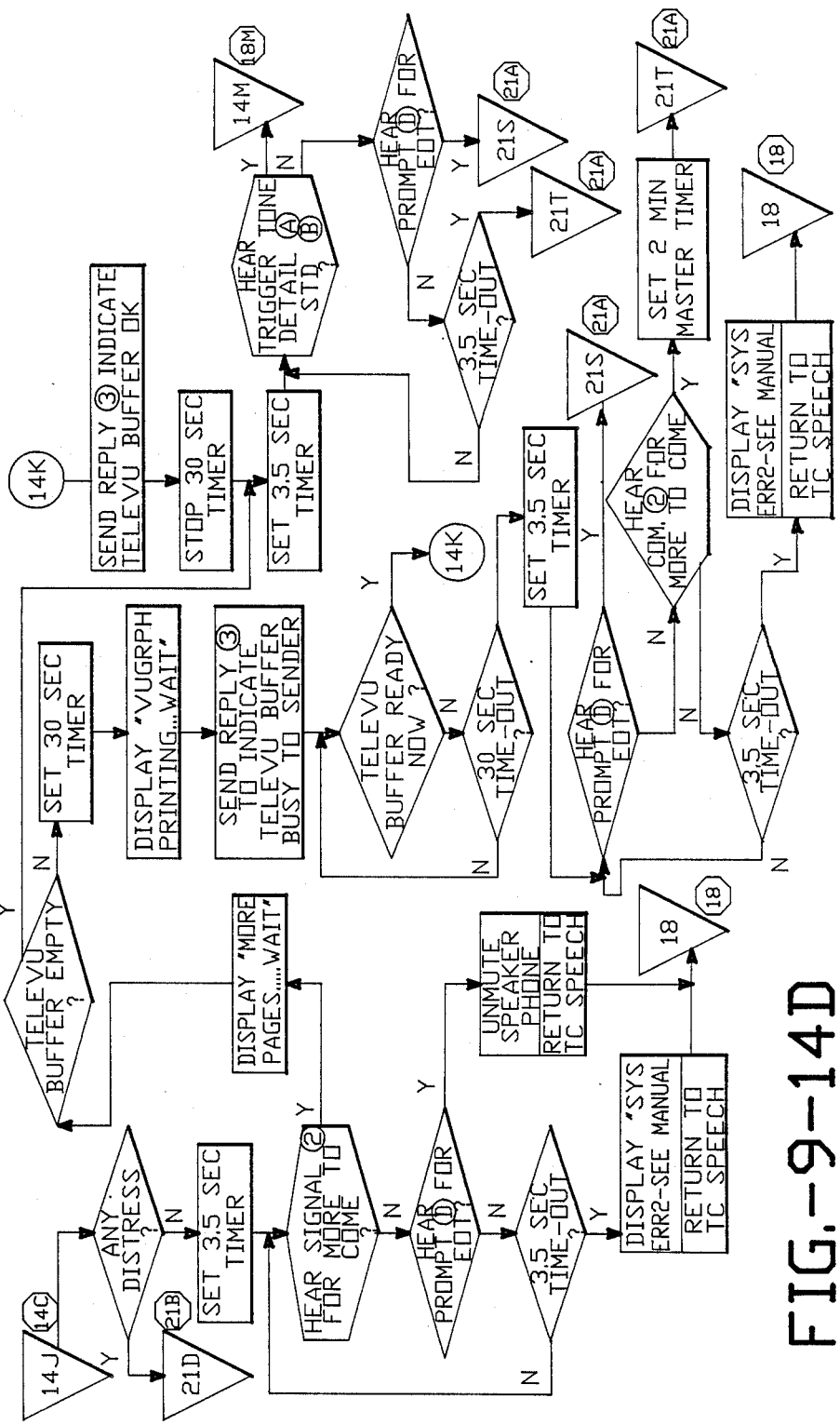
Figures 9, 10, 11, 12, 13, 14, 15:
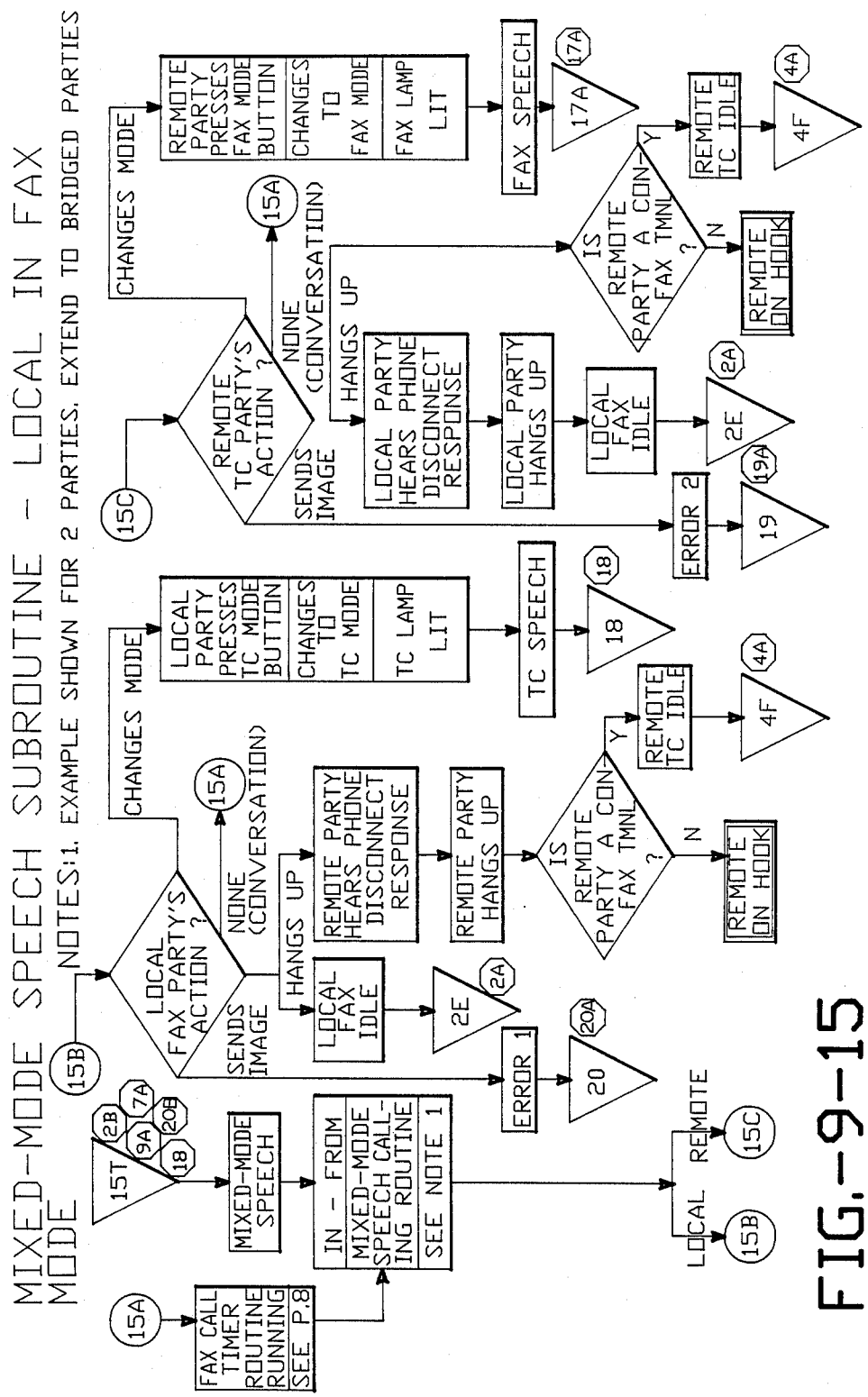
Figures 9, 10, 11, 12, 13, 14, 15, 16:
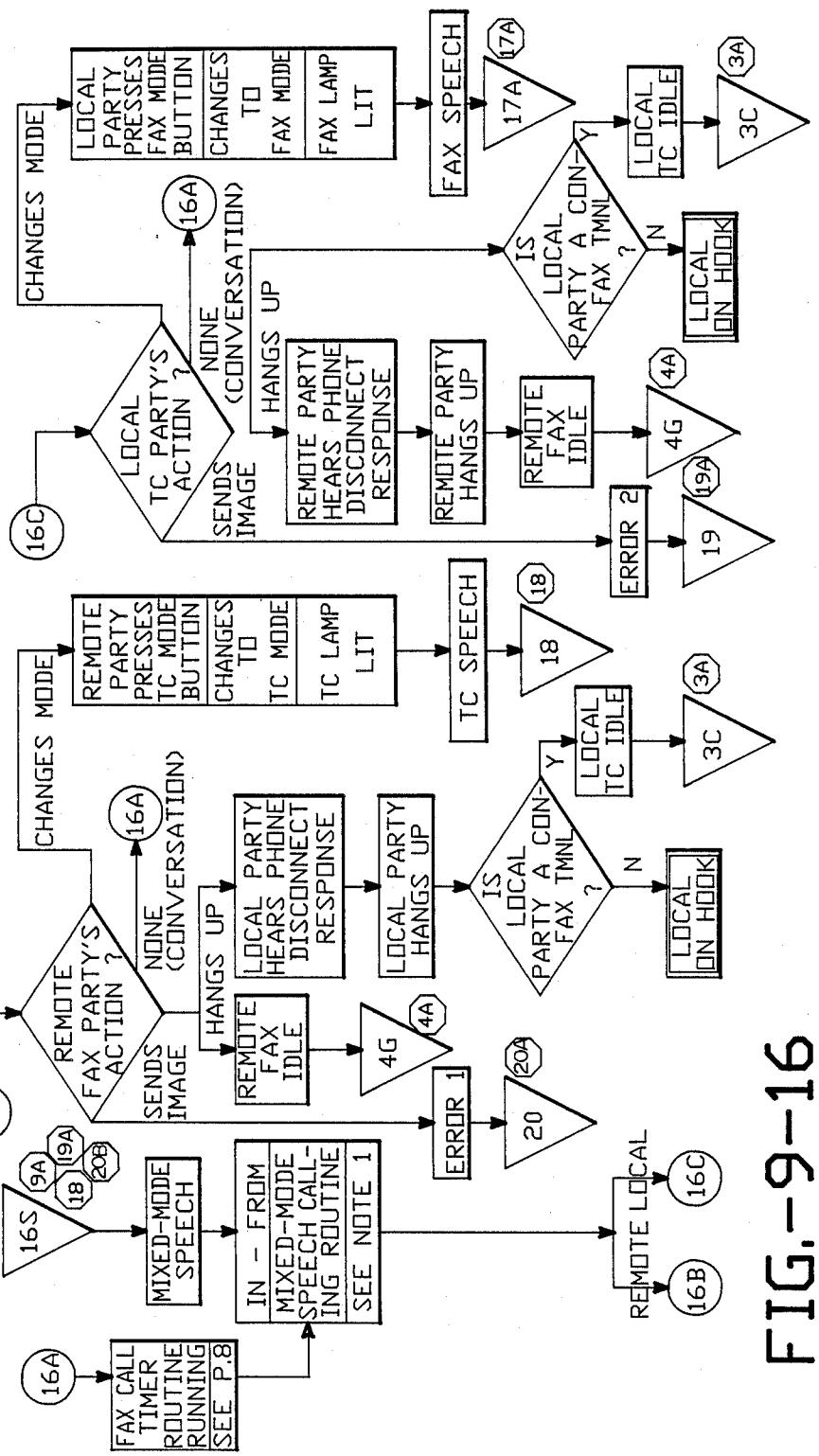
Figures 9, 10, 11, 12, 13, 14, 15, 16, 17, 17A:
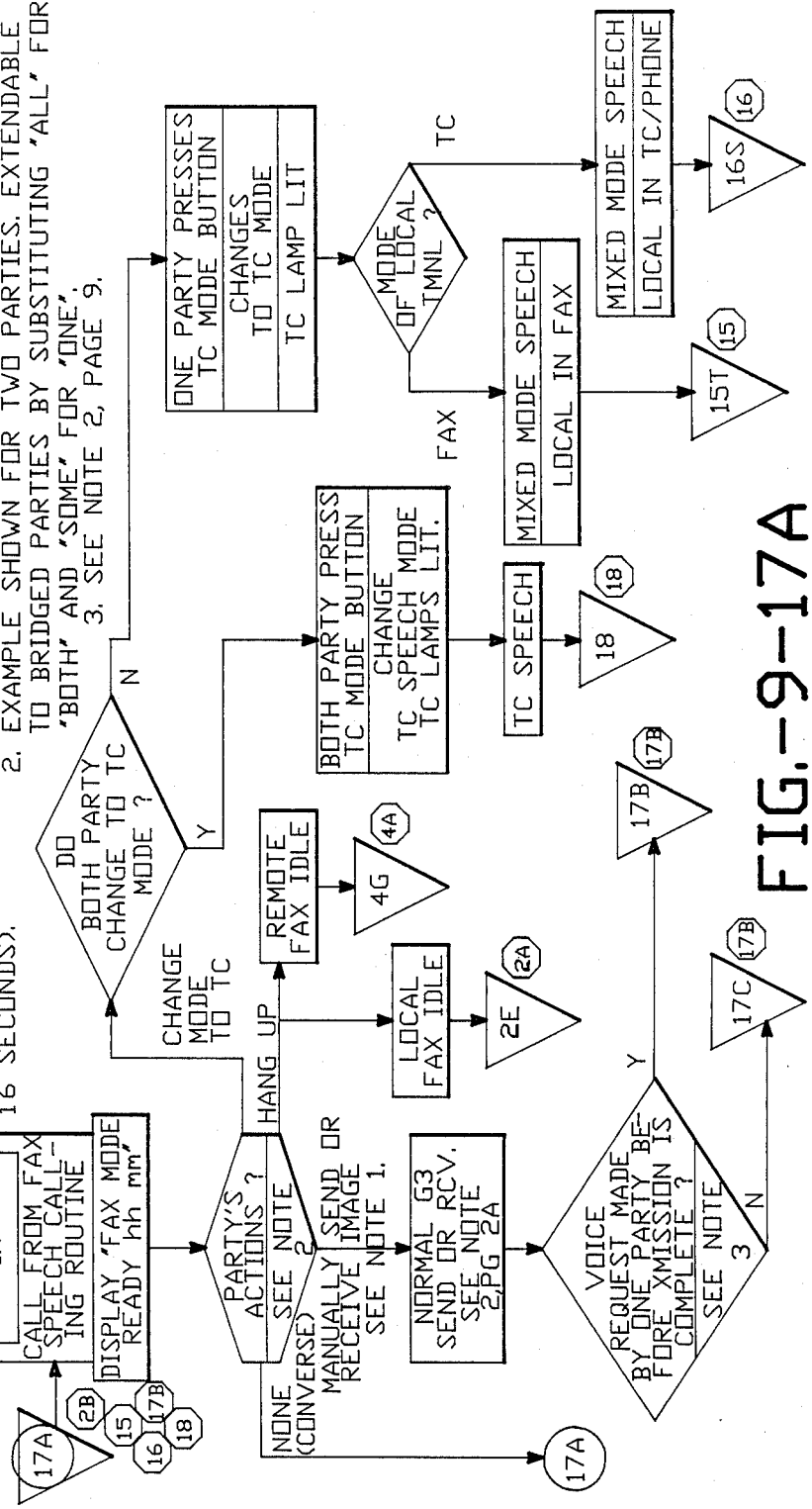
Figures 9, 10, 11, 12, 13, 14, 15, 16, 17, 18:
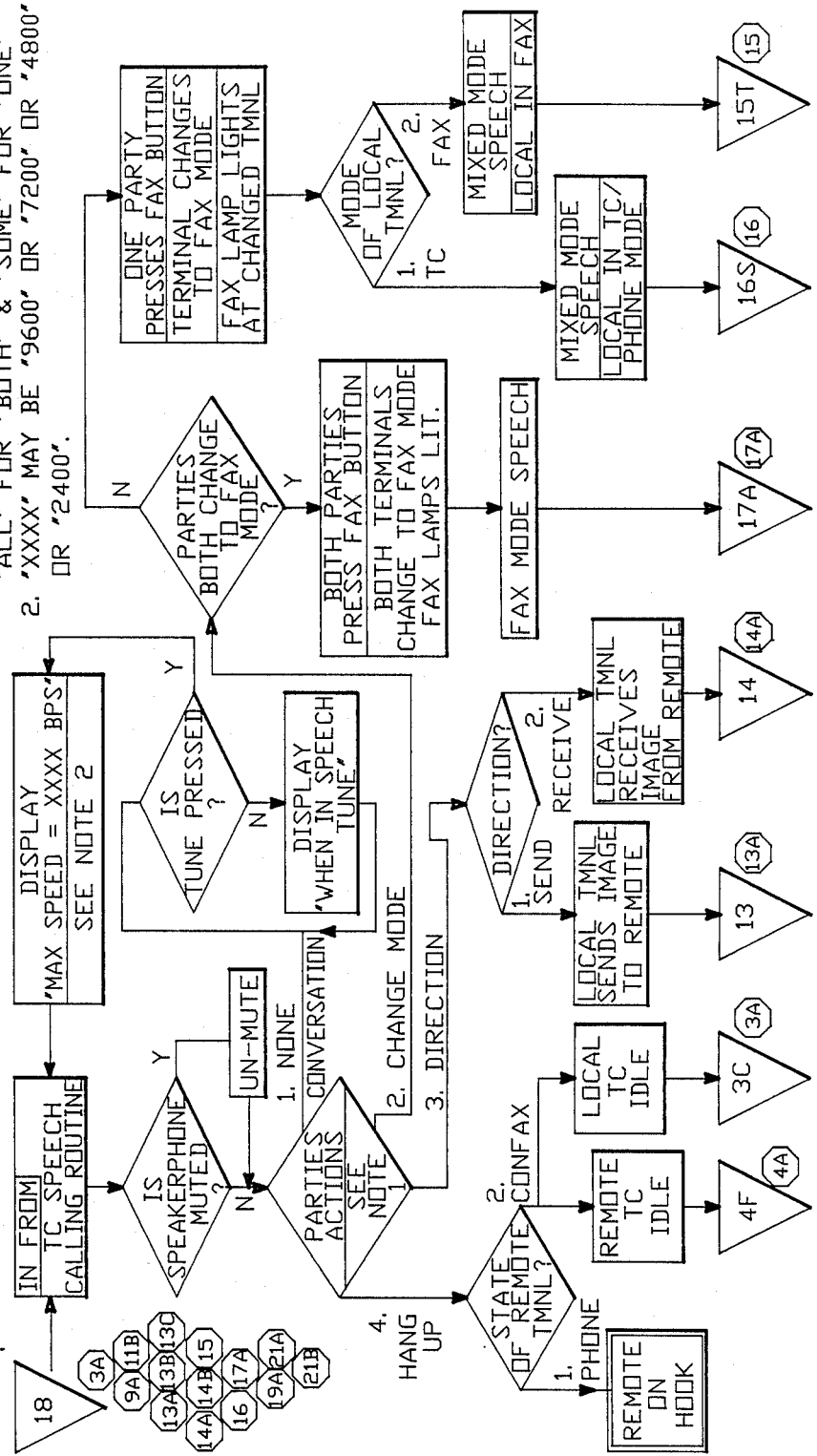
Figures 9, 10, 11, 12, 13, 14, 15, 16, 17, 18, 19, 19B:
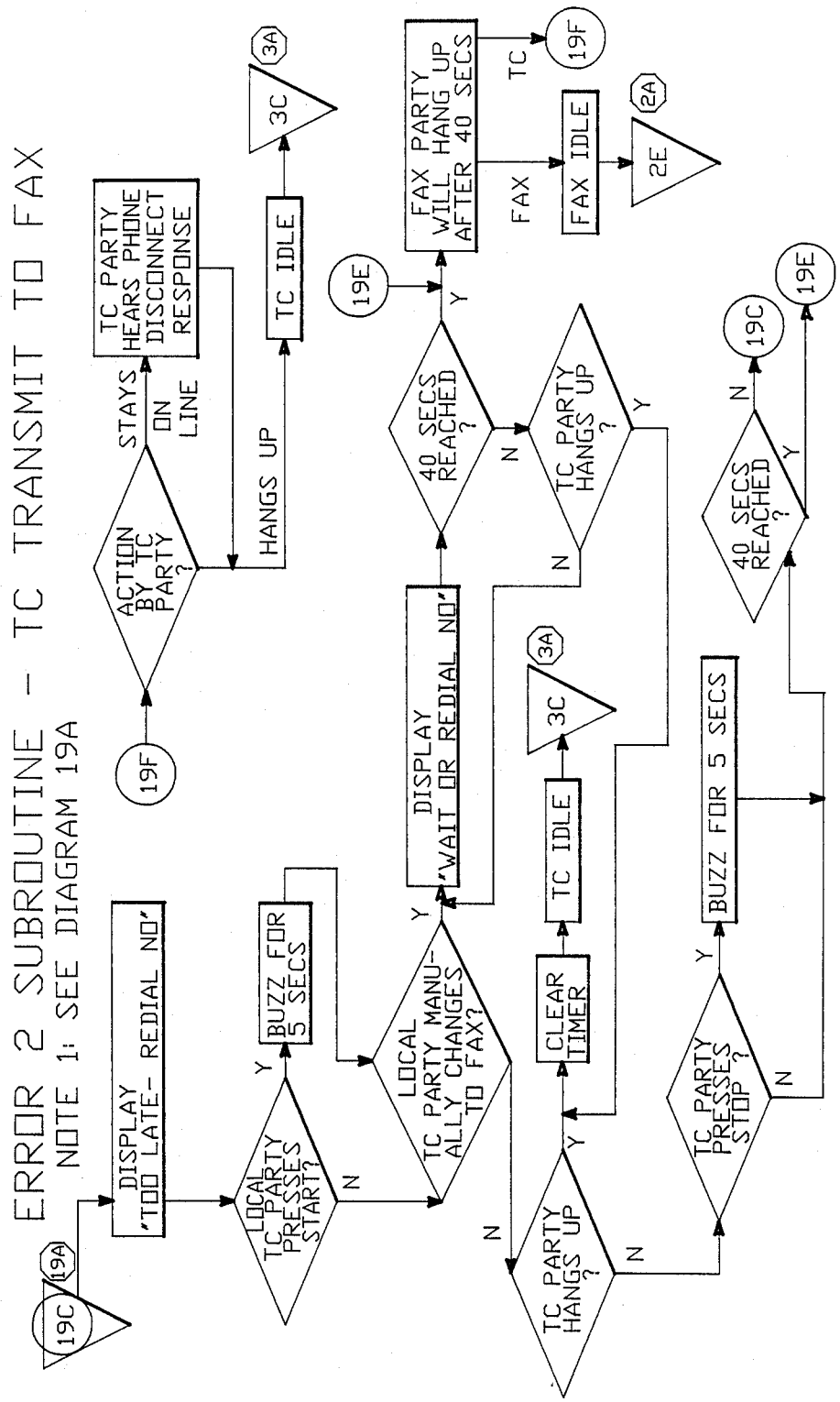
Figures 9, 10, 11, 12, 13, 14, 15, 16, 17, 18, 19, 20, 21, 21A:
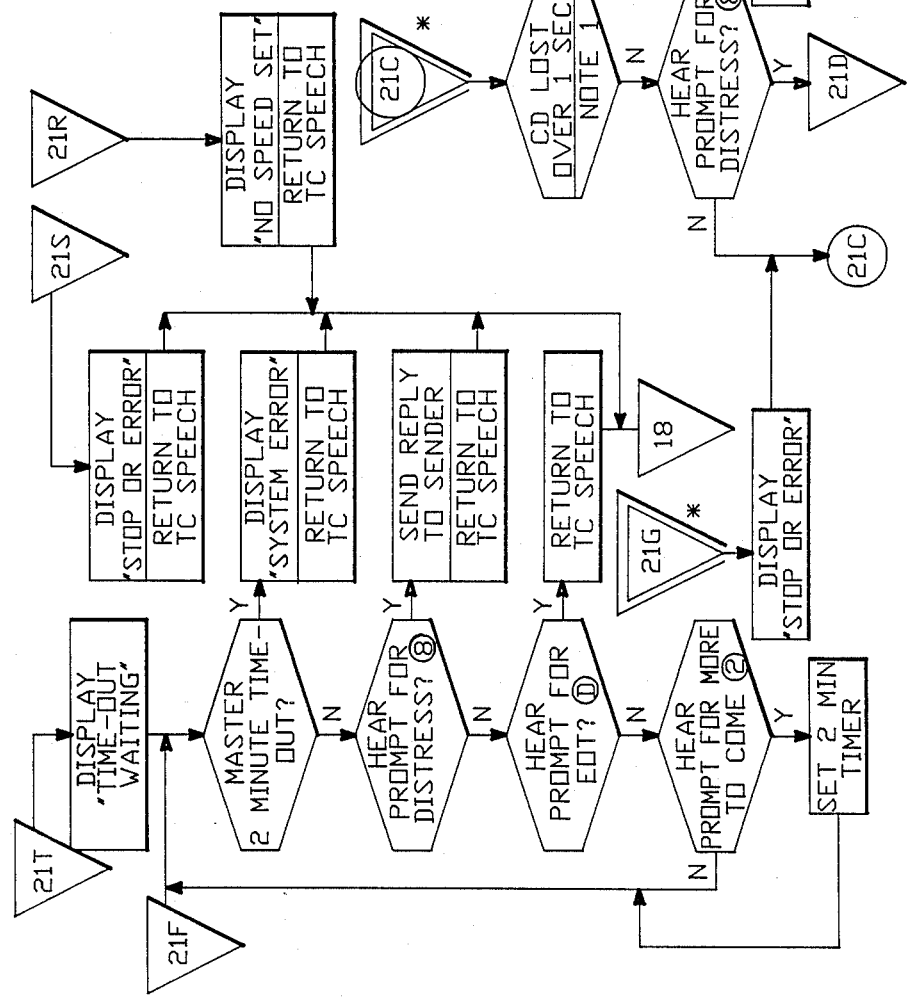
Figures 9, 10, 11, 12, 13, 14, 15, 16, 17, 18, 19, 20, 21, 21B:
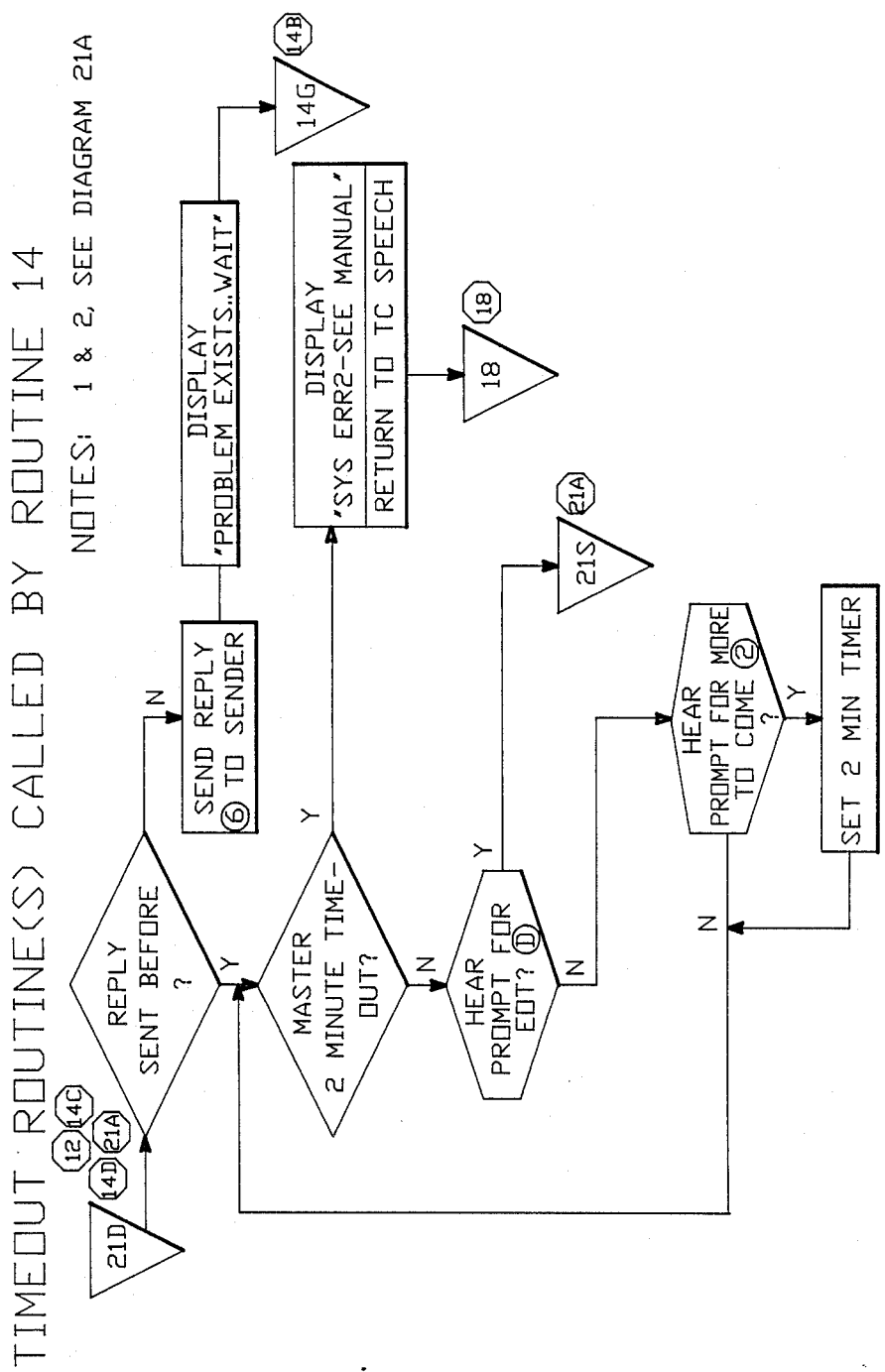

PATENT NO.  : 4,878,242
DATED       : October 31, 1989
INVENTOR(S) : Robert M. Springer, Richard I. Schmal, Eugene H. Gavenman It is certified that error appears in the above-identified patent and that said Letters Patent is hereby corrected as shown below:

| Figure: | Description |
|---|---|
| 7-4 | Change "PREPAIR" to --PREPARE-- |
| 7-11 | Change "> 30 SEC." to --< 30 SEC.-- |
| 8A | Change "2. (   30 SECONDS)" to --2. ( > 30 SECONDS)-- |
| 9-11B | Change "FIG. -11B" to --FIG. 9-11B-- |

| Column | Line | Description |
|---|---|---|
| 2 | 31 | Change "9-23" to --9-22-- |
| 4 | 50 | Change "to" to --or-- |
| 7 | 18 | Change "9-23" to --9-22-- |
| 7 | 23 | Change "9-23" to --9-22-- |
| 9 | 62 | Change "stil" to --still-- |
| 13 | 57 | Change "pringer" to --printer-- |

Signed and Sealed this

Fifth Day of March, 1991

*Attest:*

HARRY F. MANBECK, JR.

*Attesting Officer*  *Commissioner of Patents and Trademarks*